United States Patent
Corrigan et al.

(10) Patent No.: US 12,168,564 B2
(45) Date of Patent: Dec. 17, 2024

(54) MULTI-SLIT TENSION-ACTIVATED, EXPANDING SHEETS

(71) Applicant: 3M INNOVATIVE PROPERTIES COMPANY, St. Paul, MN (US)

(72) Inventors: Thomas R. Corrigan, St. Paul, MN (US); Patrick R. Fleming, Lake Elmo, MN (US); Anne C. F. Gold, South St. Paul, MN (US); Silvia G. Guttmann, St. Paul, MN (US); Nicholas K. Lee, Minneapolis, MN (US); Dylan T. Cosgrove, Oakdale, MN (US); Delony L. Langer-Anderson, Hugo, MN (US); Lisa M. Miller, Spring Valley, WI (US); Manoj Nirmal, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 246 days.

(21) Appl. No.: 17/785,983

(22) PCT Filed: Dec. 17, 2020

(86) PCT No.: PCT/IB2020/062149
§ 371 (c)(1),
(2) Date: Jun. 16, 2022

(87) PCT Pub. No.: WO2021/130628
PCT Pub. Date: Jul. 1, 2021

(65) Prior Publication Data
US 2023/0017683 A1    Jan. 19, 2023

Related U.S. Application Data

(60) Provisional application No. 62/952,806, filed on Dec. 23, 2019.

(51) Int. Cl.
*B65D 81/03* (2006.01)
*B31D 5/00* (2017.01)
(Continued)

(52) U.S. Cl.
CPC ........... *B65D 81/03* (2013.01); *B31D 5/0065* (2013.01); *B32B 5/04* (2013.01); *B65B 11/004* (2013.01);
(Continued)

(58) Field of Classification Search
CPC .......... B65D 81/03; B32B 5/04; B31D 5/0065
See application file for complete search history.

(56) References Cited

U.S. PATENT DOCUMENTS 3,018,205 A    1/1962   Barut
3,655,501 A *  4/1972   Tesch .................. B32B 27/00
                                                      428/137

(Continued)

FOREIGN PATENT DOCUMENTS

DE    19601172 A1    1/1997
DE    19606195 A1    9/1998
(Continued)

OTHER PUBLICATIONS

Farber, "Consumers Are Now Doing Most of their Shopping Online", Fortune Media IP Limited, [available in internet on Jun. 8, 2016] URL: <https://fortune.com/2016/06/08/online-shopping-increases/>, 9 pages.

(Continued)

*Primary Examiner* — Jasper Saberi

(57) ABSTRACT

The present disclosure relates generally to tension-activated, expanding articles, films, and sheets including a multi-slit pattern. In some embodiments, these articles, films, and/or sheets are used as cushioning films and/or packaging materials. The present disclosure also relates to methods of (Continued)

making and using these tension-activated, expanding articles, films, and sheets.

20 Claims, 31 Drawing Sheets

(51) Int. Cl.
   *B32B 5/04*       (2006.01)
   *B65B 11/00*      (2006.01)
   *B65D 81/05*      (2006.01)
   *B31D 3/02*       (2006.01)
(52) U.S. Cl.
   CPC ............ *B65D 81/05* (2013.01); *B31D 3/0207* (2013.01); *B31D 2205/0058* (2013.01)

(56) References Cited

U.S. PATENT DOCUMENTS

| | | |
|---|---|---|
| 3,762,629 A | 10/1973 | Bruno |
| 3,951,730 A | 4/1976 | Wennberg et al. |
| 3,992,162 A | 11/1976 | Gewiss |
| 4,105,724 A | 8/1978 | Talbot |
| 4,516,891 A | 5/1985 | Wnuk et al. |
| 5,334,276 A | 8/1994 | Meier |
| 5,389,059 A | 2/1995 | Corwin |
| 5,431,980 A | 7/1995 | McCarthy |
| 5,667,871 A | 9/1997 | Goodrich et al. |
| 5,688,578 A | 11/1997 | Goodrich |
| 6,183,836 B1 | 2/2001 | Pflug |
| 6,372,322 B1 | 4/2002 | Devaguptapu |
| 6,726,974 B1 | 4/2004 | Pflug et al. |
| 6,832,461 B2 | 12/2004 | Crye et al. |
| 6,929,843 B2 | 8/2005 | Kuchar |
| 7,541,085 B2 | 6/2009 | Burdon |
| 7,850,896 B2 | 12/2010 | Endres et al. |
| 8,302,733 B2 | 11/2012 | Peiffer et al. |
| 8,613,993 B2 | 12/2013 | Kuchar |
| 9,005,096 B2 | 4/2015 | Kling |
| 9,533,809 B2 | 1/2017 | Kuchar et al. |
| 9,550,336 B2 | 1/2017 | Bradford |
| 10,226,907 B2 | 3/2019 | Goodrich |
| 948,223 A1 | 4/2022 | Gold et al. |
| 2005/0089675 A1 | 4/2005 | Christiansen |
| 2010/0330330 A1* | 12/2010 | Luca ................. B29C 44/5654 428/137 |
| 2016/0067938 A1* | 3/2016 | Goodrich ............ B26D 1/405 493/361 |
| 2016/0136877 A1 | 5/2016 | Rogers et al. |
| 2017/0182723 A1 | 6/2017 | Calisch et al. |
| 2017/0203866 A1* | 7/2017 | Goodrich ............ B31D 5/0069 |
| 2018/0229910 A1* | 8/2018 | Kohn ..................... B65D 33/18 |
| 2018/0370702 A1* | 12/2018 | Goodrich ............ B31D 5/0065 |
| 2019/0187345 A1 | 6/2019 | Gold et al. |
| 2021/0024266 A1* | 1/2021 | Goodrich ................. B31D 3/04 |
| 2021/0031996 A1* | 2/2021 | Goodrich ............ D21H 27/30 |
| 2021/0101356 A1* | 4/2021 | Cheich ................. B31D 5/0065 |
| 2021/0309426 A1* | 10/2021 | Goodrich ............ B31D 3/0207 |
| 2022/0106093 A1* | 4/2022 | Parker ................. B31D 3/0207 |

FOREIGN PATENT DOCUMENTS

| | | |
|---|---|---|
| DE | 19716637 A1 | 10/1998 |
| EP | 0222534 B1 | 9/1991 |
| EP | 0686089 B1 | 12/1995 |
| EP | 0531251 B1 | 4/1996 |
| EP | 0465719 B1 | 2/1997 |
| EP | 0768948 B1 | 10/1998 |
| EP | 0839088 B1 | 11/1999 |
| EP | 1123199 B1 | 9/2002 |
| EP | 1426173 A2 | 6/2004 |
| EP | 1662064 A1 | 5/2006 |
| EP | 1807229 A1 | 7/2007 |
| EP | 1995052 A1 | 11/2008 |
| EP | 2069131 A1 | 6/2009 |
| EP | 2091725 A1 | 8/2009 |
| EP | 1824667 B1 | 7/2010 |
| EP | 1917138 B1 | 7/2010 |
| EP | 2281942 A1 | 2/2011 |
| EP | 1704044 B1 | 3/2011 |
| EP | 1807616 B1 | 5/2015 |
| EP | 3178642 A1 | 6/2017 |
| EP | 3221155 A1 | 9/2017 |
| EP | 2376277 B1 | 11/2017 |
| EP | 2774753 B1 | 12/2017 |
| EP | 2292839 B1 | 1/2018 |
| EP | 3041756 B1 | 2/2020 |
| EP | 2882546 B1 | 4/2020 |
| EP | 2047043 B1 | 5/2021 |
| JP | 0450647 B2 | 8/1992 |
| JP | 2003285875 A | 10/2003 |
| JP | 4347709 B2 | 10/2009 |
| JP | 5133587 B2 | 1/2013 |
| JP | 2019099231 A | 6/2019 |
| WO | 2015035335 A1 | 3/2015 |
| WO | 2014170650 A2 | 4/2015 |
| WO | 2017160022 A1 | 9/2017 |
| WO | 2018045316 A1 | 3/2018 |
| WO | 2018191012 A1 | 10/2018 |
| WO | 2019043621 A1 | 3/2019 |
| WO | 2021130613 A1 | 7/2021 |
| WO | 2021130616 A1 | 7/2021 |
| ZA | 955630 B | 2/1996 |

OTHER PUBLICATIONS

International Search Report for PCT Application No. PCT/IB2020/062149 mailed on Mar. 24, 2021, 5 pages.

McNicoll, "For Every Amazon Package it Delivers, The Postal Service Loses $1.46", [available on internet on Sep. 1, 2017], URL:<https://www.washingtonexaminer.com/for-every-amazon-package-it-delivers-the-postal-service-loses-146>, 3 pages.

* cited by examiner

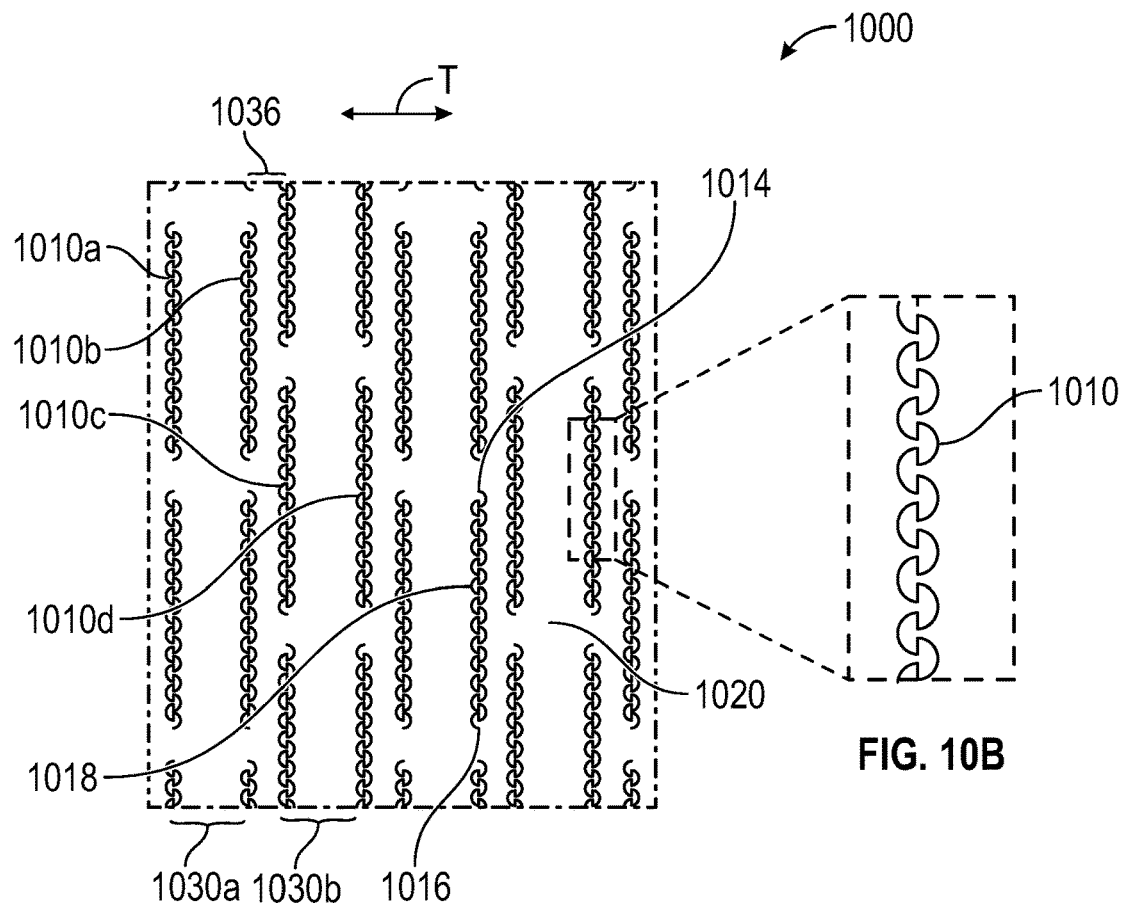
FIG. 10A
FIG. 10B
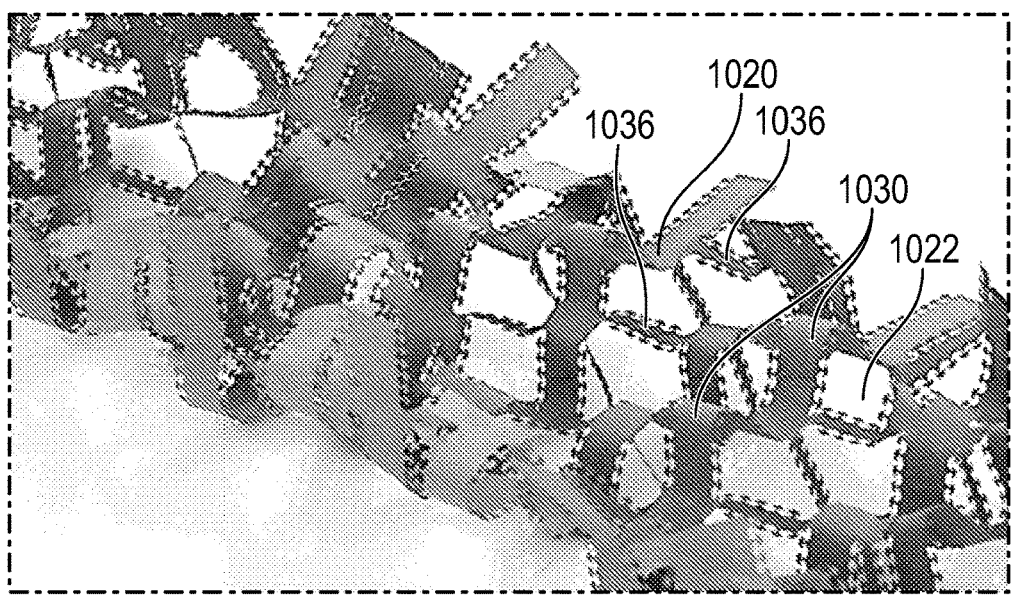
FIG. 10C

MULTI-SLIT TENSION-ACTIVATED, EXPANDING SHEETS

CROSS REFERENCE TO RELATED APPLICATIONS

This application is a national stage filing under 35 U.S.C. 371 of PCT/IB2020/062149, filed 17 Dec. 2020, which claims the benefit of U.S. Provisional Application No. 62/952,806, filed 23 Dec. 2019, the disclosures of which are incorporated by reference in their entireties herein.

TECHNICAL FIELD

The present disclosure relates generally to tension-activated, expanding articles and materials that include multi-slit patterns. In some embodiments, these articles are used as cushioning films and/or packaging materials. The present disclosure also relates to methods of making and using these tension-activated, expanding articles.

BACKGROUND

In 2016, consumers bought more products online than in stores. (*Consumers Are Now Doing Most of their Shopping Online*, Fortune Magazine, Jun. 8, 2016). Specifically, consumers made 51% of their purchases online and 49% in brick-and-mortar stores. Id. One result of this change in consumer behavior is the growing number of packages mailed and delivered each day. Over 13.4 billion packages are delivered to homes and businesses around the world each year (about 5.2 billion by the United States Postal Service, about 3.3 billion by Fed Ex, and about 4.9 billion by UPS). While delivery of non-package mail is decreasing annually, package delivery is growing at a rate of about 8% annually. This growth has resulted in 25% of the U.S. Postal Service's business being package delivery. (Washington Examiner, "*For every Amazon package it delivers, the Postal Service loses* $1.46," Sep. 1, 2017). Amazon ships about 3 million packages a day, and Alibaba ships about 12 million packages a day.

It is not just businesses shipping packages. The growing Maker culture creates opportunities for individuals to ship their handmade products around the world through websites like Etsy™. Further, the increased focus on sustainability causes many consumers to resell used products on sites like eBay™ rather than throwing them into landfills. For example, over 25 million people sell goods on eBay™, and over 171 million people buy these goods.

Individuals and businesses shipping these goods often ship them in shipping containers, typically boxes, including the product to be shipped, cushioning, and air. Boxes have many advantages, including, for example, the box can stand upright, it is lightweight, stored flat, is recyclable, and is relatively low cost. However, boxes come in standard sizes that often do not match the size of the item being shipped, so the user must fill the box with a large amount of filler or cushioning material to try to protect the item being shipped from jostling around in a box that is too large and becoming damaged.

Package cushioning materials protect items during shipment. Vibration and impact shock during shipment and loading/unloading are controlled by the cushioning materials to reduce the chance of product damage. Cushioning materials are often placed inside the shipping container where they absorb shock by, for example, crushing and deforming, and/or by dampening vibration or transmitting the shock and vibration to the cushioning material rather than to the item being shipped. In other instances, packaging materials are also used for functions other than cushioning, such as to immobilize the item to be shipped in the box and fix it in place. Alternatively, packaging materials are also used to fill a void such as, for example, when a box that is significantly larger than the item to be shipped is used.

Some exemplary packaging materials include plastic Bubble Wrap™, bubble film, cushion wrap, air pillows, shredded paper, crinkle paper, shredded aspen, vermiculite, cradles, and corrugated bubble film. Many of these packaging materials are not recyclable.

One exemplary packaging material is shown in FIGS. 1A and 1B. Film 100 is made of a paper sheet including pattern of a plurality of cuts or slits 110 that is often referred to as a "skip slit pattern," a type of single slit pattern. When film 100 is tension-activated (pulled along the tension axis (T), which is substantially perpendicular to cuts or slits 110), a plurality of beams 130 are formed, beams 130 are regions between adjacent coaxial rows of slits. The beams 130 formed by slits 110 collectively experience some degree of upward and downward movement (see, for example, FIGS. 1B and 1D). This upward and downward movement results in the two-dimensional article (a substantially flat sheet) of FIG. 1A becoming the three-dimensional article of FIGS. 1B and 1D when tension-activated. When this film is used as packaging material, the three-dimensional structure provides some degree of cushioning as compared to a two-dimensional, flat structure.

The cut or slit pattern of film 100 is shown in FIGS. 1C and 1s described in U.S. Pat. No. 4,105,724 (Talbot) and U.S. Pat. No. 5,667,871 (Goodrich et al.). The pattern includes a plurality of substantially parallel rows 112 of multiple individual linear slits 110. Each of the individual linear slits 110 in a given row 112 is out of phase with each of the individual linear slits 110 in the directly adjacent and substantially parallel row 112. In the specific construction of FIGS. 1A-1C, the adjacent rows 112 are out of phase by one half of the horizontal spacing. The pattern forms an array of slits 110 and rows 112, and the array has a regular, repeating pattern across the array. Between directly adjacent rows 112 of slits 110 are formed beams 130 of material.

FIG. 2A shows the cut or slit pattern of film 100 of FIGS. 1A-1C rotated 90°. Each linear slit 110 has a length (L) that extends between a first terminal end 114 and a second terminal end 116. Each linear slit 110 also has a midpoint 118 that is halfway between the first and second terminal ends 114,116. Midpoint 118 is shown by a dot on each slit 110 of FIG. 2A. The midpoints 118 of parallel and aligned slits 110 substantially align with one another. In other words, the midpoint 118 of an individual linear slit 110 substantially aligns with the midpoint 118 of an individual linear slit 110 on a directly adjacent beam 130 along the tension axis (T). Such slits 110 are not in directly adjacent slit rows 112; instead, they are on alternating rows 112. Further, the midpoint 118 of an individual slit 110 is between the terminal ends 114, 116 of the directly adjacent slits or cuts 110 along the tension axis (T). The distance between the center of two directly adjacent slits 110 in a row 112 of slits 110 is identified as the transverse spacing (H). The thickness of beam 130 or distance between two adjacent rows 112 of adjacent linear slits 110 is identified as the axial spacing (V).

More specifically, in the embodiment of FIG. 2A, midpoint 118A of slit 110A aligns axially with midpoint 118B of slit 110B, meaning that the midpoints 118A, 118B align along an axis extending in the axial direction. Slit 110B is on the beam 130B directly adjacent to beam 130A on which slit 110A lies. Also, midpoint 118A of slit 110A is between terminal end 114C of slit 110C and terminal end 114D of slit 110D. Slits 110C and 110D are directly adjacent to slit 110A in the transverse direction. FIG. 2A also shows the transverse pitch (H) between transversely adjacent midpoints 118, the axial pitch (V) or beam 130 height, the slit length (L), and the tension axis (T) along which tension can be deployed to provide the upward and downward movement of beams 130.

FIG. 2B shows the primary tension lines (e.g., the lines approximating the highest tensile stress path) formed when an article including the slit pattern of FIG. 2A is deployed with tension along the tension axis T. FIG. 2B shows in (red) dotted lines the primary tension lines 140, which are where the greatest tensile stress will occur. Tension lines are imaginary paths through the material that carry the greatest load when tension is applied to the material along the tension axis. When tension is applied along tension axis T, the primary tension lines 140 move more closely into alignment with the applied tension axis T, causing the sheet to distort. When single slit patterns are deployed, the activation of tension along the primary tension lines 140 causes substantially all regions of the pattern to experience some tension or compression (tensile stress or compressing stress) and then buckle and bend out of the plane of the original two-dimensional film. In some embodiments, when the film is fully deployed and/or tension is applied to the desired extent, substantially no regions exist in the film that remain parallel to the original plane of the sheet.

An exemplary double slit patterned material was disclosed in U.S. Pat. No. 8,613,993 ("the '993 patent") and is shown in FIGS. 3A and 3B. The '993 patent describes using the material of FIGS. 3A and 3B to form a single layer of wrap to be placed over an item of produce (particularly, heads of lettuce) and is formed of a clear, transparent, elastic plastic wrapper. The "double slit pattern" includes a plurality of individual slits. Each of the slits in the plurality can be formed by a single continuous cut that does not crossover or intersect itself. The pattern includes a plurality of rows of slits and the individual slits in a first row are substantially aligned with the individual slits in a directly adjacent, second row. The diagonal corners of the sheet on opposite sides of the pattern, i.e., normal to the direction of the slits, are pulled apart and passed around and underneath before being tied. The material includes a series of pairs of slits that form loops which will "pop" up from the surface when the sheet in which the slits are made is stretched in a direction normal to the latter, as is shown in FIG. 3B. The pattern includes a substantial border which is devoid of slits, and is made in a discrete size bounded by the border.

SUMMARY

The inventors of the present disclosure invented a novel double slit tension-activated, expanding material and/or article. In some embodiments, the double slit tension-activated, expanding material and/or article is used for shipping and packaging applications. However, the double slit tension-activated, expanding material and/or article can also be used for a plethora of other uses or applications. So, the present disclosure is not meant to be limited to shipping or packaging material applications, which are merely one exemplary use or application.

Some embodiments relate to an expanding material, comprising: a material including a plurality of slits that form a multi-slit pattern; each slit including a first terminal end and a second terminal end; wherein an imaginary straight line connects the first and second terminal ends of each of the slits in the plurality of the slits in a row and wherein the imaginary straight lines relating to a row of slits are all colinear with one another but not with the slits.

Some embodiments relate to an expanding material, comprising: a material including a plurality of slits that form a multi-slit pattern; wherein the material is substantially planar in an pretensioned form but wherein the multi-slit pattern enables at least portions of the material to rotate 45 degrees or greater from the plane of the material in a pretensioned form when tension is applied along the tension axis.

Some embodiments relate to an expanding material, comprising: a material including a plurality of slits that form a multi-slit pattern; each slit including a first terminal end and a second terminal end; wherein at least one of the first or second terminal ends are curved.

Some embodiments relate to an expanding material, comprising: a material including a plurality of slits that form a multi-slit pattern; each slit including a first terminal end and a second terminal end; wherein each of the slits in the plurality of slits includes two or more extrema.

Some embodiments relate to an expanding material, comprising: a material including a plurality of slits that form a multi-slit pattern; wherein each slit at least one of hook, loop, sine-wave, square-wave, triangle-wave, or other similarly-shaped feature.

Some embodiments relate to an expanding material, comprising: a material including a plurality of slits that form a multi-slit pattern; wherein each of the slits in the plurality of the slits includes one or more multibeams.

Some embodiments relate to an expanding material, comprising: a material including a plurality of slits that form a multi-slit pattern; wherein the slit pattern extends through one or more of the edges of the material.

In some of these embodiments, the material includes at least one of paper, corrugated paper, plastic, an elastic material, an inelastic material, polyester, acrylic, polysulfone, thermoset, thermoplastic, biodegradable polymers, and combinations thereof. In some embodiments, the material is paper and the thickness is between about 0.003 inch (0.076 mm) and about 0.010 inch (0.25 mm). In some embodiments, the material is plastic and the thickness is between about 0.005 inch (0.13 mm) and about 0.125 inch (3.2 mm). In some embodiments, the material passes the interlocking test described herein. In some embodiments, the slits are generally perpendicular to the tension axis. In some embodiments, the slits have a slit shape that is at least one of semi-circle, u-shaped, v-shaped, concave, convex, curved, linear, or a combination thereof. In some embodiments, the slits in the plurality of slits are offset from one another in adjacent rows by 75% or less of the transverse length of the slit. In some embodiments, the slits have a slit shape and slit orientation and wherein the slit shape and/or orientation varies within a row of slits. In some embodiments, the slits have a slit shape and slit orientation and wherein the slit shape and/or orientation varies in adjacent rows. In some embodiments, the material has a thickness between about 0.001 inch (0.025 mm) and about 5 inches (127 mm). In some embodiments, the slit pattern extends through one or more of the edges of the material. In some embodiments, each slit in the plurality of slits has a slit length and wherein the slit length either differs or is the same. In some embodiments, each slit in the plurality of slits has a slit length that is between about 0.25 inch (6.4 mm) and about 3 inches (76.2 mm). In some embodiments, each slit in the plurality of slits has a slit length and the material has a material thickness, and wherein the ratio of slit length to material thickness is between about 50 and about 1000. In some embodiments, at least a portion of the slit passes through an imaginary straight line connecting the first and second terminal ends.

Some embodiments relate to a die capable of forming any of the slit patterns described herein.

Some embodiments relate to a packaging material formed of any of the expanding materials described herein.

Some embodiments relate to a method of making any of the expanding materials described herein, comprising: forming the single slit pattern in the material by at least one of by extrusion, molding, laser cutting, water jetting, machining, stereolithography or other 3D printing techniques, laser ablation, photolithography, chemical etching, rotary die cutting, stamping, other suitable negative or positive processing techniques, or combinations thereof. In some such embodiments, the method further involves applying tension to the expanding material along a tension axis to cause the material to expand. In some embodiments, the application of tension causes one or more of (1) the slits to form openings and/or (2) the material adjacent to the slits to form flaps. In some embodiments, the tension is applied by hand or with a machine. In some embodiments, applying tension to the expanding material along the tension axis causes the material to change from a two-dimensional structure to a three-dimensional structure. In some embodiments, when exposed to tension along the tension axis, at least one of (1) the terminal ends of the slits in the expanding material are drawn toward one another, causing a flap of the expanding material to move or buckle upward relative to the plane of the material in its pretensioned state and/or (2) portions of beams of the expanding material move or buckle downward relative to the plane of the material in its pretensioned state forming an opening portion. In some embodiments, the flaps have a flap shape that is at least one of scale-shaped, curved, rectangular, pointed, cusp-shaped, or combinations thereof.

Some embodiments further relate to wrapping any of the expanded materials described herein around an item. In some embodiments, the expanded material is wrapped around the item at least two fully wraps such that at least one of the flaps, openings, and/or interlocking features on the first layer or wrap interlock with at least one of the flaps, openings, and/or interlocking features on the second layer or wrap.

BRIEF DESCRIPTION OF DRAWINGS

FIG. 10A is a top view schematic drawing of an exemplary double slit pattern including interlocking features.

FIG. 10B is an enlarged portion of FIG. 10A.

FIG. 10C is a perspective view photograph of the pattern shown in FIG. 10A formed in a paper sheet and exposed to tension along the tension axis.

DETAILED DESCRIPTION

Figure 1A:
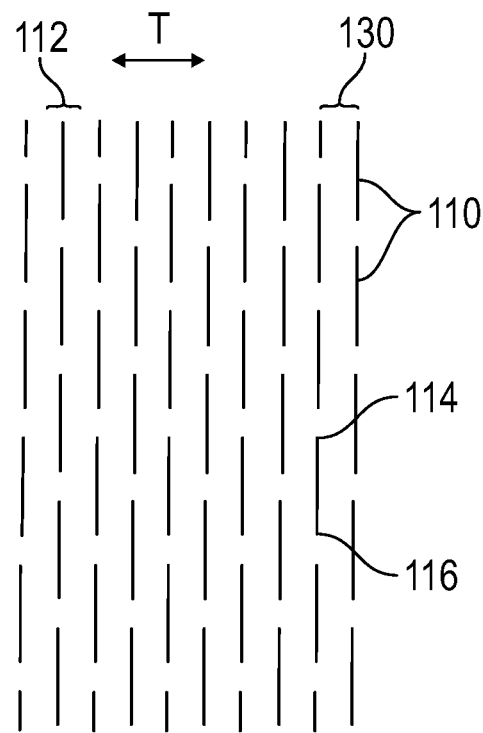
FIG. 1A is a top-view line drawing of the single slit pattern used to form the prior art packaging material.
Figure 1B:
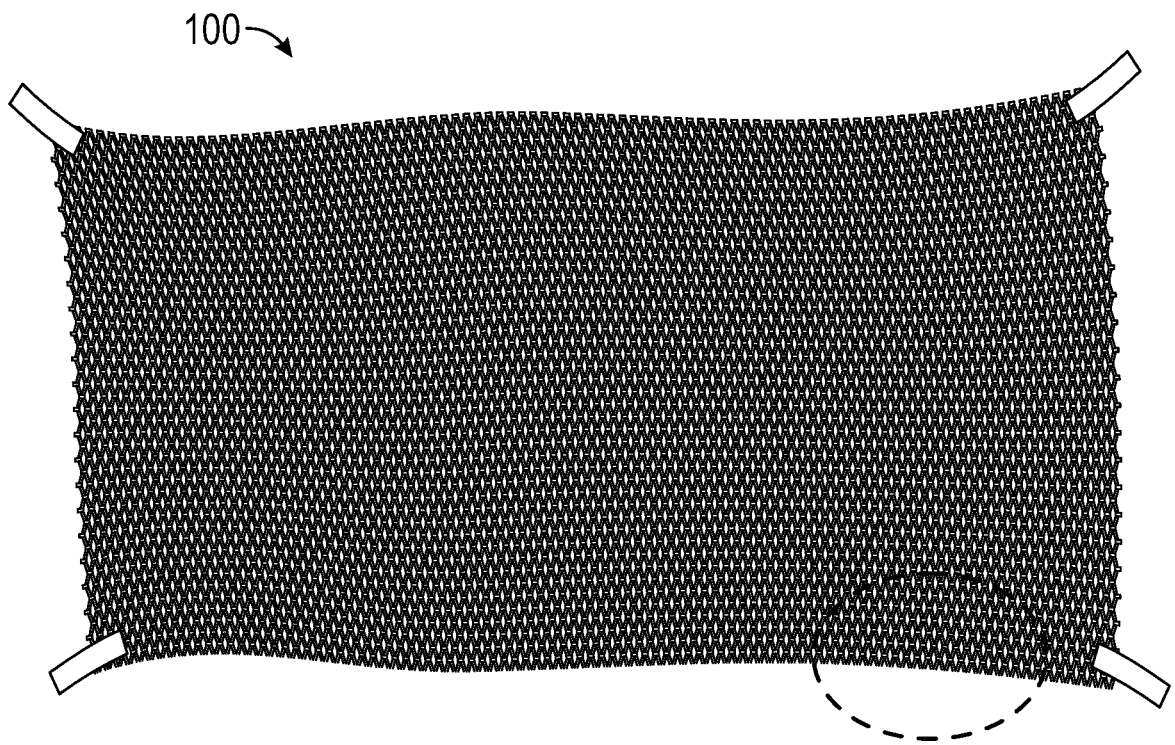
FIG. 1B is a perspective-view of the pattern of FIG. 1A formed in a material and deployed by application of tension along the tension axis.
Figure 1C:
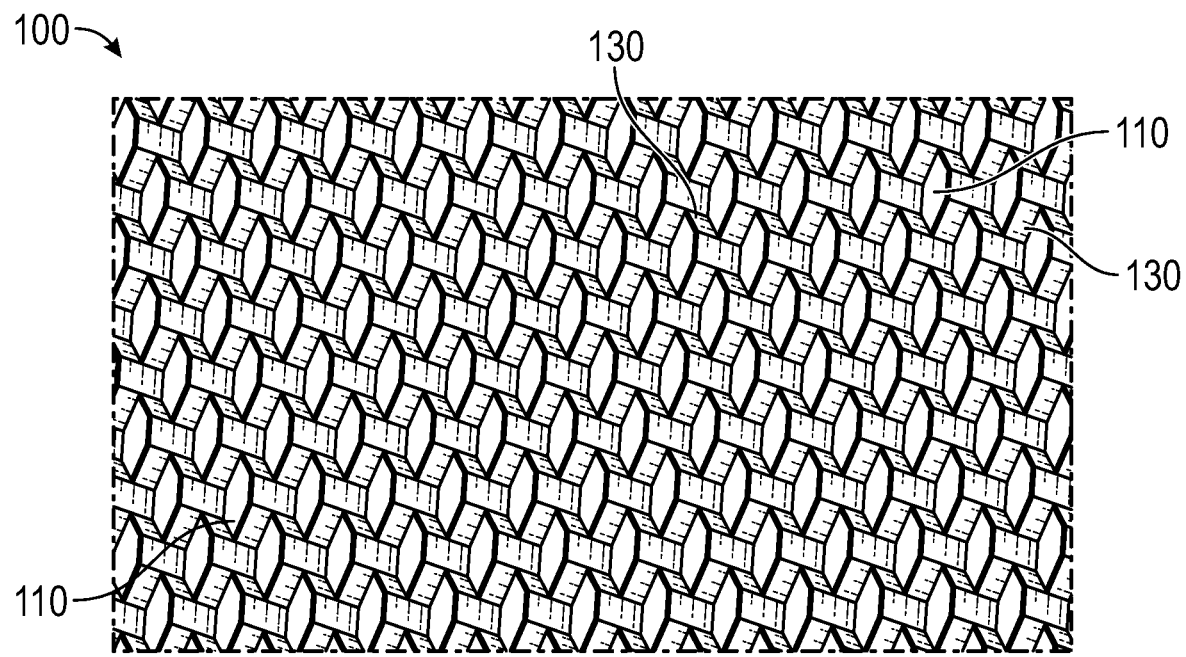
FIG. 1C is close-up nearly top view of the material of FIG. 1B.
Figure 2A:
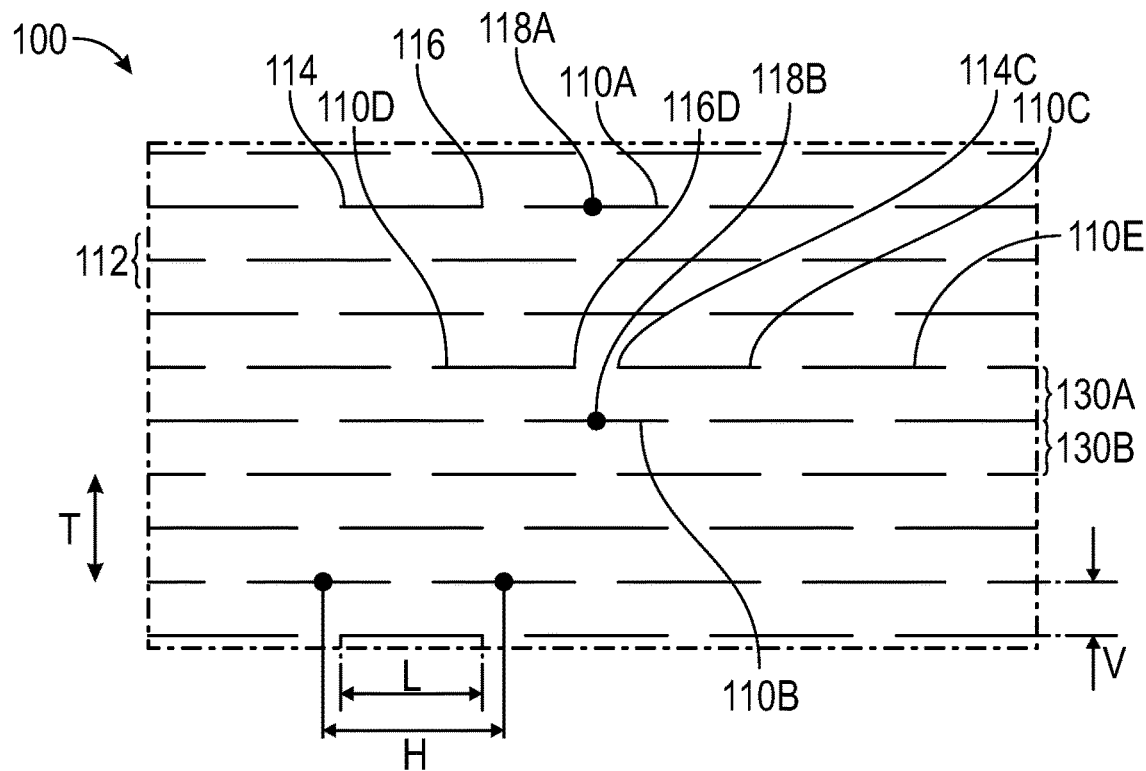
FIG. 2A is a top view line drawing of an exemplary single slit pattern.
Figure 2B:
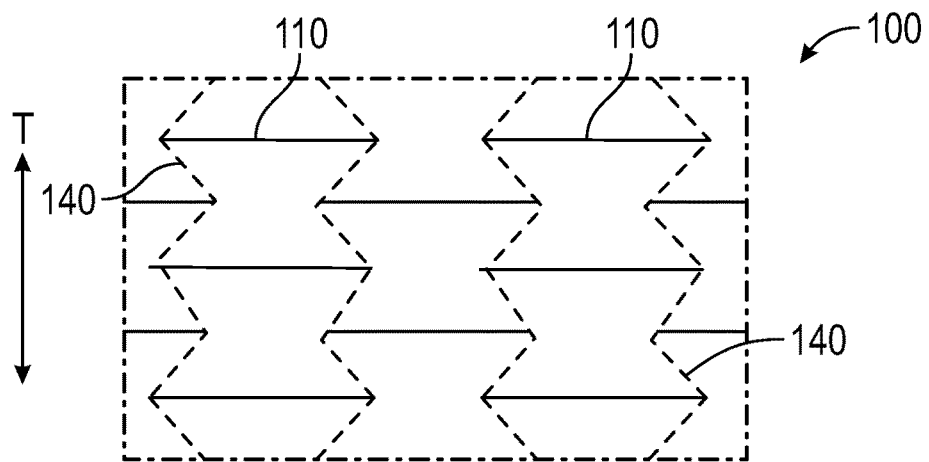
FIG. 2B is a top view line drawing of the single slit pattern of FIG. 2A showing primary tension lines.
Figure 3A:
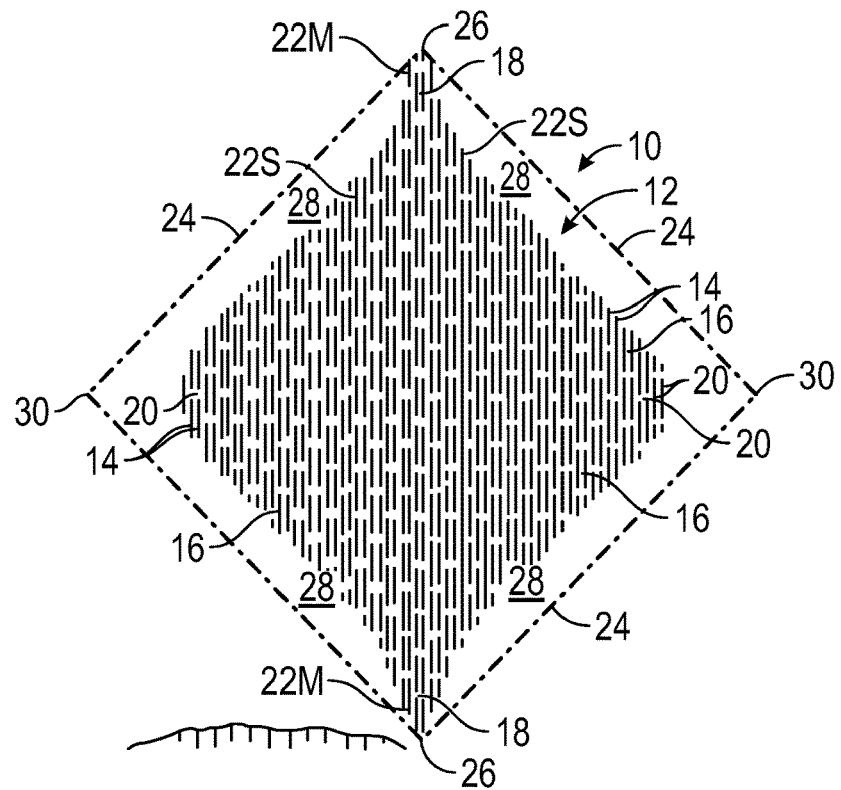
FIG. 3A is a top view line drawing of a prior art double slit patterned material.
Figure 3B:
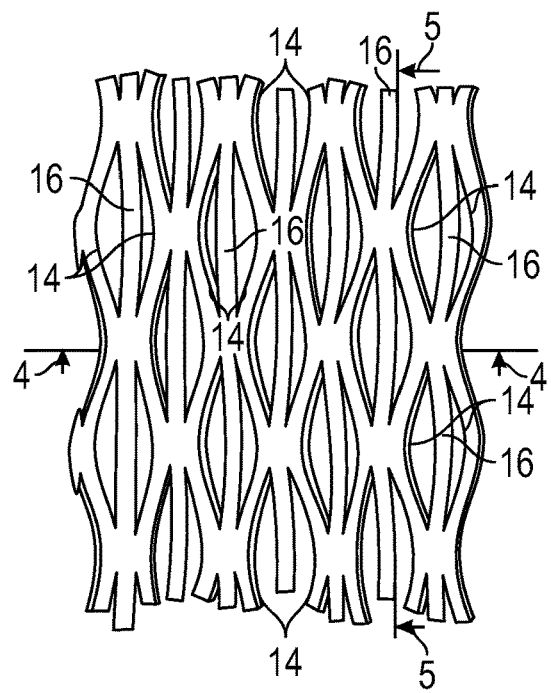
FIG. 3B is a schematic top view of the prior art material of FIG. 3A when exposed to tension.

Various embodiments of the present disclosure relate to multi-slit patterns and to articles including these multi-slit patterns. A "slit" is defined herein as a narrow cut through the article forming at least one line, which may be straight or curved, having at least two terminal ends. Slits described herein are discrete, meaning that individuals slits do not intersect other slits. A slit is generally not a cut-out, where a "cut-out" is defined as a surface area of the sheet that is removed from the sheet when a slit intersects itself. However, in practice, many forming techniques result in the removal of some surface area of the sheet that is not considered a "cut-out" for the purposes of the present application. In particular, many cutting technologies produce a "kerf", or a cut having some physical width. For example, a laser cutter will ablate some surface area of the sheet to create the slit, a router will cut away some surface area of the material to create the slit, and even crush cutting creates some deformation on the edges of the material that forms a physical gap across the surface area of the material. Furthermore, molding techniques require material between opposing faces of the slit, creating a gap or kerf at the slit. In various embodiments, the gap or kerf of the slit will be less than or equal to the thickness of the material. For example, a slit pattern cut into paper that is 0.007" thick might have slits with a gap that is approximately 0.007" or less. However, it is understood that the width of the slit could be increased to a factor that is many times larger than the thickness of the material and be consistent with the technology disclosed herein.

As used herein, the term "single slit pattern" refers to a pattern of individual slits that form individual rows each extending across the sheet transversely, where the rows form a repeating pattern of individual rows along the axial length of the sheet, and the pattern of slits in each row is different than the pattern of slits in the directly adjacent rows. For example, the slits in one row may be axially offset or out of phase with the slits in the directly adjacent rows.

The term "multi-slit pattern" is defined herein as a pattern of individual slits that form a first set of adjacent rows across the transverse direction y of the sheet, where the individual slits within the first set of adjacent rows are aligned in the transverse direction y. In a multi-slit pattern, the first set of adjacent rows form a repeating pattern with at least a second row along the axial length of the sheet, where the slits in the first set of adjacent identical rows are offset from the slits in the second row in the transverse direction y. The term "multi-slit pattern" includes double slit patterns, triple slit patterns, quadruple slit patterns, etc.

As used herein, the term "double slit pattern" refers to a pattern of a plurality of individual slits. The pattern includes a plurality of rows of slits and the individual slits in a first row are substantially aligned with the individual slits in a directly adjacent, second row. A double slit is comprised of a slit in a first row that is substantially aligned with a slit in a second row. Together, these two substantially aligned slits form a double slit pattern.

As used herein, the term "triple slit pattern" refers to refers to a pattern of a plurality of individual slits. The pattern includes a plurality of rows of slits and the individual slits in a first row are substantially aligned with the individual slits in a directly adjacent, second row. The slits in the second row are substantially aligned with the individual slits in a directly adjacent, third row. A triple slit is comprised of a slit in a first row that is substantially aligned with a slit in a second row, both of which are substantially aligned with a slit in a third row. Together, these three substantially aligned slits form a triple slit.

As used herein, the term "quadruple slit pattern" refers to refers to a pattern of a plurality of individual slits. The pattern includes a plurality of rows of slits and the individual slits in a first row are substantially aligned with the individual slits in a directly adjacent, second row. The slits in the second row are substantially aligned with the individual slits in a directly adjacent, third row. The slits in the third row are substantially aligned with the individual slits in a directly adjacent, fourth row. A quadruple slit is comprised of a slit in a first row that is substantially aligned with a slit in a second row, both of which are substantially aligned with a slit in a third row, all three of which are substantially aligned with a slit in a fourth row. Together, these four substantially aligned slits form a quadruple slit.

The term "multi-slit pattern" includes double slit patterns, triple slit patterns, quadruple slit patterns, etc. Further, the term "multi-slit pattern" is meant to include any slit pattern wherein two or more slits that are each in different, directly adjacent rows substantially align with one another such that their terminal ends substantially align. Substantial alignment of the terminal ends of aligned multi-slits means that if you draw an imaginary line between two aligned terminal ends in two adjacent slits of the multi-slit, the angle of that imaginary line relative to the alignment axis (the axis that is perpendicular to the row(s)) is no greater than +/−20 degrees. In some embodiments, the length of each slit that forms a multi-slit differs by no more than +/−20% of the total length of the longest or shortest slit. In some embodiments, where the slits are linear, they are substantially parallel to one another. In some embodiments where the slits are not linear, the aligned multi-slits are all substantially aligned parallel to the tension axis within +/−20 degrees.

Figure 4A:
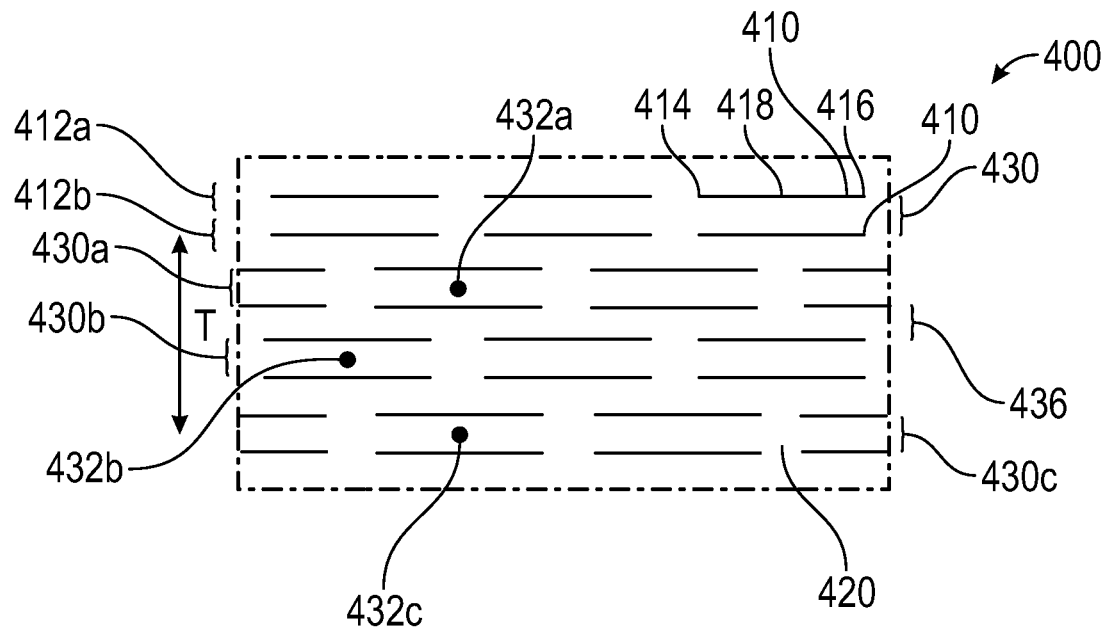
FIG. 4A is a top view schematic drawing of an exemplary double slit pattern.

The midpoint 432 of a section of transverse beam 430 can be referred to as the geometric center of that section of the transverse beam (as shown in FIG. 4A). In some embodiments, the individual slits in a row are substantially aligned with the individual slits in more than one and less than a million directly adjacent rows. In some embodiments, the slits are substantially perpendicular to the tension axis (T).

Double, triple, quadruple, or multi-slit patterns create significantly more out of plane undulation than single slit patterns when exposed to tension along a tension axis. This out of plane undulation of the material has great value for many applications. For example, these out of plane undulation areas create out of plane material or loops that can interlock with other areas of out of plane material or loops when portions of the material are placed adjacent to one another or wrapped together. As such, multi-slit patterns inherently interlock and/or include interlocking features. Once tension-activated, these features and patterns interlock and hold the material substantially in place.

Interlocking can be measured by the following test method. A sample measuring 36-inches (0.91 m) long and 7.5-inches (19 cm) wide was obtained. The sample was fully deployed without tearing, and was then placed directly adjacent to a smooth PVC pipe (for example, a one having an outer diameter (OD) of 3.15 inches (8 cm) and a length of 23 inches (58.4 cm)), ensuring that the sample remained fully deployed during rolling. The sample was wrapped over the pipe ensuring that each successive layer was placed directly over the previous layer and that the sample was placed at the center (along the length) of the pipe. The same will provide a minimum of two complete wraps around the pipe. When all the sample was wrapped around the pipe, the sample was released and whether the sample unfolded/unwrapped was observed. If the sample did not unfold/unwrap after a 1-minute wait, the sample was slid off the pipe onto a smooth surface such as a table top. The sample was then lifted by the trailing edge to see if it unrolled/unwrapped or held its shape.

If the sample opened/unwrapped within a minute of being released, during sliding it off the pipe, or when lifted by the trailing edge, the sample was deemed "not interlocking". If the sample held its tubular shape during and after sliding it off the pipe and when lifted by the trailing edge, then it was deemed interlocking. The test was repeated 10 times for each sample.

The undulations also create structures that can absorb energy in a spring-like fashion without significant plastic deformation. When double slit patterns are cut into a two-dimensional article (such as, for example, paper) and tension is applied to the article along the tension axis (T), portions of the two-dimensional article undulate or move into the z-axis (the axis perpendicular to the original plane of the two dimensional article), resulting in the formation of a three-dimensional article. In some embodiments, the slit or flap shapes described herein amplify the out-of-plane motion of the materials or articles as compared to the prior art slits shapes and/or orientations of FIGS. 1A-3B. In some embodiments, the materials into which the double slit patterns are formed are substantially non-extensible. In some embodiments, the double slit patterns continue through and are truncated by at least one edge of the material without stopping or changing. The resulting materials and/or articles offer a wide variety of advantages.

FIG. 4A is a schematic drawing of an exemplary double slit pattern. The pattern 400 includes a plurality of slits 410 in rows of slits 412. Each slit 410 includes a midpoint 418 between a first terminal end 414 and a second terminal end 416. A first row 412a of slits 410 and a second row 412b of slits 410 each include a plurality of slits 410 that are spaced from one another. The axial space between directly adjacent slits 410 in a row 412 in combination with the adjacent portions of the transverse beam 430 can form an axial beam 420 between adjacent slits 410 in a row 412. In the exemplary embodiment of FIG. 4A, a straight, imaginary line extends between and connects terminal ends 414, 416. In this exemplary embodiment, the straight, imaginary line extending between and connecting the terminal ends of a first slit is substantially colinear with the straight, imaginary line extending between and connecting the terminal ends of a directly adjacent second slit in the same row. In this exemplary embodiment, all of the straight, imaginary lines extending between and connecting the slit terminal ends in a single row are approximately colinear.

Together, rows 412a, 412b of slits 410 form a transverse beam 430. Transverse beam 430 is bound in the axial direction by slits 410. An overlap beam 436 is directly adjacent to and, in this embodiment, on both sides of each transverse beam 430. Overlap beam 436 is bound in the axial direction by non-aligned slits. The slits in each directly adjacent row 412a, 412b that forms an edge or side of transverse beam 430 are substantially aligned with one another such that they are substantially parallel and their terminal ends 414, 416 are substantially aligned perpendicular to the axis of the row and equidistant to one another. In some embodiments, the slits that are aligned have substantially the same slit length and pitch (pitch being relative to the tension axis).

Each section of transverse beam 430 bordered by two parallel and substantially aligned slits 410 includes a midpoint 432 that is (1) at the midpoint (transversely) between first terminal end 414 and a second terminal end 416 of the slits 410 that form the sides of transverse beam 430 and (2) at the midpoint (axially) between the two slits 410 that form the sides of transverse beam 430. A midpoint 432a of a first section of transverse beam 430a is out of phase with a midpoint 432b of the directly adjacent section of the directly adjacent transverse beam 430b. In the embodiment of FIG. 4A, the midpoint 432a of a first section of transverse beam 430a substantially aligns axially with midpoint 432c of a first section of transverse beam 430c, which is the second directly adjacent transverse beam from transverse beam 430a.

FIG. 4A also shows the tension axis (T) which is substantially parallel to the axial direction and substantially perpendicular to the transverse direction, and the direction of the rows of slits, in the embodiment of FIG. 4A. The tension axis (T) is an axis along which tension can be provided to deploy the material into which the pattern 400 has been formed, which creates the upward and downward movement of transverse beams 430 and rotation of overlap beams 436.

Figure 4B:
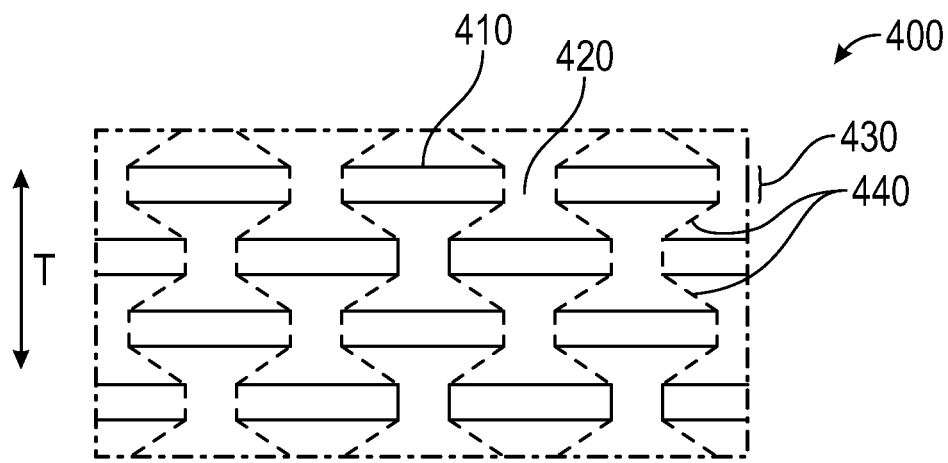
FIG. 4B is a top view schematic drawing of the primary tension lines of the double slit pattern shown in FIG. 4A when exposed to tension.

FIG. 4B shows the primary tension lines 440 (e.g., the lines approximating the highest tensile stress path) formed when an article including the slit pattern of FIG. 4A is deployed with tension along the tension axis T. FIG. 4B shows in dashed lines the primary tension lines 440, which are where the greatest tensile stress will occur. Tension lines are imaginary paths through the material that carry the greatest load when tension is applied to the material along the tension axis. When tension is applied along tension axis (T), the primary tension lines 440 move more closely into alignment with the applied tension axis, causing the sheet to distort. When multi-slit patterns are deployed, the activation of tension along the primary tension lines 440 causes substantially all regions of the pattern to experience some tension or compression (tensile stress or compressing stress) and then many of the regions buckle and bend out of the plane of the original two-dimensional film.

When tension is applied to a material, sheet, or film including a double slit pattern, the portions of the transverse beam 430 between pairs of aligned slits 410 experience primarily compressive stress, which causes the beam 430 to buckle out of the original plane of the sheet forming an undulation or a loop shape, while staying nominally parallel to the tension axis. Overlap beams 436 buckle and bend out of the plane of the original material or sheet as they experience these tensile forces. In the transverse beams 430 only the region between the pairs of slits, called the axial beam 420, experiences the tension (and tensile stress) and transmits it to the next row 412 of slits 410. The axial beam 420 between directly adjacent slits 410 in a single row 412 in combination with the adjacent portions of the transverse beam 430 is marked with dashed lines on the edges where the greatest stress occurs. These tension bearing regions remain relatively flat and parallel to the pretensioned plane of the material or sheet when tension is applied. These tension bearing regions do not to rotate because the tension lines through them are substantially parallel to the primary tension axis (T).

Figure 5A:
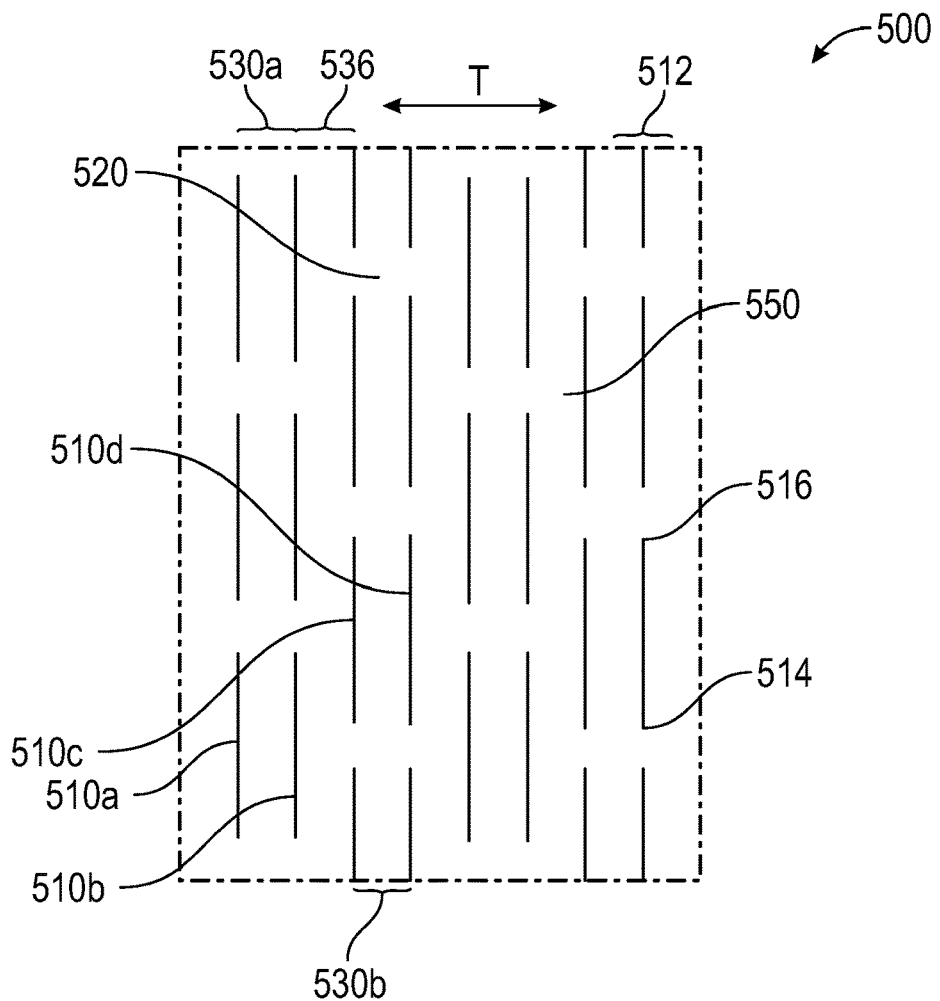
FIG. 5A is a top view schematic drawing of an exemplary double slit pattern.

An example of a double slit pattern is shown in FIG. 5A, which is a top view schematic drawing of a material including a double slit pattern similar to the one shown in FIG. 4A. Material 500 includes slits 510a, 510b, 510c, 510d. Together, slits 510a and 510b form a double slit. Also, together, slits 510c and 510d form another double slit. Slits 510a and 510b form sides or edges of a portion of a first transverse beam 530a. Slits 510b and 510c form sides or edges of a portion of overlap beam 536. Slits 510c and 510d form sides or edges of a portion of a second transverse beam 530b. A first transverse beam 530a is directly adjacent to an overlap beam 536. The overlap beam 536 is directly adjacent to a second transverse beam 530b. Slits 510a and 510b are substantially aligned with one another. Slits 510c and 510d substantially aligned with one another. Slits 510b and 510c are not aligned with one another. Instead, slits 510b and 510c are phase separated or spaced from one another. In the embodiment of FIG. 5A, slits 510 are substantially perpendicular to the tension axis T.

Figure 5B:
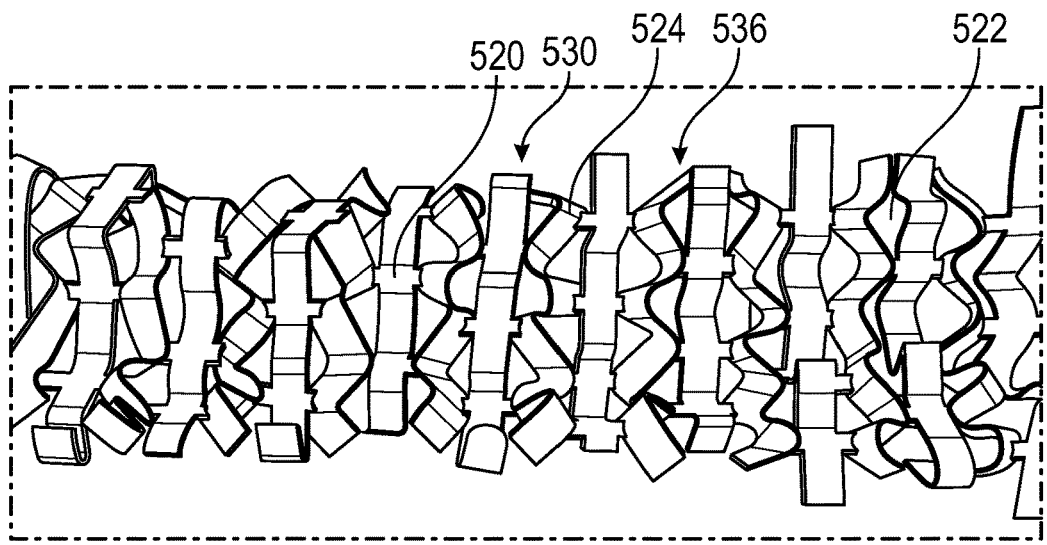
FIG. 5B is a nearly top view drawing from a photograph of the double slit pattern of FIG. 5A formed in a paper sheet and exposed to tension along the tension axis.
Figure 5C:
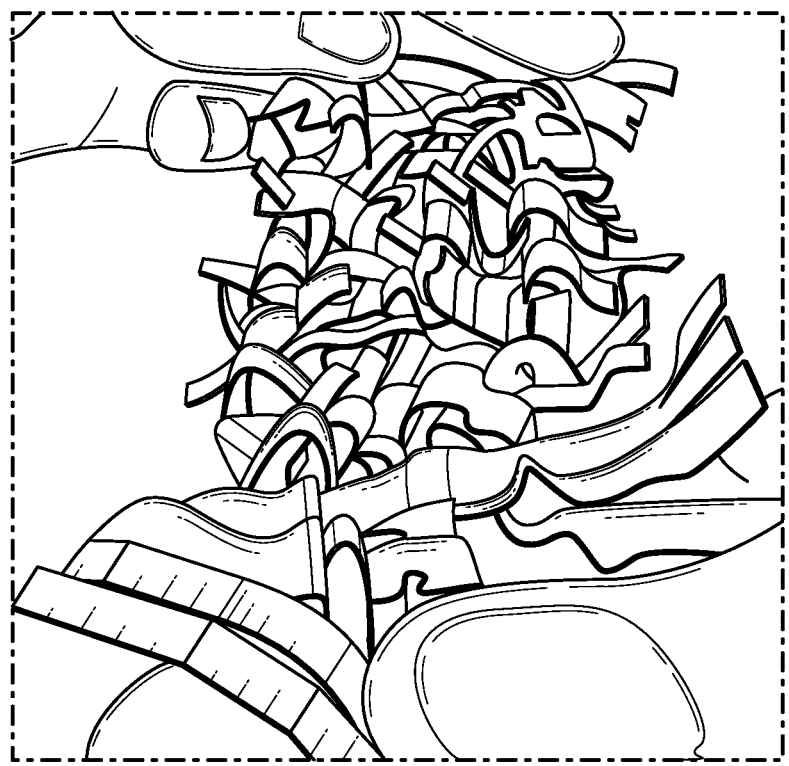
FIG. 5C is a nearly side of view drawing from a photograph of the double slit pattern of FIG. 5A formed in a paper sheet and exposed to tension along the tension axis.

FIGS. 5B and 5C are drawings of a material including the slit pattern of FIG. 5A when exposed to tension along tension axis T. When material 500 is tension activated or deployed along tension axis T, portions of material 500 experience tension and/or compression that causes material 500 to move out of the original plane of material 500 in its non-tensioned format. When exposed to tension along the tension axis, terminal ends 514, 516 experience compression and are drawn toward one another, causing a flap region 550 of the material 500 to move or buckle upward relative to the plane of the material 500 in its pretensioned state (FIG. 5A), creating a flap 524. Portions of transverse beams 530 directly between substantially aligned adjacent beams undulate out of the original plane of the material 500 in its pretensioned state (FIG. 5A) forming loops, while staying nominally parallel to the tension axis. The axial beam 520 between adjacent slits 510 in a row 512 in combination with the adjacent portions of the transverse beam 530 stays substantially parallel to the original plane of material 500 in its pretensioned state (FIG. 5A). Overlap beams 536 buckle and rotate out of the plane of the original material or sheet. The motion of the flap region 550 in combination with the undulation of the transverse beams 530 creates open portions 522.

Those of skill in the art will appreciate that many changes may be made to the pattern and material while still falling within the scope of the present disclosure. For example, in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. Many of these changes could change the deployment pattern.

When the tension-activated material 500 is wrapped around an article or placed directly adjacent to itself, the transverse beams 530 and/or flaps 524 interlock with one another and/or opening portions 522, to create an interlocking structure. Interlocking can be measured as stated in the interlocking test articulated above.

Figure 6A:
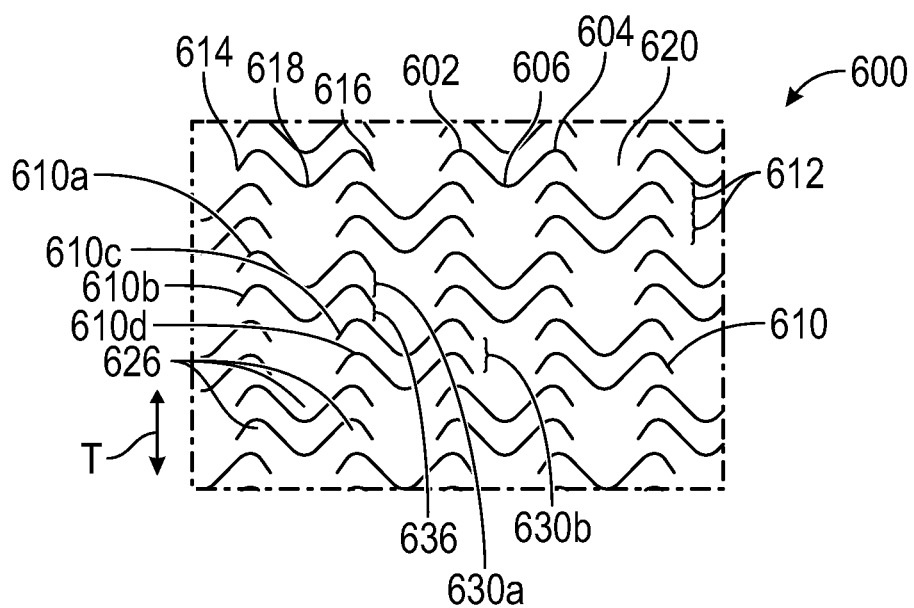
FIG. 6A is a top view schematic drawing of an exemplary double slit pattern.

One exemplary embodiment of another double slit pattern is shown schematically in FIG. 6A. The double-slit pattern is formed in material 600 and includes a plurality of slits 610 that each include a first terminal end 614, a second terminal end 616, and a midpoint 618. A plurality of individual slits 610 are aligned to form rows 612 that are generally perpendicular to tension axis T. "Generally perpendicular" is defined herein as encompassing angles within a 5-degree margin of error or within a 3-degree margin of error. Material defining an axial beam 620 is present between adjacent slits 610 in a row 612 in combination with the adjacent portions of the transverse beam 630. In the exemplary embodiment of FIG. 6A, slits 610 are not straight lines (like slits 510 of the slit pattern of FIG. 5A) but are instead curved slits including two maxima 602, 604 and one minima 606. The maxima and minima are examples of extrema, wherein an extremum is defined as a region of the slit that defines an axial peak 602, 604 or an axial valley 606. The maxima 602, 604 and minima 606 are spaced from the imaginary straight line extending between terminal ends 614 and 616. The flap regions 626 are generally the areas enclosed by the path of slit 610 and the imaginary straight line between terminal ends 614 and 616.

Material 600 includes slits 610a, 610b, 610c, 610d. Slits 610a and 610b form sides or edges of a portion of a first transverse beam 630a. Slits 610b and 610c form sides or edges of a portion of overlap beam 636. Slits 610c and 610d form sides or edges of a portion of a second transverse beam 630b. A first transverse beam 630a is directly adjacent to an overlap beam 636. The overlap beam 636 is directly adjacent to a second transverse beam 630b. Slits 610a and 610b are substantially aligned with one another. Slits 610c and 610d substantially aligned with one another. Slits 610b and 610c are not aligned with one another. Instead, slits 610b and 610c are phase separated or spaced from one another. In the embodiment of FIG. 6A, slits 610 are substantially perpendicular to the tension axis T.

In this exemplary embodiment, the slits are "simple slits," which are defined herein as slits having exactly two terminal ends. In some other embodiments, at least a portion of the slits can be "compound slits," which are slits having more than two terminal ends. In the current example, a straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit in the same row. In this exemplary embodiment, all of the straight, imaginary lines extending between and connecting the slit terminal ends in a single row are approximately colinear.

Figure 6B:
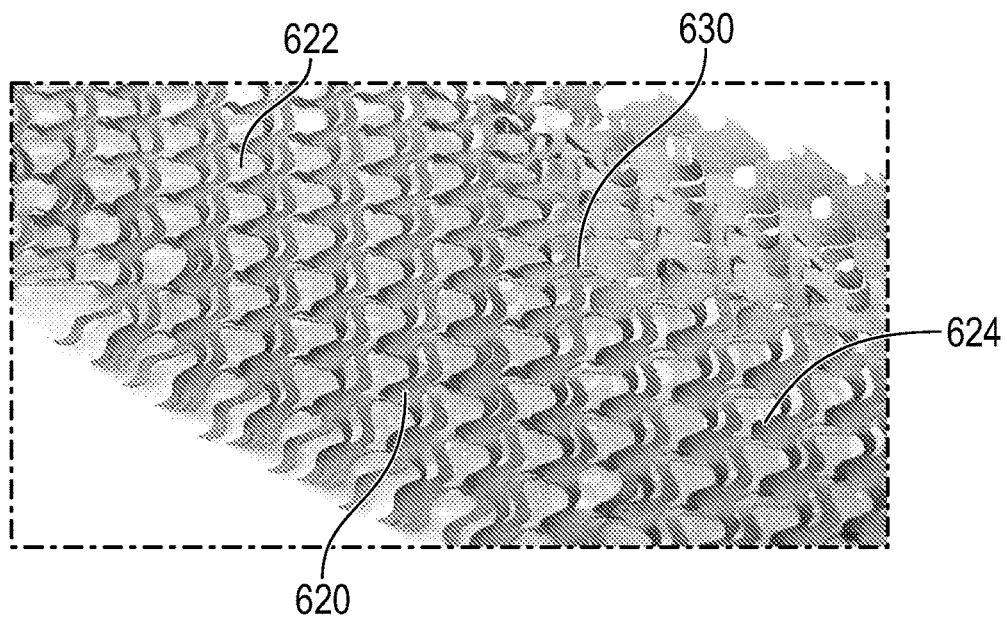
FIG. 6B is a perspective view photograph of the pattern shown in FIG. 6A formed in a paper sheet and exposed to tension along the tension axis.
Figure 6C:
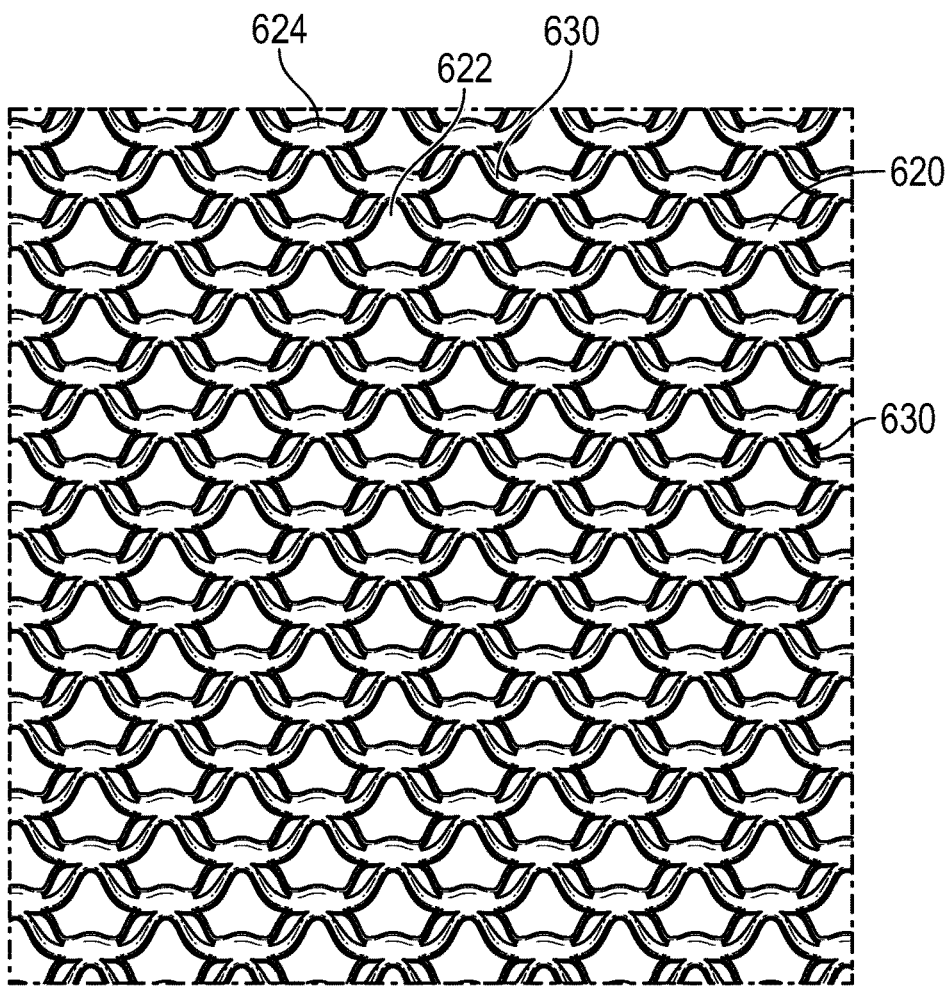
FIG. 6C is a nearly top view drawing from a photograph of the double slit pattern of FIG. 6A formed in a paper sheet and exposed to tension along the tension axis.
Figure 6D:
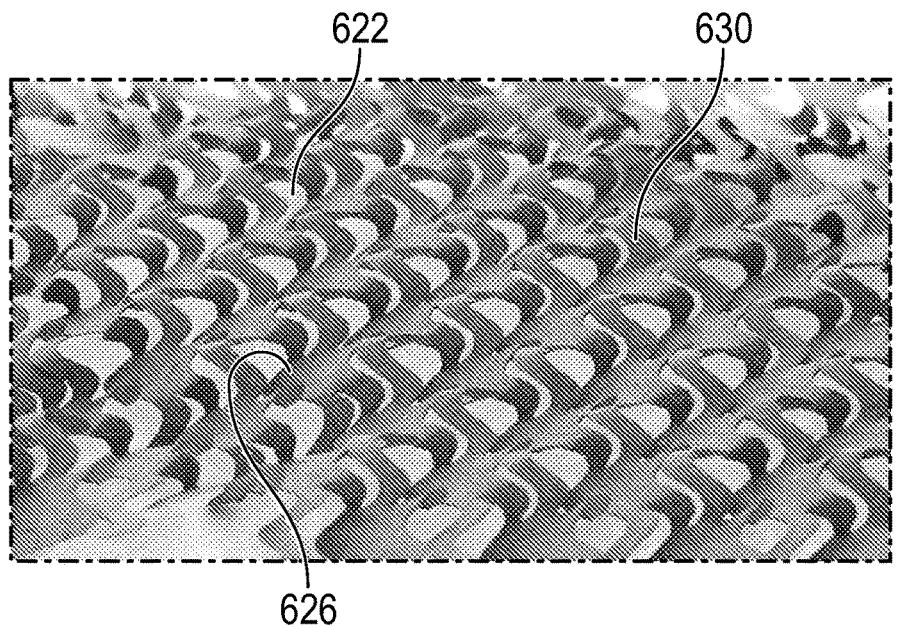
FIG. 6D is a nearly side of view photograph of the double slit pattern of FIG. 6A formed in a paper sheet and exposed to tension along the tension axis.

FIGS. 6B and 6C show a material including the slit pattern of FIG. 6A when exposed to tension along tension axis T. When material 600 is tension activated or deployed along tension axis T, portions of material 600 experience tension and/or compression that causes material 600 to move out of the original plane of material 600 in its non-tensioned format. When exposed to tension along the tension axis, terminal ends 614, 616 experience compression and are drawn toward one another, causing a flap region 626 of the material 600 to move or buckle upward relative to the plane of the material 600 in its pretensioned state (FIG. 6A), creating a flap 624. Portions of transverse beams 630 undulate out of the original plane of the material 600 in its pretensioned state (FIG. 6A) forming loops, while staying nominally parallel to the tension axis. The axial beam 620 between adjacent slits 610 in a row 612 in combination with the adjacent portions of the transverse beam 630 stays substantially parallel to the original plane of the material 600 in its pretensioned state (FIG. 6A). Overlap beams 636 buckle and rotate out of the plane of the original material or sheet. The motion of the flap region 626 in combination with the undulation of the transverse beams 630 creates open portions 622.

Those of skill in the art will appreciate that many changes may be made to the pattern and material while still falling within the scope of the present disclosure. For example, in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. The degree of curvature shown in FIG. 6A and slit length can vary. Further, the degrees of offset or phase offset can vary from what is shown. The slit, row, or beam pitch can vary. The angle between the tension axis and slits can vary. Many of these changes could change the deployment pattern.

When the tension-activated material 600 is wrapped around an article or placed directly adjacent to itself, the beams 630 and/or flaps 624 interlock with one another and/or opening portions 622, to create an interlocking structure. Interlocking can be measured as stated in the interlocking test articulated above.

Figure 7A:
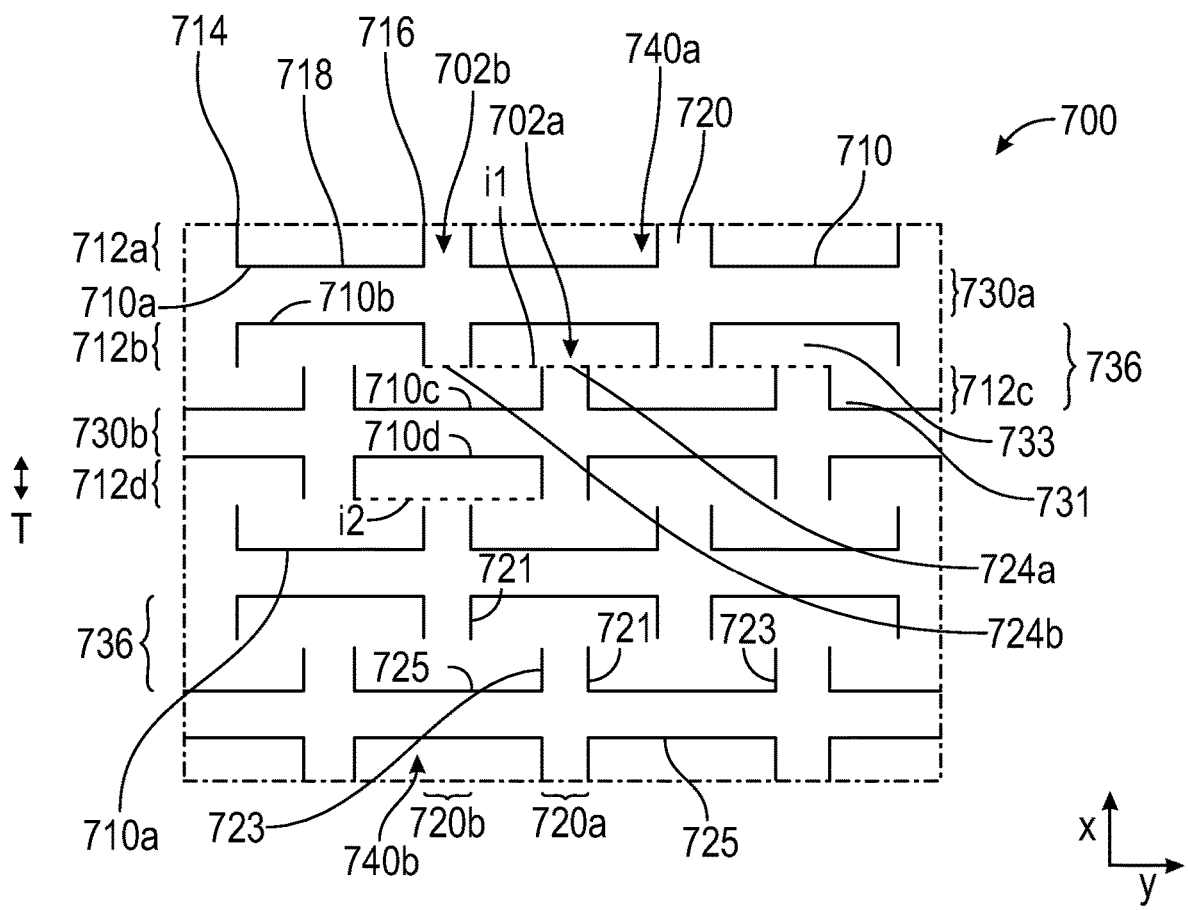
FIG. 7A is a top view schematic drawing of an exemplary double slit pattern.

One exemplary embodiment of another double slit pattern in a sheet of material 700 is shown schematically in FIG. 7A. The sheet of material 700 defines an axial direction x and a transverse direction y, where the axial direction is parallel to the tension axis T. The slit pattern of FIG. 7A shows that differing rows can have differently positioned slits. With specific reference to the implementation of this general concept into an example, the single-slit pattern of FIG. 7A includes a first set of rows 712a that include slits 710 of a first shape and position and a second set of rows 712b that includes the same slit shape but the slits 710 are positioned differently (in this case, inverted) and offset in the axial direction x. The slit shape in both the first set of rows 712a and the second set of rows 712b is substantially the same except for the inversion. In addition to being positioned differently, the slits of FIG. 7A are nested such that the terminal ends of the slits 710 in adjacent rows are aligned along a transverse axis, or the slits 710 in one row extend past an axis defined by the terminal ends of the slits 710 in an adjacent row creating a nested arrangement.

The double-slit pattern is formed in material 700 and includes a plurality of slits 710 that each include a first terminal end 714, a second terminal end 716, and a midpoint 718. A plurality of individual slits 710 are aligned to form rows 712 that are generally perpendicular to tension axis T. Material forming an axial beam 720 is present between adjacent slits 710 in a row 712 in combination with the adjacent portion(s) of the transverse beam 730. In the exemplary embodiment of FIG. 7A, slits 710 are not discrete straight lines (like slits 610 of the slit pattern of FIG. 6A) but instead include two generally axial portions 721, 723 that are generally parallel to the tension axis T and that are connected to a generally transverse portion 725 that is generally perpendicular to the tension axis T. In this embodiment, slits 710 are generally u-shaped and the intersection points of axial portions 721, 723 and generally transverse portion 725 are generally perpendicular to one another.

The plurality of slits 710 through the sheet 700 define a plurality of axially extending beams 720 arranged in columns along the axial length of the sheet. The plurality of slits 710 form a first plurality of axial beams 720a forming a first column 702a. A transverse portion 725 of a slit of the plurality of slits 710 is disposed axially between beams 720a. Unlike previously described examples, in this example each beam is not separated by a transverse portion 725 of a slit 710. Rather, each series of two beams 720a in the first column 702a alternates with a series of two transverse portions 725 of corresponding slits 710 in the column. As such, the first column 702a has a first group of slits 740a each having a transverse portion 725a that is axially between beams in the first plurality of beams 720a.

The plurality of slits 710 also define a second plurality of beams 720b extending in the axial direction x. The second plurality of beams 720b form a second column 702b extending across the sheet 700 in the axial direction x. The second plurality of beams 720b are spaced from the first plurality of beams 720a in the transverse direction y. Between beams 720b in the axial direction x is a transverse portion 725 of a slit in a second group of slits 740b of the plurality of slits 710. Similar to the first column 702a, in this example in the second column 702b there is a series of two consecutive beams 720b alternating with two consecutive transverse portions 725 of slits along the length of the column 702b.

The first plurality of beams 720a and the second plurality of beams 720b are staggered in the axial and transverse directions. In the current example, each slit in the first group of slits 740a has an axial portion 721 (the first axial portion 721) that defines a beam in the second plurality of beams 720b. Each slit in the second group of slits 740b of the plurality of slits 710 has an axial portion 723 (the second axial portion 723) that defines a beam in the first plurality of beams 720a. Each beam of the first plurality of beams 720a is aligned with axis (i1, as an example) defined by a terminus 724b of a beam of the second plurality of beams 720b.

In the current embodiment, the sheet of material 700 defines a plurality of slits 710 that define a first plurality of beams 720a in a first column 702a and a second plurality of beams 720b in a second column 702b. The first column 702a and the second column 702b alternate across the width of the sheet in the transverse direction y. In other words, the first plurality of beams 720a and the second plurality of beams 720b form a repeating pattern of beams across the transverse width of the sheet of material 700. In some embodiments, the plurality of slits 710 can similarly define a third plurality of beams defining a third column that alternates with the first column 702a and the second column 702b across the width of the sheet. In some embodiments, the plurality of slits 710 can similarly define a fourth plurality of beams defining a fourth column that alternates with the first column 702a, the second column 702b, and the third column across the width of the sheet.

Material 700 includes first slits 710a, second slits 710b, third slits 710c, and fourth slits 710d, each forming a corresponding first row 712a, second row 712b, third row 712c and fourth row 712d, respectively. Each row of slits extends across the width of the sheet of material 700 in the transverse direction y. The first row 712a, second row 712b, third row 712c and fourth row 712d form a repeating pattern of rows along the axial length of the sheet of material 700. In the current example, the second slits 710b are nested with the third slits 710c and the first slits 710a are nested with the fourth slits 710d. As such, a first terminal end segment (corresponding to the first axial portion 721) defining the first terminal end 714 of each slit in the second plurality of slits 710b intersects an imaginary line i1 connecting the terminal ends 714, 716 of a slit in the third plurality of slits 710c. More particularly, a first terminal end 714 of each slit in the second plurality of slits 710b is aligned with the imaginary line i1 connecting the terminal ends 714, 716 of a slit in the third plurality of slits 710c. Similarly, a first terminal end segment (corresponding to the first axial portion 721) defining the first terminal end 714 of each slit in the first plurality of slits 710a intersects an imaginary line i2 connecting the terminal ends 714, 716 of a slit in the fourth plurality of slits 710d. In particular, a first terminal end 714 of each slit in the first plurality of slits 710a is aligned with the imaginary line i2 connecting the terminal ends 714, 716 of a slit in the fourth plurality of slits 710d.

First slits 710a and second slits 710b form transverse sides or edges of a portion of a first transverse beam 730a. The first transverse beam 730a extends across the transverse width of the material 700. The length of the first transverse beam 730a across the width of the material is uninterrupted by intervening slits. The second slits 710b and the third slits 710c form a folding wall region 736. The third slits 710c and the fourth slits 710d form transverse sides or edges of a portion of a second transverse beam 730b. The transverse beam 730a is directly adjacent to folding wall region 736. The folding wall region 736 is directly adjacent to the second transverse beam 730b. The folding wall region generally includes all the area enclosed by the second slits 710b and the third slits 710b, which excludes the axial beams 720 between adjacent slits 710b,710c. The transverse beams 730a and 730b are directly adjacent folding wall region 736. In particular, the folding wall region 736 is between the first transverse beam 730a and the second transverse beam 730b. Slits 710a and 710b are substantially aligned with one another. Slits 710c and 710d substantially aligned with one another. Slits 710b and 710c are not aligned with one another. Instead, slits 710b and 710c are phase separated or spaced from one another. In the embodiment of FIG. 7A, slits 710 are substantially perpendicular to the tension axis T.

When the slits 710 are inverted relative to one another in directly adjacent rows, this creates the opportunity for them to align with or move past one another such that one or more of the terminal ends 714, 716 of a slit 710 align along a transverse axis T with the terminal ends 714, 716 of a slit 710 in a directly adjacent row. These unique patterns create unique beam widths, sizes, and shapes. Because the terminal ends 714, 716 of slits 710 in directly adjacent rows 712a and 712b align transversely to approximate an imaginary, essentially straight, single line perpendicular to the tension axis T, the size and shape of beams varies from the embodiments previously described herein. The continuous transverse region between the generally transverse portions 725 (which are substantially perpendicular to the tension axis T) forms a transverse beam 730. This beam only occurs once between every two sets of transversely aligned, directly adjacent rows 712a and 712b. Transversely aligned, directly adjacent rows 712a and 712b are arranged such that there is no continuous transverse region between the terminal ends 714, 716 of slits 710 in the directly adjacent, transversely aligned row. The area of material 700 into which the slits 710 with transversely aligned terminal ends 714, 716 extend, subtracting the axial beam 720 between adjacent slits 710, comprises a folding wall region 736. The folding wall region 736 can be further described as having two generally rectangular regions 731 and 733, where rectangular region 731 is bound by (1) directly adjacent generally transverse portions 725 of slits 710 which are perpendicular to the tension axis and (2) adjacent axial portions 721 and 723 on directly adjacent, opposing slits 710. The axial beam 720 is present between adjacent slits 710 in a single row 712. Directly adjacent the axial beam 720 is a region 733 which is the remaining material in the folding wall region 736 bounded in the axial direction x by the beam 720 and the generally transverse portion 725 and bounded in the transverse direction y by the two generally rectangular regions 731, more specifically by the axial extensions of the adjacent axial portions 721 and 723.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a single row are approximately colinear.

Figure 7B:
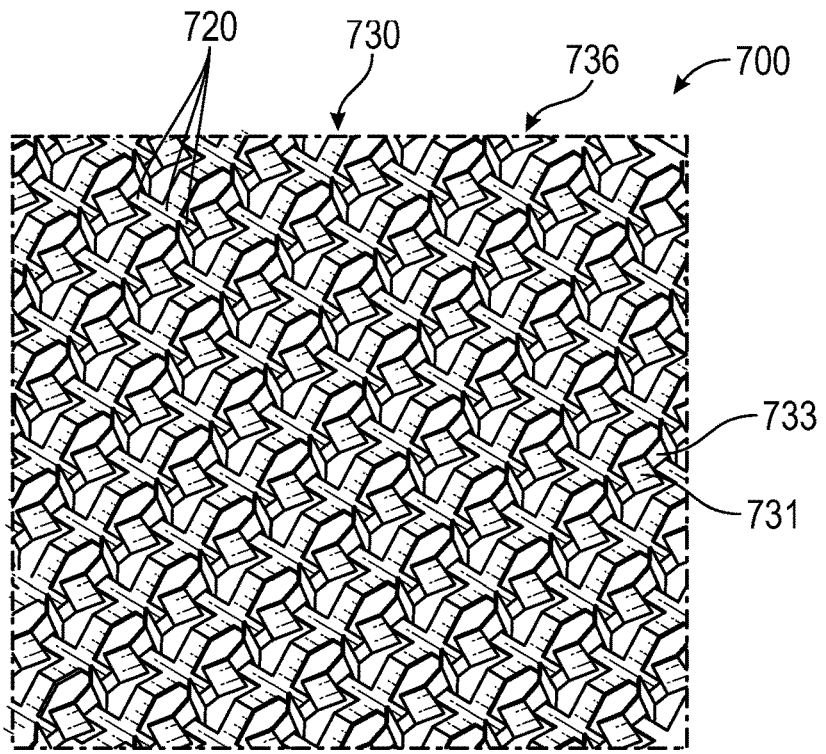
FIG. 7B is a perspective view drawing from a photograph of the pattern shown in FIG. 7A formed in a paper sheet and exposed to tension along the tension axis.
Figure 7C:
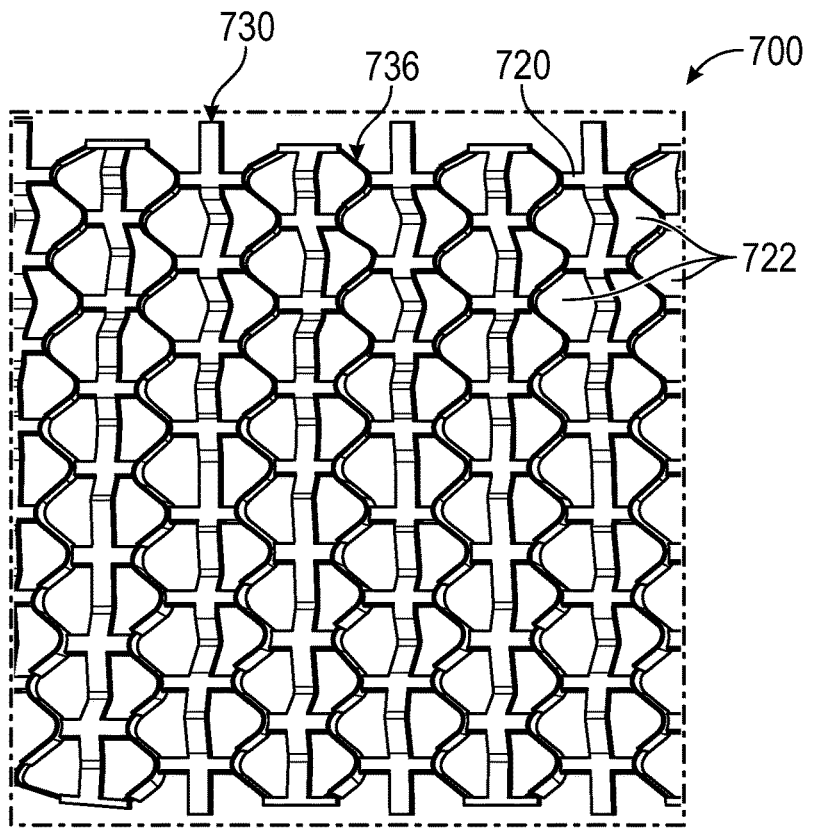
FIG. 7C is a nearly top view drawing from a photograph of the double slit pattern of FIG. 7A formed in a paper sheet and exposed to tension along the tension axis.
Figure 7D:
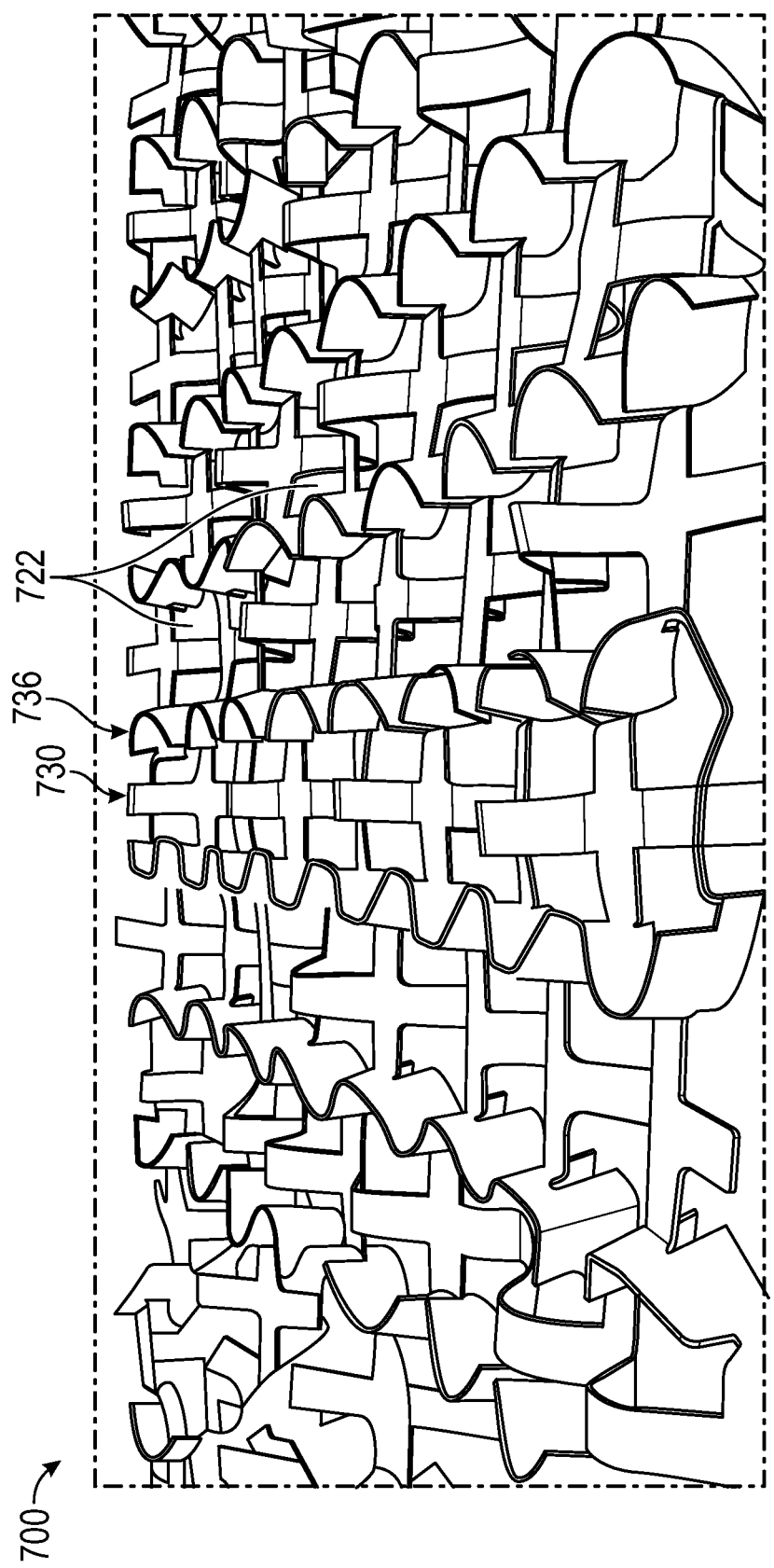
FIG. 7D is a nearly side of view drawing from a photograph of the double slit pattern of FIG. 7A formed in a paper sheet and exposed to tension along the tension axis.

FIGS. 7B-7D show a material including the slit pattern of FIG. 7A when exposed to tension along tension axis T. When material 700 is tension activated or deployed along tension axis T, portions of material 700 experiences tension and/or compression that causes the material to move out of the original plane of material 700 in its non-tensioned format. When exposed to tension along the tension axis, the transverse beams 730 bend into a shape that undulates to bring the axial beam 720 between adjacent slits closer to the adjacent beam 720 in the same row, while keeping the terminal ends 714 and 716 approximately in a single plane that is parallel to the original plane of material 700 in its pretensioned state. The undulating transverse beam 730 is parallel to the tension axis, specifically any line drawn parallel to the tension axis on the transverse beam 730 in the pretensioned state will still be substantially parallel to the tension axis in the tensioned state. In other words, each undulating slit surface is substantially a single curved line that was extended along the tension axis. The folding wall region 736 rotates and folds into an accordion-like shape such that all of the two generally rectangular regions 731 and region 733 are nominally flat, have folds between all adjacent generally rectangular regions 731 and regions 733, and all flat surfaces are nominally orthogonal to the original plane of material 700 in its pretensioned state. The portion of the axial beam 720 between adjacent slits 710 in a row 712 primarily experiences tension aligned with tension axis T, and this tension is balanced by the adjacent portion of beam 720 that adjoins the same transverse beam 730 so this region or area tends to stay flat and parallel to the original plane of material 700 in its pretensioned state. These movements in material 700 form two distinct folded beams, 1) undulating beams 730 that are parallel to the tension axis, and 2) folding wall regions 736 that are orthogonal to the original plane of material 700 in its pretensioned state, as seen in FIG. 7D.

Embodiments like the specific implementation of FIGS. 7A-7D have unique benefits. For example, FIGS. 7A-7D exemplify one set of embodiments in which portions of the material rotate to the normal axis (substantially 90° or orthogonal to the original plane of material 700 in its pretensioned state) when deployed or tension-activated. Additionally, some of these embodiments can withstand exposure to greater loads applied in the normal axis relative to other multi-slit patterned structures without being crushed. This means that they can provide increased or enhanced protection for things like packages being shipped and other applications. Another advantage to multi-slit patterns like the specific implementation shown in FIGS. 7A-7D is that once the construction is in its deployed (via application of tension) position, the construction substantially remains in its extended/tensioned position even once the tension is no longer applied. This feature can provide a more stable construction. Some of these benefits are a result of the increased strength of the folded wall geometry. The folded wall, or accordion shaped wall, or rotating/folding beam has a large area moment of inertia (also called moment of area or second moment of inertia) in the deployed article (deployed via the application of tension or force) where the area moment of inertia is in the plane of the original sheet. The area moment of inertia is increased relative to a straight vertical wall without folds.

Those of skill in the art will appreciate that many changes may be made to the pattern and material while still falling within the scope of the present disclosure. For example, the terminal ends of one row of slits instead of being colinear with the terminal ends of an adjacent row of slits could move past the terminal ends of the adjacent row of slits creating a nested or overlapping pattern of slits. In some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. The degree of curvature and slit length can vary. Further, the degrees of offset or phase offset can vary from what is shown. The slit, row, or beam pitch can vary. Further, the pattern can alternate in 2 rows, 3 rows, 4 rows, etc. The angle between the tension axis and slits can vary. Many of these changes could change the deployment pattern.

When the tension-activated material 700 is wrapped around an article or placed directly adjacent to itself, undulating beams 730 and/or folding wall regions 736 interlock with one another and/or opening portions 722, to create an interlocking structure. Interlocking can be measured as stated in the interlocking test articulated above.

Figure 8A:
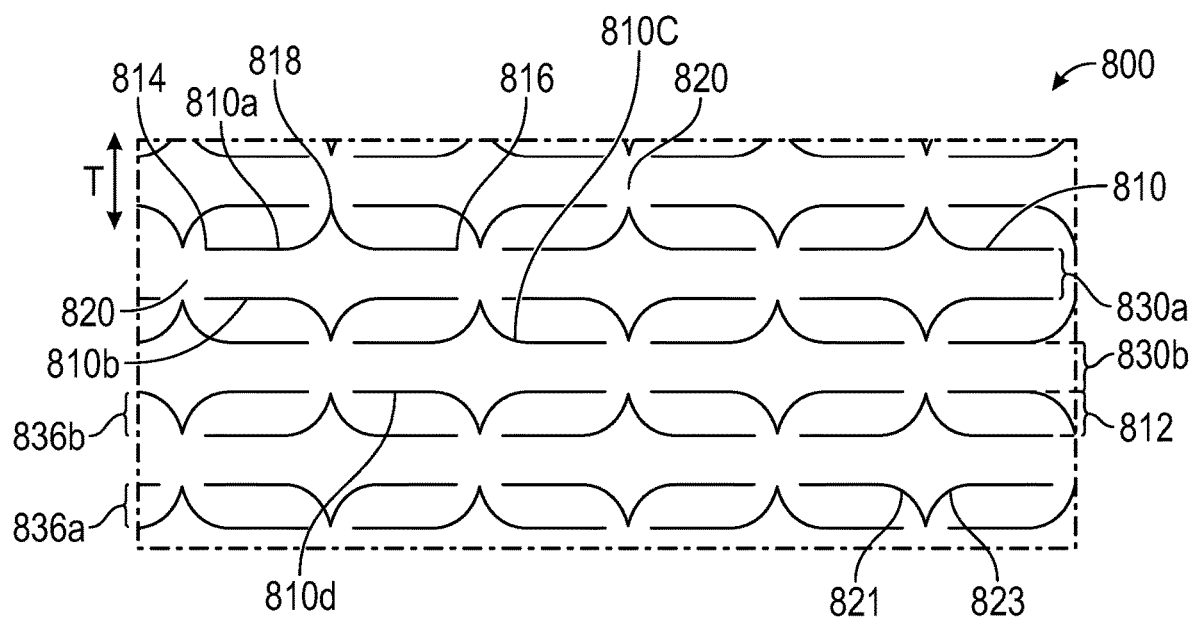
FIG. 8A is a top view schematic drawing of an exemplary double slit pattern.

One exemplary embodiment of another double slit pattern is shown schematically in FIG. 8A. The pattern of FIG. 8A shows that the slits can vary in position or shape within a row. In other words, the slits in a single row vary in shape and/or position, but the pattern is repeated in adjacent rows. With specific reference to the implementation of this general concept into an example, the slit pattern of FIG. 8A includes a first set of rows 812 that include slits 810 of a first shape and position and a second (inverted) shape and position. Slits 810 in a single row alternate in their shape/position such that first shape or position slit is next to second shape or position slit, and this pattern repeats down the row. The slit shape is substantially the same except for the inversion.

The double-slit pattern is formed in material 800 and includes a plurality of slits 810 that each include a first terminal end 814, a second terminal end 816, and a midpoint 818. A plurality of individual slits 810 are aligned to form rows 812 that are generally perpendicular to tension axis T. Material forming an axial beam 820 is present between adjacent slits 810 in a row 812 in combination with the adjacent portions of the transverse beam 830*a*, 830*b*. In the exemplary embodiment of FIG. 8A, slits 810 are not straight lines (like slits 510 of the slit pattern of FIG. 5A) but instead are generally v-shaped or cusp-shaped. Slits 810 comprise a curved first portion 821 that is generally at a 45-degree angle to tension axis T and that connects with curved second portion 823 at a generally oblique angle. First and second portions 821, 823 connect at midpoint 818.

Material 800 includes slits 810*a*, 810*b*, 810*c*, 810*d*. Slits 810*a* and 810*b* form sides or edges of a portion of a first transverse beam 830*a*. Slits 810*b* and 810*c* form sides or edges of a portion of a first overlap beam 836*a*. Slits 810*c* and 810*d* form sides or edges of a portion of a second transverse beam 830*b*. First transverse beam 830*a* is directly adjacent to the first overlap beam 836*a* and a second overlap beam 836*b*. The first overlap beam 836*a* and the second overlap beam are directly adjacent to the second transverse beam 830*b*. The first and second transverse beams 830*a* and 830*b* are directly adjacent to overlap beams 836*a*, 836*b*. Slits 810*a* and 810*b* are substantially aligned with one another. Slits 810*c* and 810*d* are substantially aligned with one another. Slits 810*b* and 810*c* are not aligned with one another. Instead, slits 810*b* and 810*c* are phase separated or spaced from one another. In the embodiment of FIG. 8A, slits 810 are substantially perpendicular to the tension axis T.

The continuous transverse region between the cusp-shaped slits 810 forms a transverse beam 830. This beam occurs once between every two adjacent rows 812 and 812. The overlap beams 836a, 836b includes the area between adjacent slits 810 in a row 812. An axial beam 820 is present between adjacent slits 810 in a single row 812 in combination with the adjacent portions of the transverse beam 830.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a single row are approximately colinear.

Figure 8B:
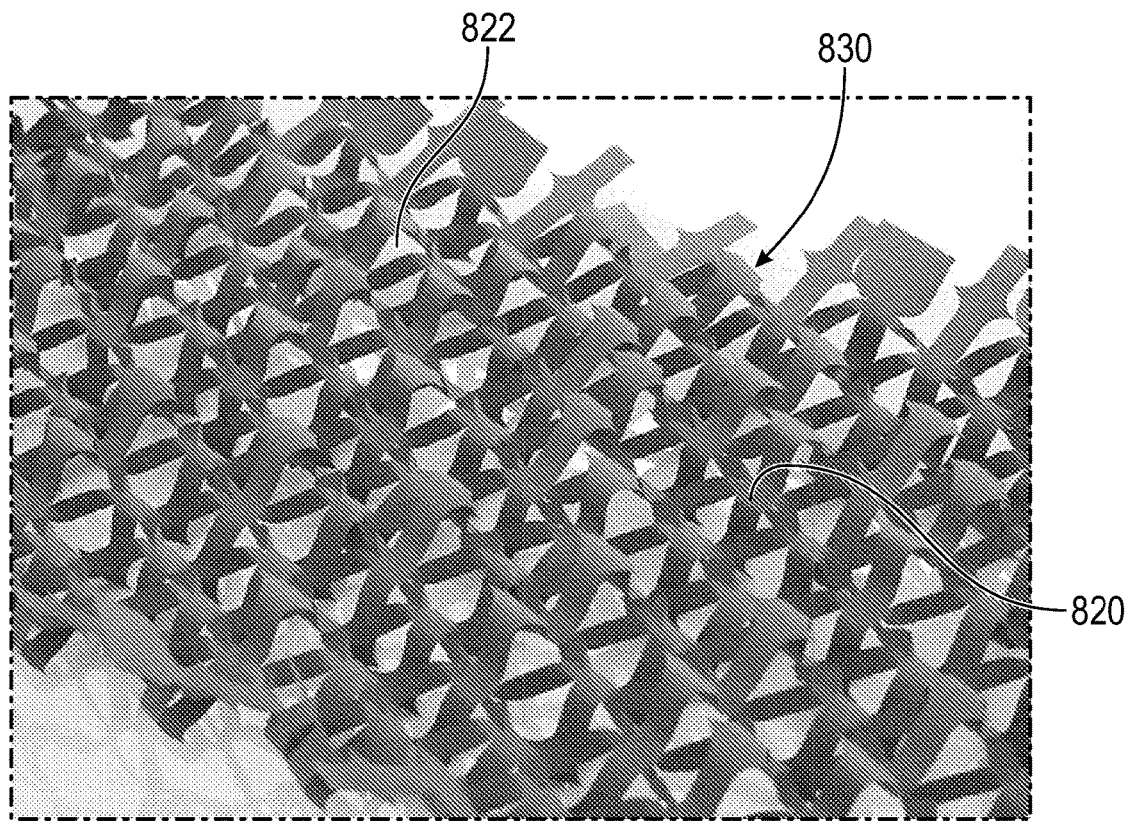
FIG. 8B is a perspective view photograph of the pattern shown in FIG. 8A formed in a paper sheet and exposed to tension along the tension axis.
Figure 8C:
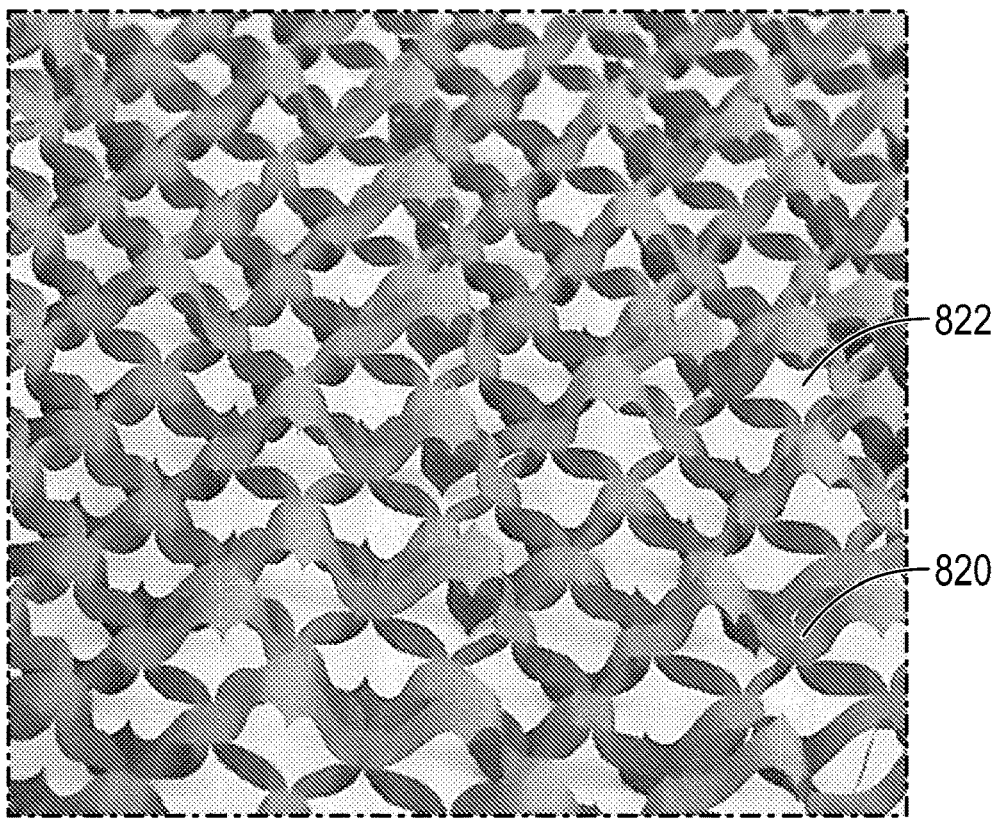
FIG. 8C is a nearly top view photograph of the double slit pattern of FIG. 8A formed in a paper sheet and exposed to tension along the tension axis.
Figure 8D:
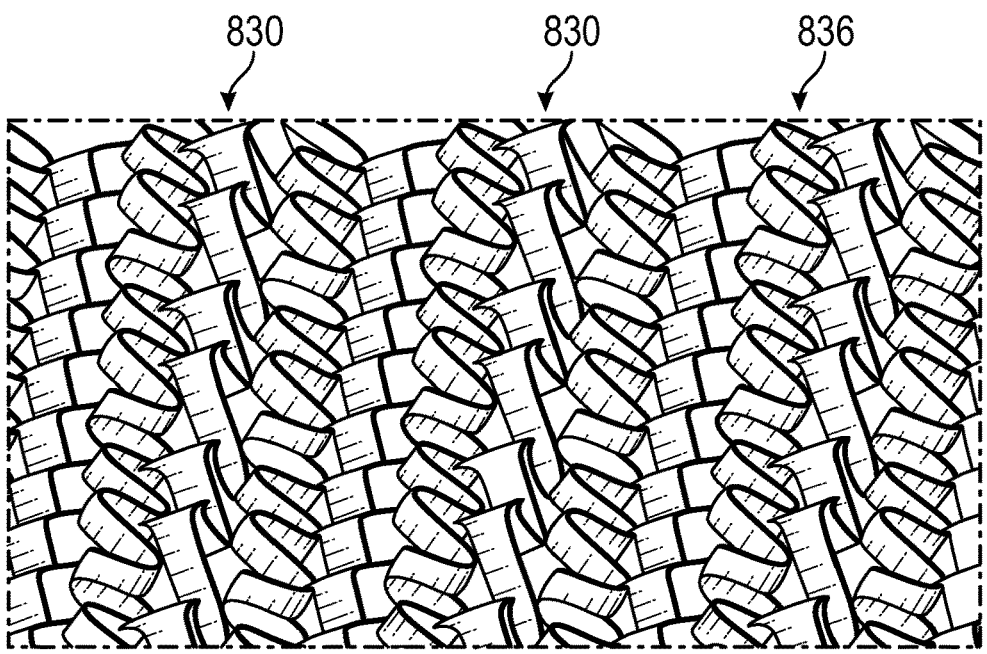
FIG. 8D is a nearly side of view drawing from a photograph of the double slit pattern of FIG. 8A formed in a paper sheet and exposed to tension along the tension axis.

FIGS. 8B-8D show a material including the slit pattern of FIG. 8A when exposed to tension along tension axis T. When material 800 is tension activated or deployed along tension axis T, portions of material 800 experience tension and/or compression that causes material 800 to move out of the original plane of material 800 in its non-tensioned format. When exposed to tension along the tension axis, terminal ends 814, 816 experience compression and are drawn toward one another, causing portions of transverse beams 830 undulate out of the original plane of the material 800 in its pretensioned state (FIG. 8A) forming loops, while staying nominally parallel to the tension axis. The material 820 between adjacent slits 810 in a row 812 in combination with the adjacent portions of the transverse beam 830 stays substantially parallel to the original plane of the material 800 in its pretensioned state (FIG. 8A). Overlap beams 836 buckle and rotate out of the plane of the original material or sheet. The motion of the overlap beam 836 in combination with the undulation of the transverse beams 830 creates open portions 822.

Those of skill in the art will appreciate that many changes may be made to the pattern and material while still falling within the scope of the present disclosure. For example, the terminal ends of one row of slits instead of being colinear with the terminal ends of an adjacent row of slits could move past the terminal ends of the adjacent row of slits creating a nested or overlapping pattern of slits. In some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. The degree of curvature shown in FIG. 8A and slit length can vary. Further, the degrees of offset or phase offset can vary from what is shown. The slit, row, or beam pitch can vary. Further, the pattern can alternate in 2 rows, 3 rows, 4 rows, etc. The angle between the tension axis and slits can vary. Many of these changes could change the deployment pattern.

When the tension-activated material 800 is wrapped around an article or placed directly adjacent to itself, the loops and undulations interlock with one another and/or opening portions 822, to create an interlocking structure. Interlocking can be measured as stated in the interlocking test articulated above.

Figure 9A:
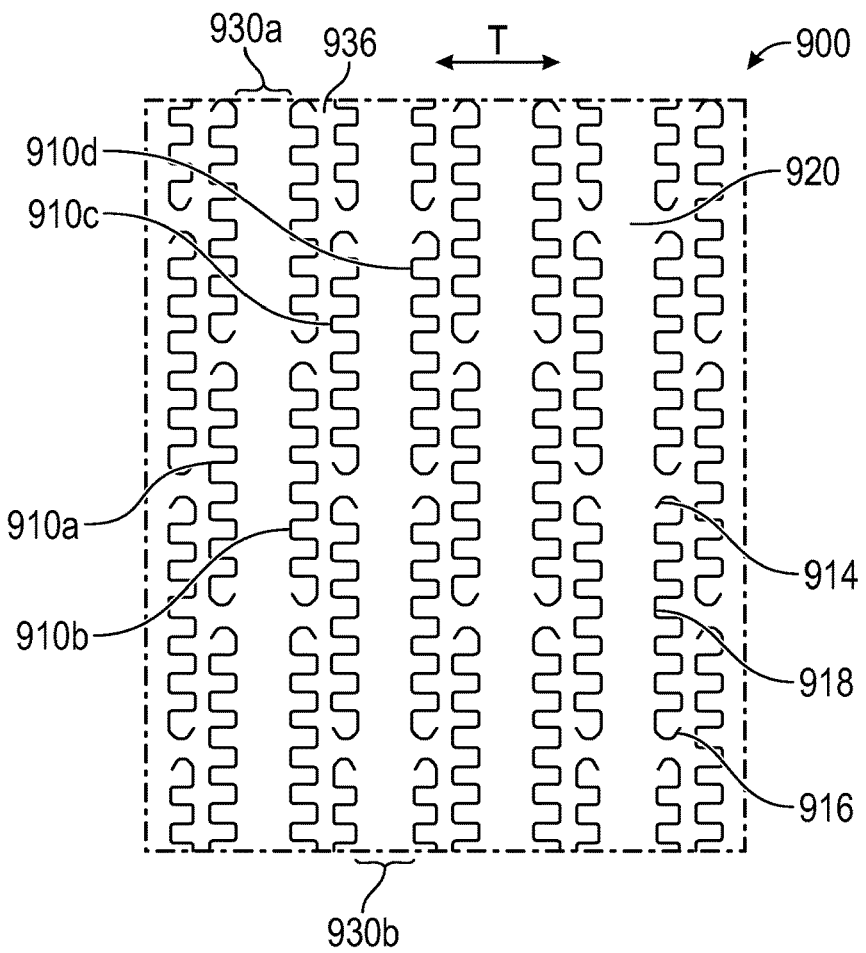
FIG. 9A is a top view schematic drawing of an exemplary double slit pattern including interlocking features.

Another example of a double slit pattern is shown in FIG. 9A, which is a top view schematic drawing of a material including a double slit pattern similar to the one shown in FIG. 5A except that the slits include enhanced interlocking structures or features instead of being linear slits. More specifically, material 900 includes slits 910a, 910b, 910c, 910d. Slits 910a and 910b form sides or edges of a portion of a first transverse beam 930a. Slits 910b and 910c form sides or edges of a portion of overlap beam 936. Slits 910c and 910d form sides or edges of a portion of a second transverse beam 930b. A first transverse beam 930a is directly adjacent to an overlap beam 936. The overlap beam 936 is directly adjacent to a second transverse beam 930b. Slits 910a and 910b are substantially aligned with one another. Slits 910c and 910d are substantially aligned with one another. Slits 910b and 910c are not aligned with one another. Instead, slits 910b and 910c are phase separated or spaced from one another. In the embodiment of FIG. 9A, slits 910 are substantially perpendicular to the tension axis T. In the specific embodiment of FIG. 9A, the slits 910 include or form rectangular-shaped hooks in the upper portion of the slit 910 and the lower portion of the slit 910. These square-wave hook features—and including them in both upper and lower portions of the slit—can result in excellent interlocking. These features can also be included in only one of the upper or lower portions and still provide excellent interlocking.

Further, in this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. The ends of the slits are curved.

Figure 9B:
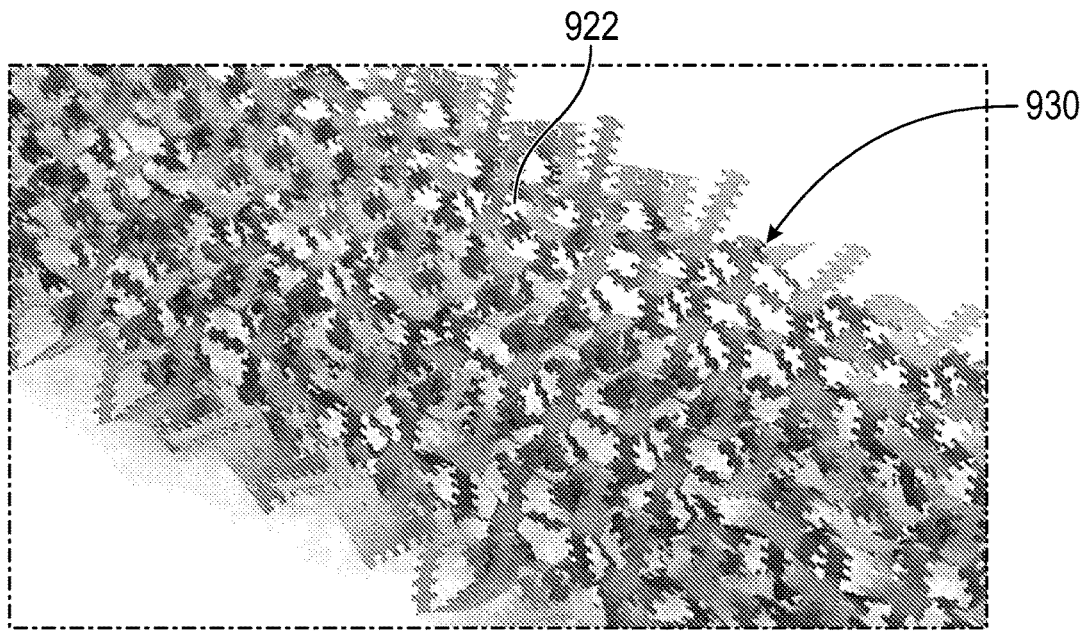
FIG. 9B is a perspective view photograph of the pattern shown in FIG. 9A formed in a paper sheet and exposed to tension along the tension axis.
Figure 9C:
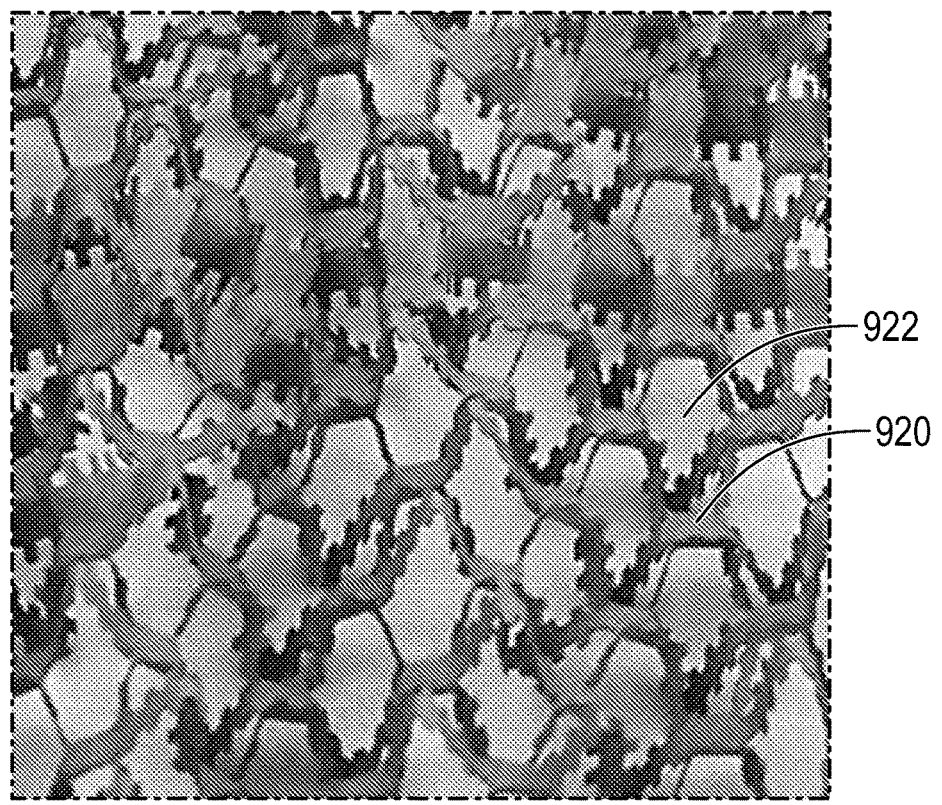
FIG. 9C is a nearly top view photograph of the double slit pattern of FIG. 9A formed in a paper sheet and exposed to tension along the tension axis.
Figure 9D:
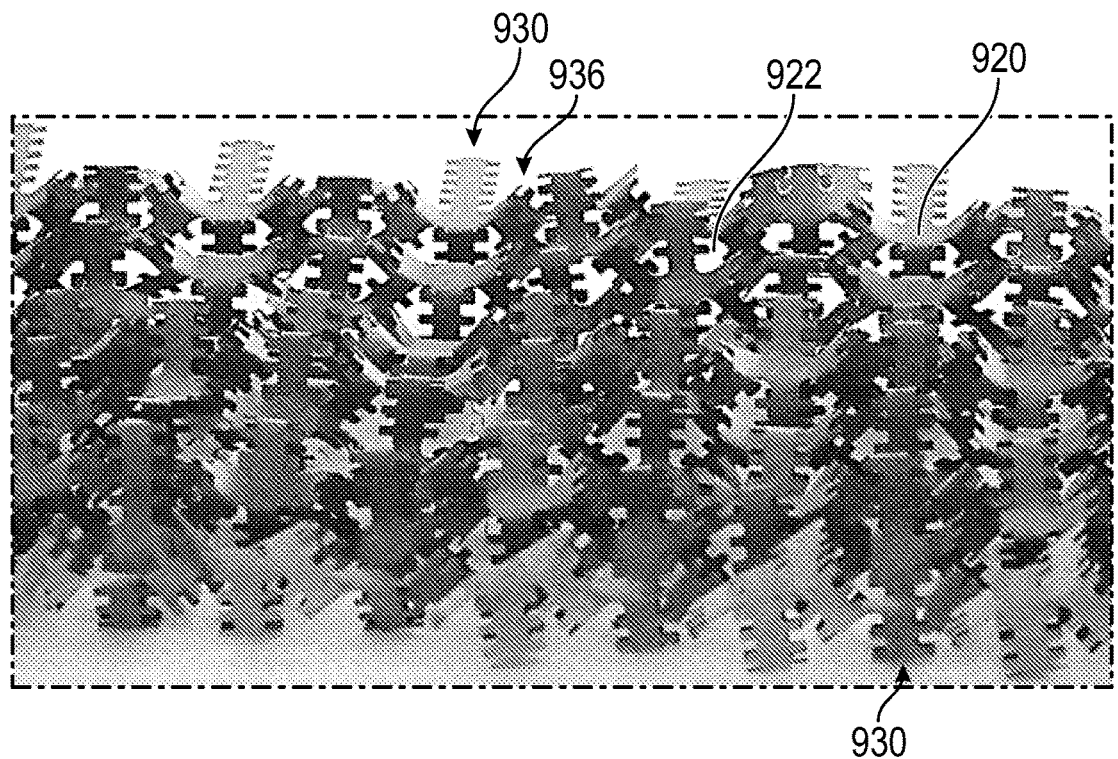
FIG. 9D is a nearly side of view photograph of the double slit pattern of FIG. 9A formed in a paper sheet and exposed to tension along the tension axis.

FIGS. 9B-9D are photographs of a material including the slit pattern of FIG. 9A when exposed to tension along tension axis T. When material 900 is tension activated or deployed along tension axis T, portions of material 900 experience tension and/or compression that causes material 900 to move out of the original plane of material 900 in its non-tensioned format. When exposed to tension along the tension axis, terminal ends 914, 916 experience compression and are drawn toward one another. Portions of transverse beams 930 undulate out of the original plane of the material 900 in its pretensioned state (FIG. 9A) forming loops, while staying nominally parallel to the tension axis. The material forming an axial beam 920 between adjacent slits 910 in a row 912 in combination with the adjacent portions of the transverse beam 930 stays substantially parallel to the original plane of material 900 in its pretensioned state (FIG. 9A). Overlap beams 936 buckle and rotate out of the plane of the original material or sheet. The motion of the overlap beam 936, in combination with the undulation of the transverse beams 930 creates open portions 922.

Those of skill in the art will appreciate that many changes may be made to the pattern and material while still falling within the scope of the present disclosure. For example, in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. Many of these changes could change the deployment pattern.

When the tension-activated material 900 is wrapped around an article or placed directly adjacent to itself, the flaps, loops, and undulations interlock with one another and/or opening portions 922, to create an interlocking structure. Interlocking can be measured as stated in the interlocking test articulated above.

Another example of a double slit pattern is shown in FIGS. 10A and 10B, which are top view schematic drawings of a material including a double slit pattern similar to the one shown in FIG. 5A except that the slits include enhanced interlocking structures or features instead of being linear slits. More specifically, material 1000 includes slits 1010a, 1010b, 1010c, 1010d. Slits 1010a and 1010b form sides or edges of a portion of a first transverse beam 1030a. Slits 1010b and 1010c form sides or edges of a portion of overlap beam 1036. Slits 1010c and 1010d form sides or edges of a portion of a second transverse beam 1030b. A first transverse beam 1030a is directly adjacent to an overlap beam 1036. The overlap beam 1036 is directly adjacent to a second transverse beam 1030b. Slits 1010a and 1010b are substantially aligned with one another. Slits 1010c and 1010d substantially aligned with one another. Slits 1010b and 1010c are not aligned with one another. Instead, slits 1010b and 1010c are phase separated or spaced from one another. In the embodiment of FIG. 10A, slits 1010 are substantially perpendicular to the tension axis T. In the specific embodiment of FIG. 10A, the slits 1010 include or form anchor-shaped hooks in the upper portion of the slit 1010 and the lower portion of the slit 1010. These anchor-shaped hook features—and including them in both upper and lower portions of the slit—can result in excellent interlocking. These features can also be included in only one of the upper or lower portions and still provide excellent interlocking.

Further, in this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. The ends of the slits are curved.

Figure 10D:
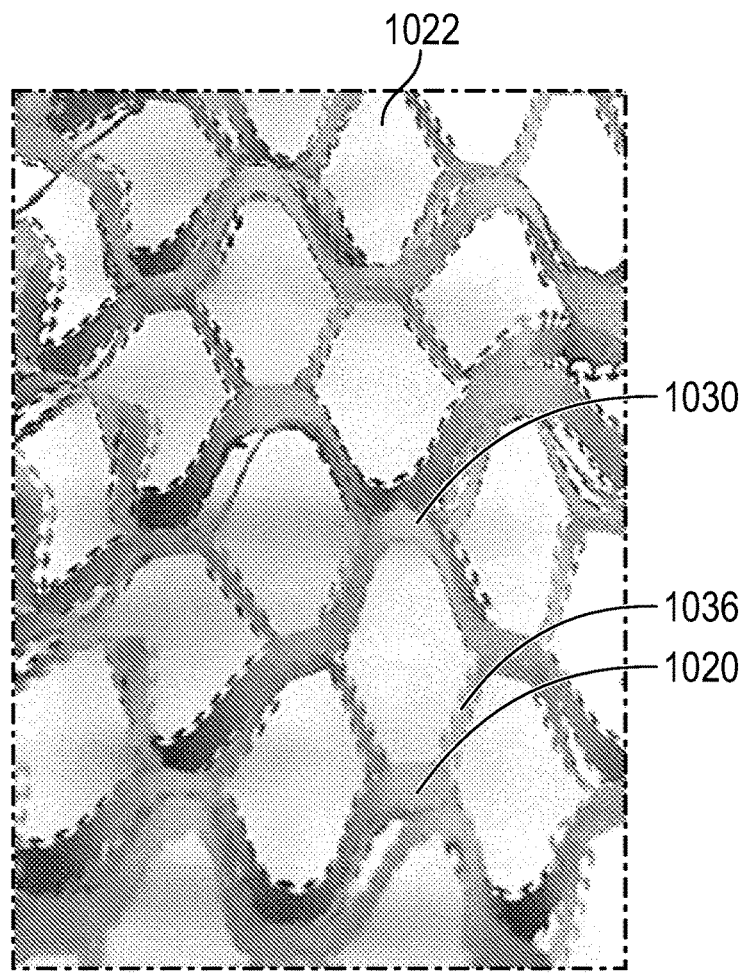
FIG. 10D is a nearly top view photograph of the double slit pattern of FIG. 10A formed in a paper sheet and exposed to tension along the tension axis.
Figure 10E:
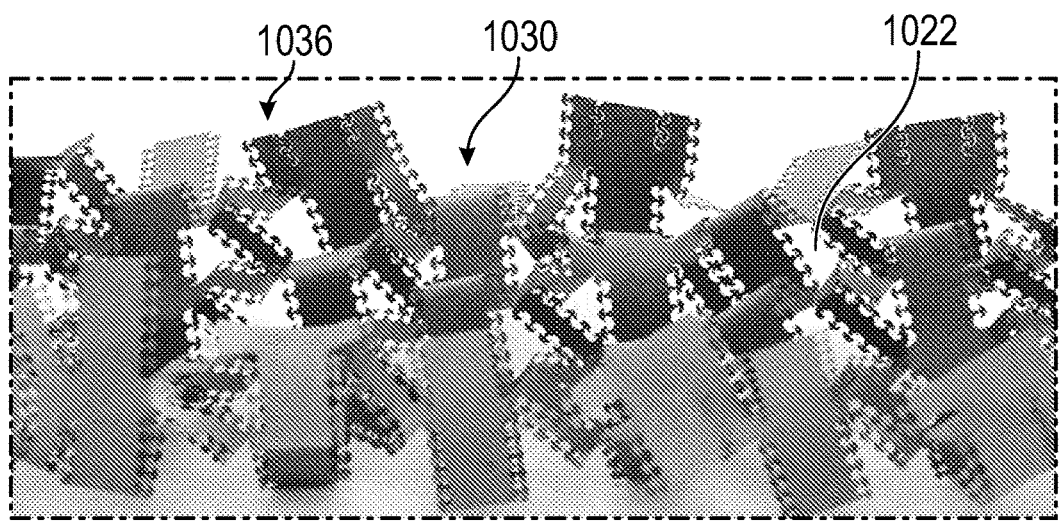
FIG. 10E is a nearly side of view photograph of the double slit pattern of FIG. 10A formed in a paper sheet and exposed to tension along the tension axis.

FIGS. 10C-E are photographs of a material including the slit pattern of FIG. 10A when exposed to tension along tension axis T. When material 1000 is tension activated or deployed along tension axis T, portions of material 1000 experience tension and/or compression that causes material 1000 to move out of the original plane of material 1000 in its non-tensioned format. When exposed to tension along the tension axis, terminal ends 1014, 1016 experience compression and are drawn toward one another. Portions of transverse beams 1030 undulate out of the original plane of the material 1000 in its pretensioned state (FIG. 10A) forming loops, while staying nominally parallel to the tension axis. An axial beam 1020 between adjacent slits 1010 in a row 1012 in combination with the adjacent portions of the transverse beam 1030 stays substantially parallel to the original plane of material 1000 in its pretensioned state (FIG. 10A). Overlap beams 1036 buckle and rotate out of the plane of the original material or sheet. The motion of the overlap beam 1036 in combination with the undulation of the transverse beams 1030 creates open portions 1022.

Those of skill in the art will appreciate that many changes may be made to the pattern and material while still falling within the scope of the present disclosure. For example, in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. Many of these changes could change the deployment pattern.

When the tension-activated material 1000 is wrapped around an article or placed directly adjacent to itself, the flaps, loops, and undulations interlock with one another and/or opening portions 1022, to create an interlocking structure. Interlocking can be measured as stated in the interlocking test articulated above.

Figure 11A:
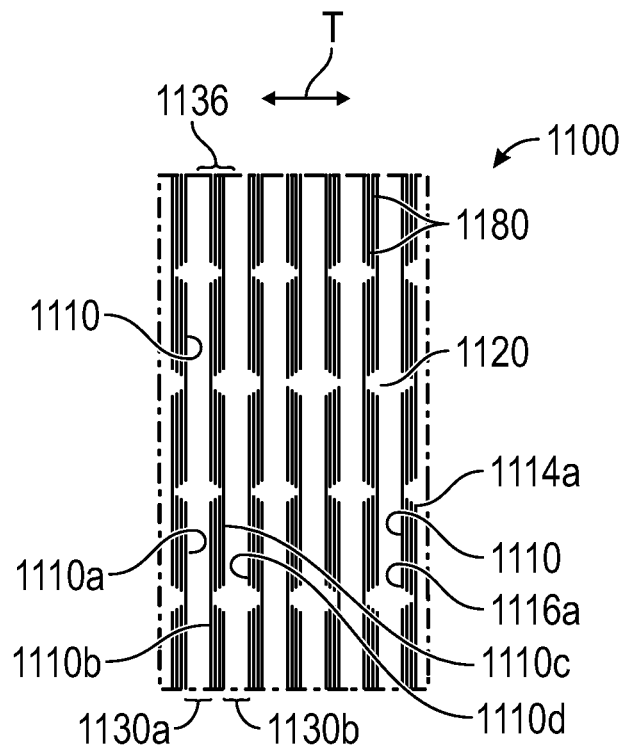
FIG. 11A is a top view schematic drawing of an exemplary double slit pattern including multibeam slits.

Another example of a double slit pattern is shown in FIG. 11A, which is a top view schematic drawing of a material including a double slit pattern similar to the one shown in FIG. 5A except that the slits include multibeam slits. A "multibeam slit" is defined as one or more simple slits (meaning the slit has no more than two terminal ends) formed between two adjacent slits in the single slit or multi-slit pattern, where the two adjacent slits are either in the same row or adjacent rows. The beam region, and more specifically the direct path between the closest terminal ends of two adjacent slits in adjacent rows such as ends 1116a and 1114a of FIG. 11A, experience the highest concentration of forces when tension is applied to a single slit patterned material. As such, these beam regions experience the greatest stress concentration during deployment (or tension application or activation) of the material. This high stress concentration can result in tearing of the material during deployment. Additional slits added in this region that cross through the direct path between closest terminal ends in adjacent rows can create one or more additional force-carrying paths, or additional beams, which have additional stress concentrating terminal ends that can increase the maximum force bearing capacity of the material. Materials or articles that include multibeam slit patterns have a greater maximum tension force as compared to a material or article with the same pattern of beams but without multibeams. As used herein, the term "maximum tension force" refers to the maximum tensile force that can be applied to a sample of slit-patterned material before it tears. Generally, the maximum tension force occurs just before a slit-patterned material tears. A test method for measuring the maximum tension force is described in U.S. Patent Application Ser. No. 62/953,042, assigned to the present assignee, the entirety of which is incorporated by reference herein. The Maximum Tension Force (e.g., tear force), is the maximum force measured by the load cell as the sample is stretched. This is typically just before the material begins to tear. In some embodiments, materials or articles that include a multibeam slit pattern are capable of withstanding larger tension forces without tearing as compared to a material or article with the same pattern except without multibeams.

In some embodiments, materials or articles with multibeam slit patterns have the same or lower deployment force. As used herein, the term "deployment force" refers to the force required to substantially deploy the patterned sheet.

In some embodiments, it is advantageous to have the maximum tension force (the tension force required to tear the slit patterned material during deployment or tensioning along tension axis T) be greater than the deploy force (the force required to deploy the sample). The Max-Deploy Ratio is the ratio of the maximum tension force divided by the deploy force. In some embodiments, it is advantageous for that ratio to be as large as possible such that the force applied to deploy a patterned sheet is much lower than the maximum force that the sheet can sustain. This prevents users of the sheet from accidentally tearing the material when deploying it.

Because FIG. 11A is substantially identical to the embodiment shown in FIG. 5A except that the embodiment of FIG. 11A includes multibeams, the description of FIG. 5A is repeated herein. Multibeam slits 1180 (in this embodiment, two multibeam slits) are formed in overlap beam 1136. These multibeam slits 1180 will enable the formation of multibeams when material 1100 is exposed to tension along the tension axis. The multibeam slits 1180, and the resulting multibeams, of FIG. 11A are substantially linear.

Those of skill in the art will appreciate that many changes may be made to the pattern while still falling within the scope of the present disclosure. in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. The number, shape, size, etc. of the multibeam slits and/or multibeams can vary. Alternatively, the row size or shape and beam size or shape can vary. Further, the degrees of offset or phase offset can vary from what is shown. Many of these changes could change the deployment pattern.

Figure 11B:
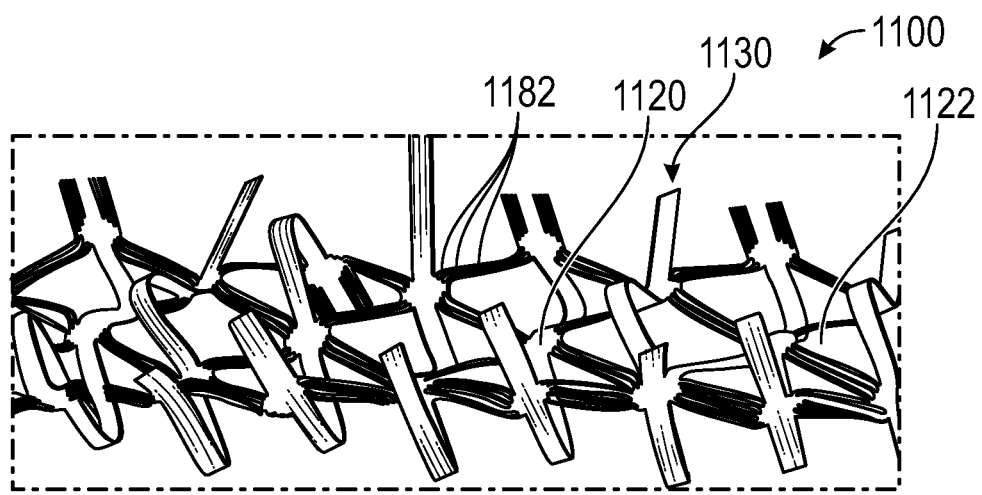
FIG. 11B is a nearly side view drawing from a photograph of the pattern shown in FIG. 11A formed in a paper sheet and exposed to tension along the tension axis.

FIG. 11B is a drawing of a material including the slit pattern of FIG. 11A when exposed to tension along tension axis T. When material 1100 is tension activated or deployed along tension axis T, portions of material 1100 experience tension and/or compression that causes material 1100 to move out of the original plane of material 1100 in its non-tensioned format. Portions of transverse beams 1130 undulate out of the original plane of the material 1100 in its pretensioned state (FIG. 11A) forming loops, while staying nominally parallel to the tension axis. The axial beam 1120 between adjacent slits 1110 in a row 1112 in combination with the adjacent portions of the transverse beam 1130 stays substantially parallel to the original plane of material 1100 in its pretensioned state (FIG. 11A). Overlap beams 1136 buckle and rotate out of the plane of the original material or sheet. Because of the addition of two multibeam slits 1180, each overlap beam 1136 is cut into three distinct multibeams 1182 that each carry tension and stay nominally parallel to each other and move or rotate as a group. The motion of the overlap beams 1136 in combination with the undulation of the transverse beams 1130 creates open portions 1122. As such, the material 1100 deploys substantially as described with respect to the pattern of FIG. 5A, except that multibeams 1182 form.

When the tension-activated material 1100 is wrapped around an article or placed directly adjacent to itself, the loops and undulations interlock with one another and/or opening portions 1122, to create an interlocking structure. Interlocking can be measured as stated in the interlocking test articulated above.

Figure 12A:
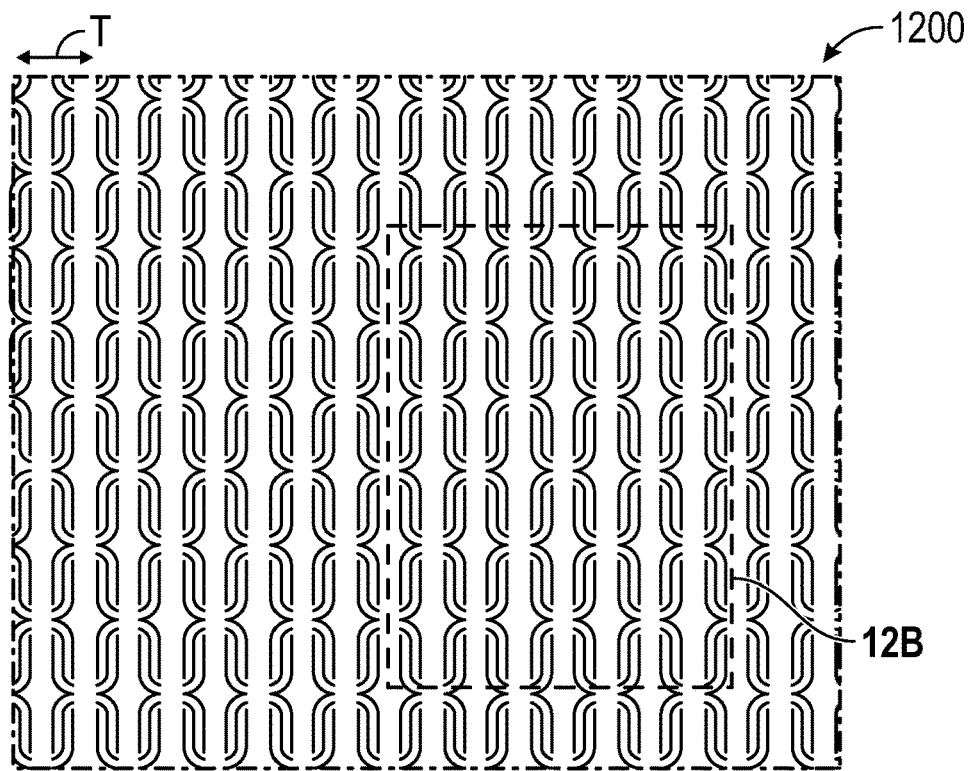
FIG. 12A is a top view schematic drawing of an exemplary double slit pattern.
Figure 12B:
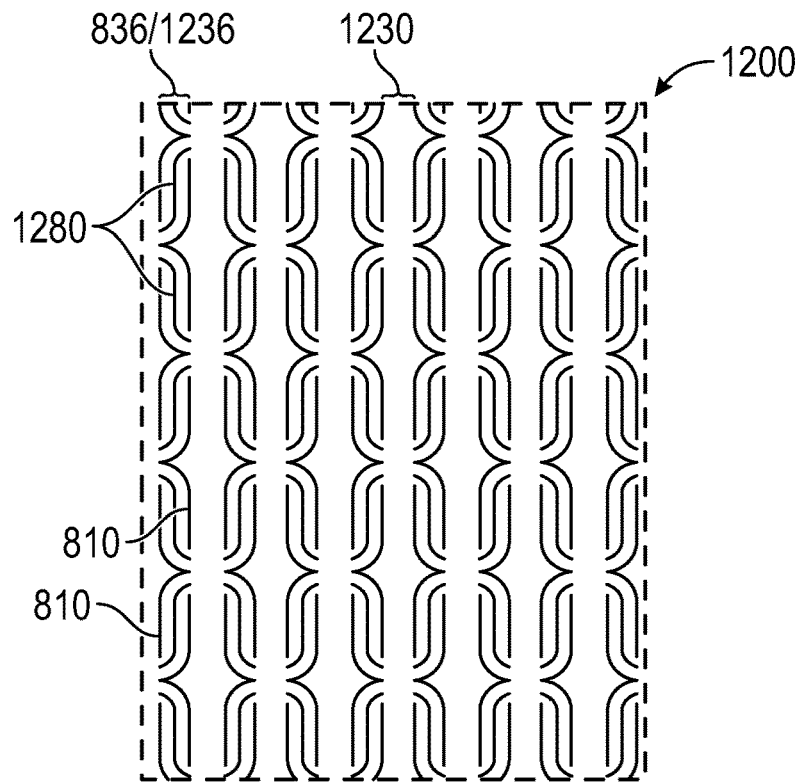
FIG. 12B is an enlarged portion of FIG. 12A.

An exemplary embodiment of a slit pattern including multibeams is shown in FIGS. 12A-12E. FIG. 12A is substantially identical to the embodiment shown in FIG. 8A except that the embodiment of FIG. 12A includes multibeams. As such, the description of FIG. 8A is repeated herein. FIG. 12B is an enlarged portion of FIG. 12A. Multibeam slits 1280 (in this embodiment, one multibeam slit) are formed in overlap beam 836. These multibeam slits 1280 will enable the formation of multibeams when material 1200 is exposed to tension along the tension axis. The multibeam slits 1280, and the resulting multibeams, of FIG. 12A are curved to follow or mimic the curvature of slits 810.

Those of skill in the art will appreciate that many changes may be made to the pattern while still falling within the scope of the present disclosure. in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. The number, shape, size, etc. of the multibeam slits and/or multibeams can vary. Alternatively, the row size or shape and beam size or shape can vary. Further, the degrees of offset or phase offset can vary from what is shown. Many of these changes could change the deployment pattern.

Figure 12C:
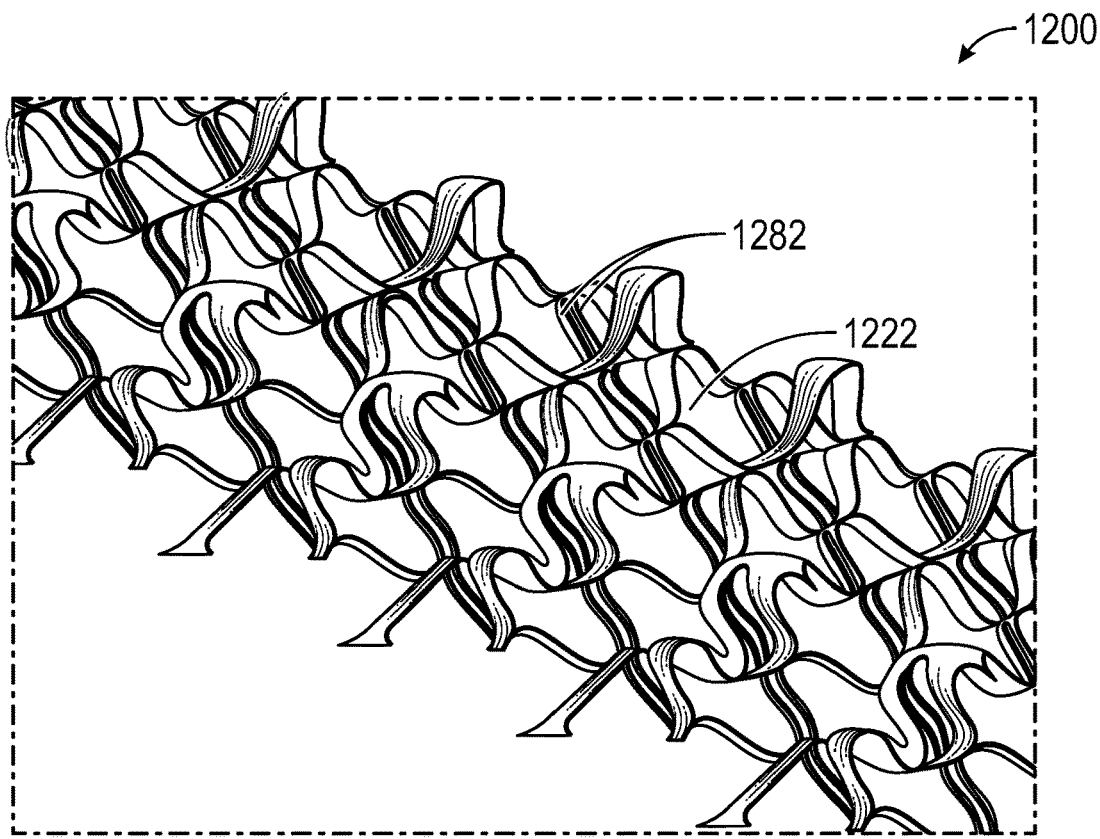
FIG. 12C is a perspective view drawing from a photograph of the pattern shown in FIG. 12A formed in a paper sheet and exposed to tension along the tension axis.
Figure 12D:
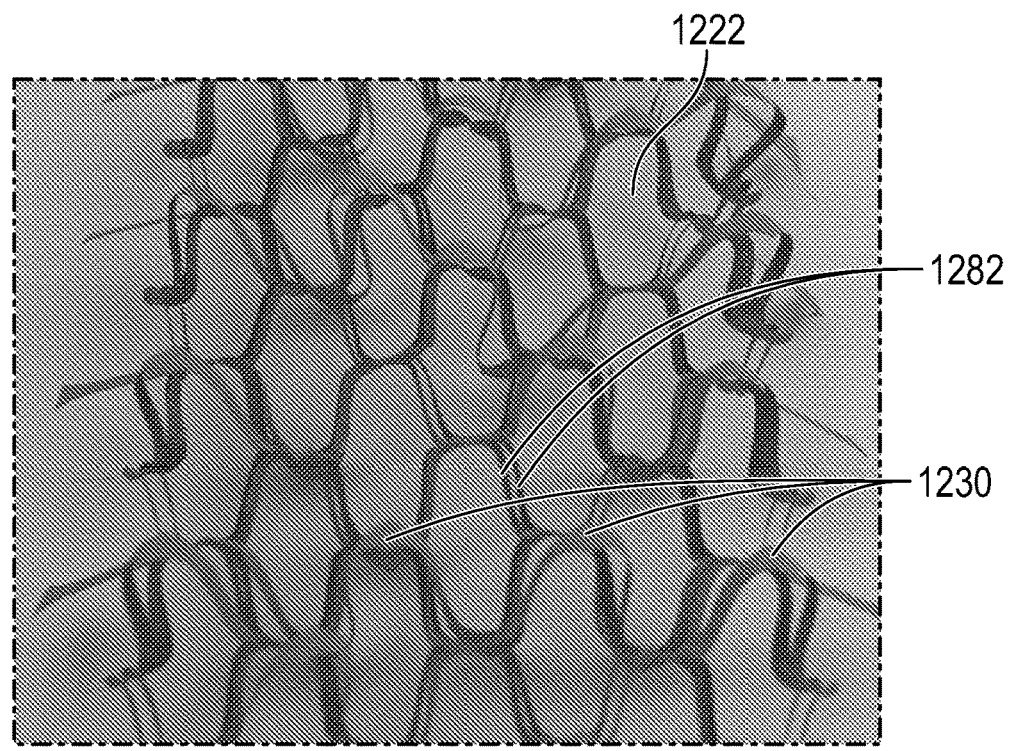
FIG. 12D is a nearly top view photograph of the double slit pattern of FIG. 12A formed in a paper sheet and exposed to tension along the tension axis.
Figure 12E:
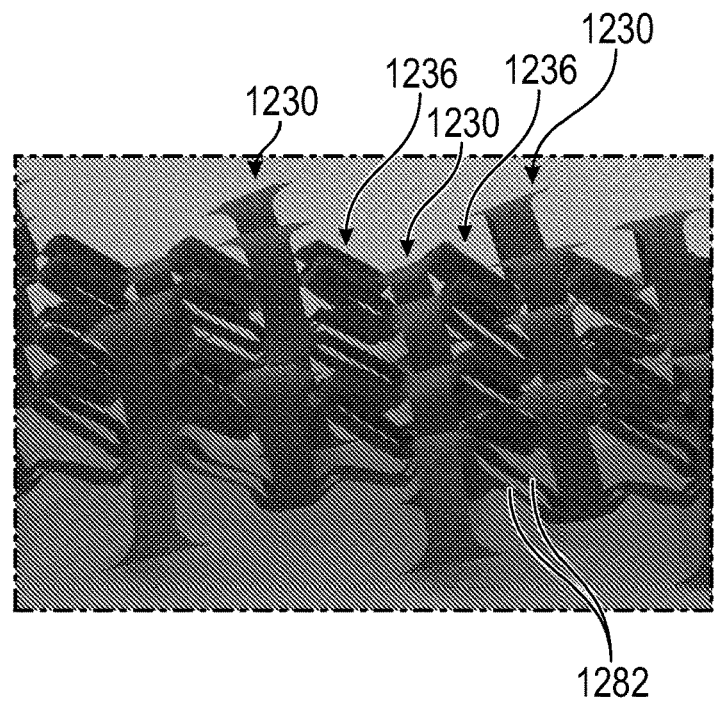
FIG. 12E is a nearly side of view photograph of the double slit pattern of FIG. 12A formed in a paper sheet and exposed to tension along the tension axis.

FIGS. 12C-12E depict a material including the slit pattern of FIGS. 12A and 12B when exposed to tension along tension axis T. The material deploys substantially as described with respect to the pattern of FIG. 8A, except that multibeams 1282 form.

When the tension-activated material 1200 is wrapped around an article or placed directly adjacent to itself, the flaps, loops, and undulations interlock with one another and/or opening portions 1222, to create an interlocking structure. Interlocking can be measured as stated in the interlocking test articulated above.

Figure 13A:
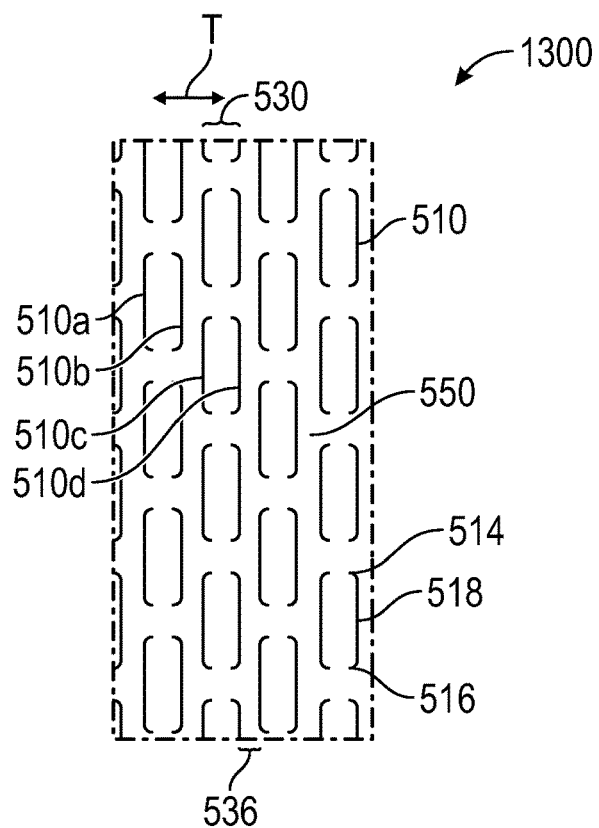
FIG. 13A is a top view schematic drawing of an exemplary double slit pattern including curved terminal ends.

An exemplary embodiment of a slit pattern including curved ends is shown in FIGS. 13A-13D. FIG. 13A is substantially identical to the embodiment shown in FIG. 5A except that the terminal ends of the slits 510 are curved, meaning that an end region of the slit forming the terminal end of the slit has a radius of curvature that is distinct from an adjacent portion of the slit. The end region has a length that is generally less than 10% of the total length of the slit. As such, the description of FIG. 5A is repeated herein.

Those of skill in the art will appreciate that many changes may be made to the pattern while still falling within the scope of the present disclosure. in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. The degree of curvature of the terminal ends can vary. Alternatively, the row size or shape and beam size or shape can vary. Further, the degrees of offset or phase offset can vary from what is shown. Many of these changes could change the deployment pattern.

Figure 13B:
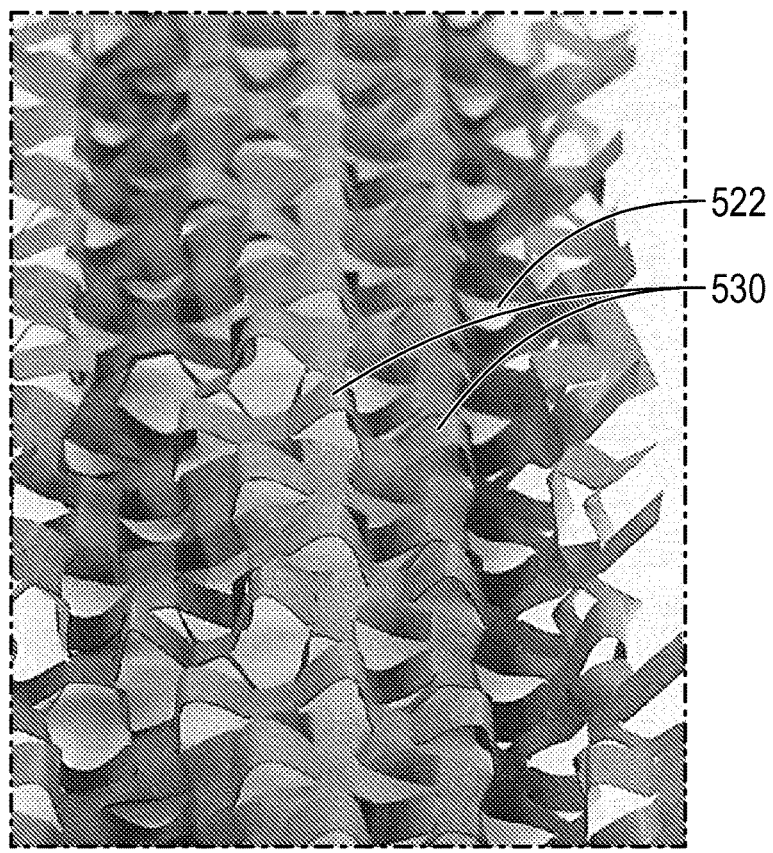
FIG. 13B is a nearly top view photograph of the pattern shown in FIG. 13A formed in a paper sheet and exposed to tension along the tension axis.
Figure 13C:
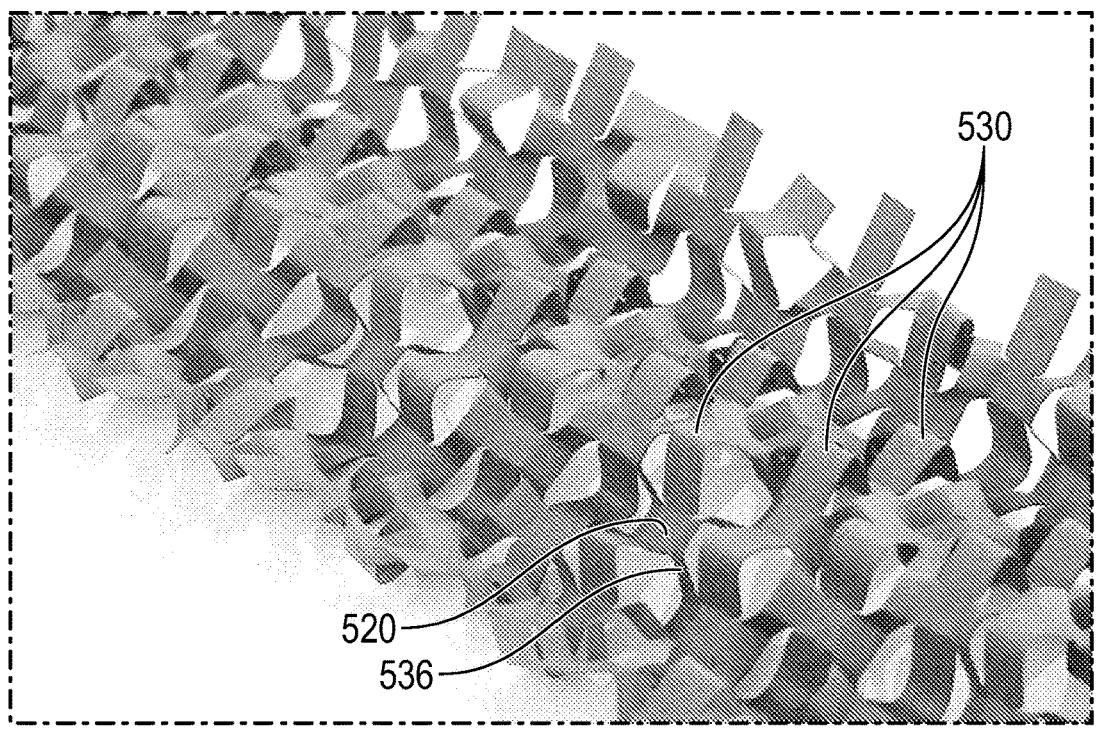
FIG. 13C is a perspective view photograph of the double slit pattern of FIG. 13A formed in a paper sheet and exposed to tension along the tension axis.
Figure 13D:
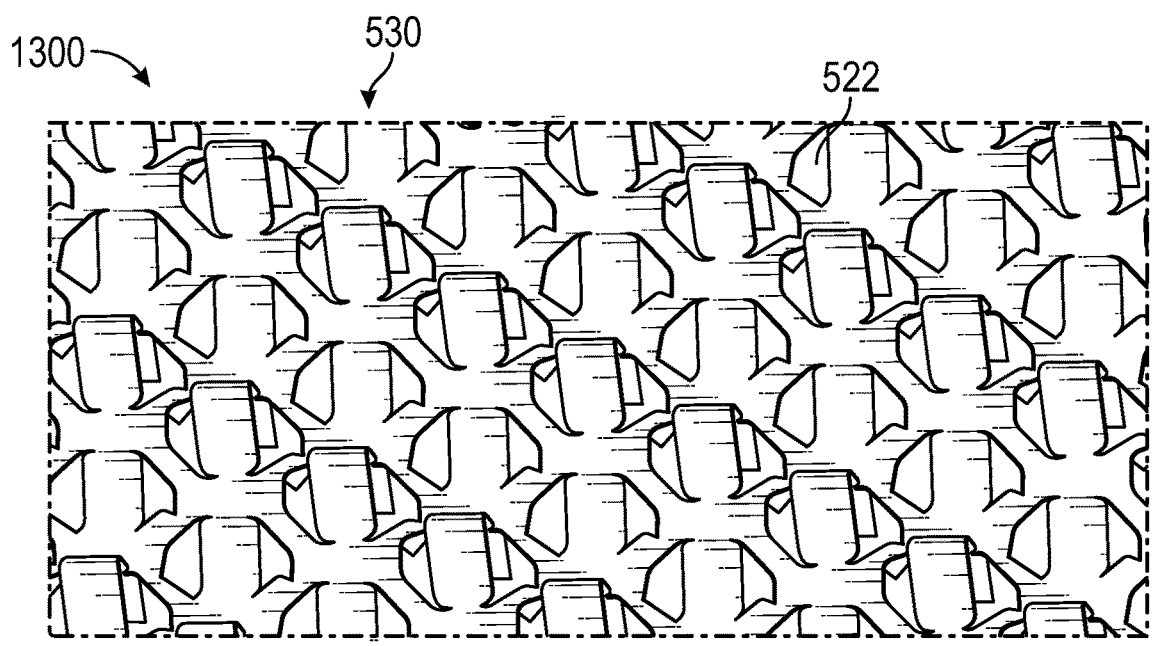
FIG. 13D is a nearly side of view drawing from a photograph of the double slit pattern of FIG. 13A formed in a paper sheet and exposed to tension along the tension axis.

FIGS. 13B-13D are photographs and a drawing from a photograph of a material including the slit pattern of FIG. 13A when exposed to tension along tension axis T. The material deploys substantially as described with respect to the pattern of FIG. 5A. The curved ends of the slits 1310 increases the maximum tension that the material can experience without tearing.

When the tension-activated material 1300 is wrapped around an article or placed directly adjacent to itself, the flaps, loops, and undulations interlock with one another and/or opening portions 522, to create an interlocking structure. Interlocking can be measured as stated in the interlocking test articulated above.

Figure 14A:
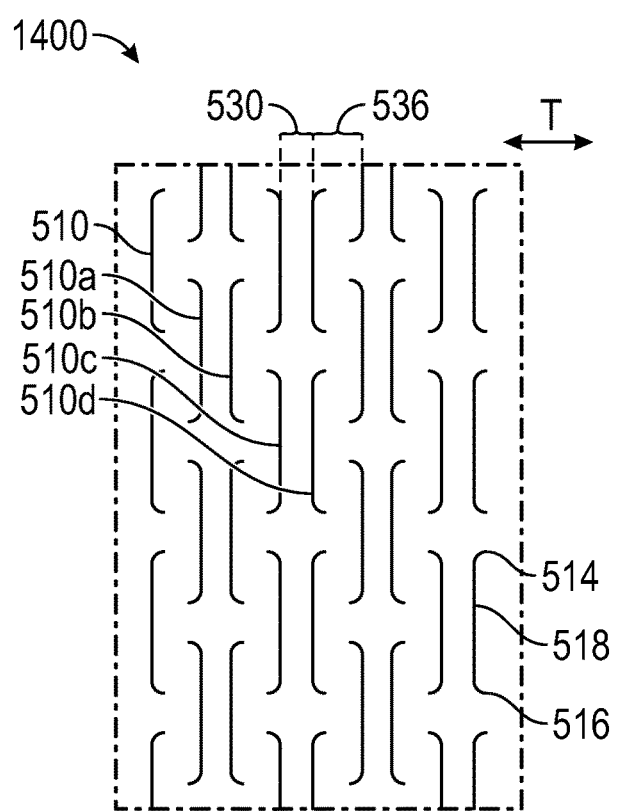
FIG. 14A is a top view schematic drawing of an exemplary double slit pattern including curved terminal ends.
Figure 14B:
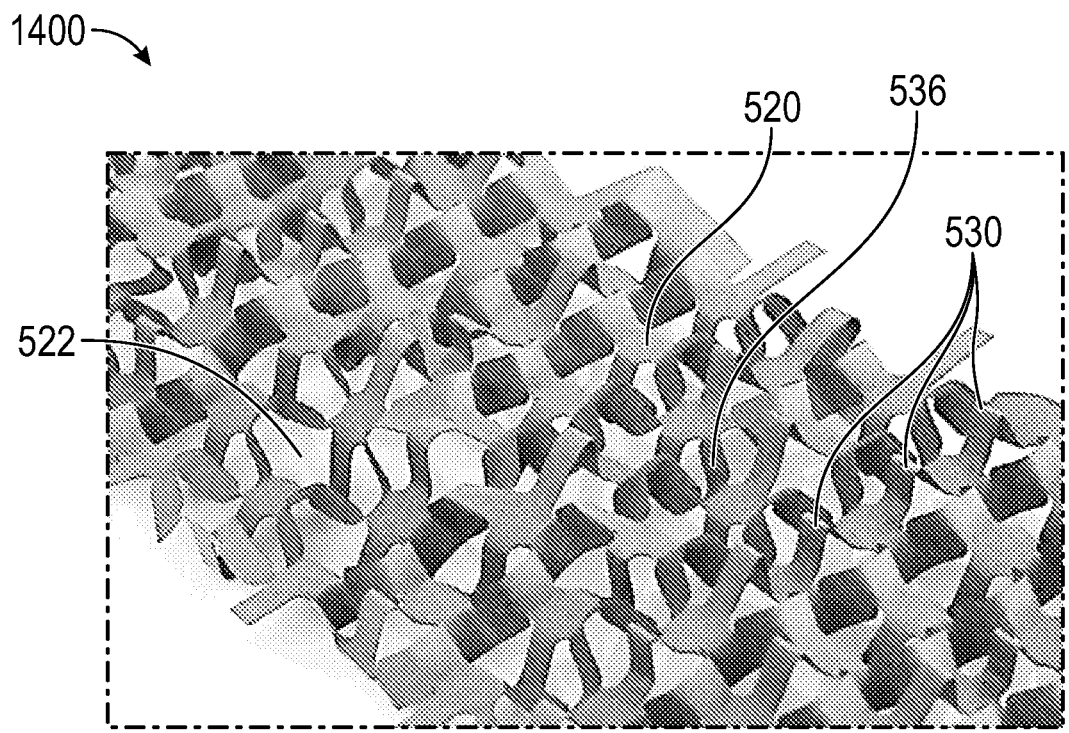
FIG. 14B is a perspective view photograph of the pattern shown in FIG. 14A formed in a paper sheet and exposed to tension along the tension axis.
Figure 14C:
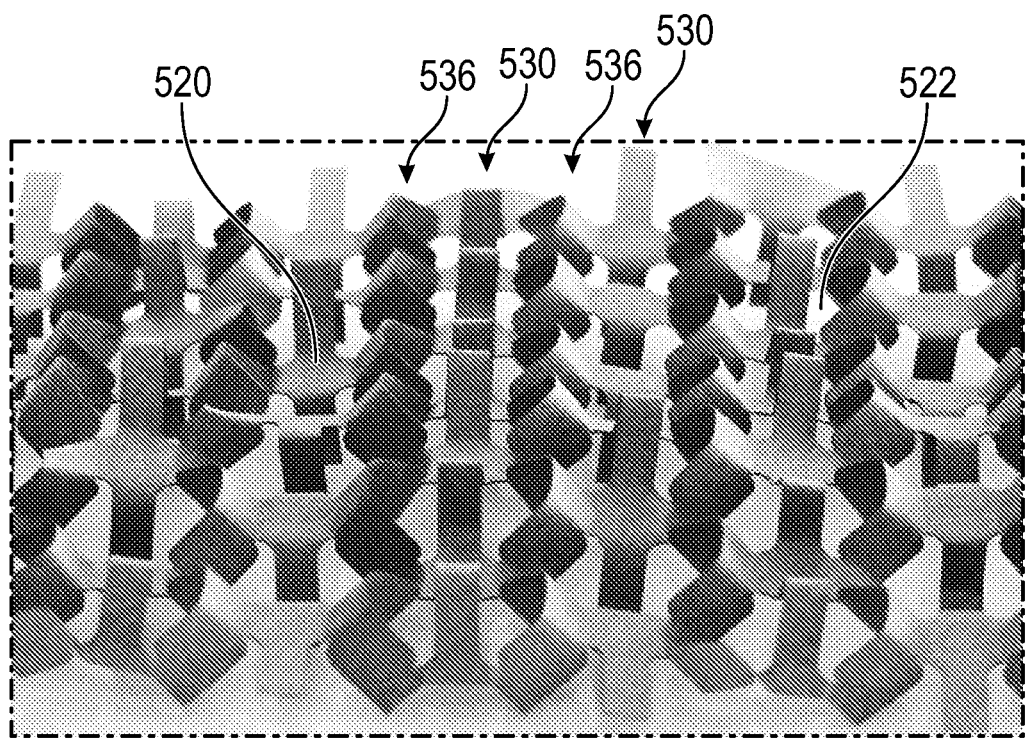
FIG. 14C is a nearly side view photograph of the double slit pattern of FIG. 14A formed in a paper sheet and exposed to tension along the tension axis.

An exemplary embodiment of a slit pattern including curved edges is shown in FIGS. 14A-14C. FIG. 14A is substantially identical to the embodiment shown in FIG. 5A except that the terminal ends of the slits 1410 are curved. As such, the description of FIG. 5A is repeated herein.

Those of skill in the art will appreciate that many changes may be made to the pattern while still falling within the scope of the present disclosure. in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. The degree of curvature of the terminal ends can vary. Alternatively, the row size or shape and beam size or shape can vary. Further, the degrees of offset or phase offset can vary from what is shown. Many of these changes could change the deployment pattern.

FIGS. 14B and 14C are photographs of a material including the slit pattern of FIG. 14A when exposed to tension along tension axis T. The material deploys substantially as described with respect to the pattern of FIG. 5A. The curved ends of the slits 1410 increase the maximum tension that the material can experience without tearing.

When the tension-activated material 1400 is wrapped around an article or placed directly adjacent to itself, the flaps, loops, and undulations interlock with one another and/or opening portions 522, to create an interlocking structure. Interlocking can be measured as stated in the interlocking test articulated above.

Figure 15A:
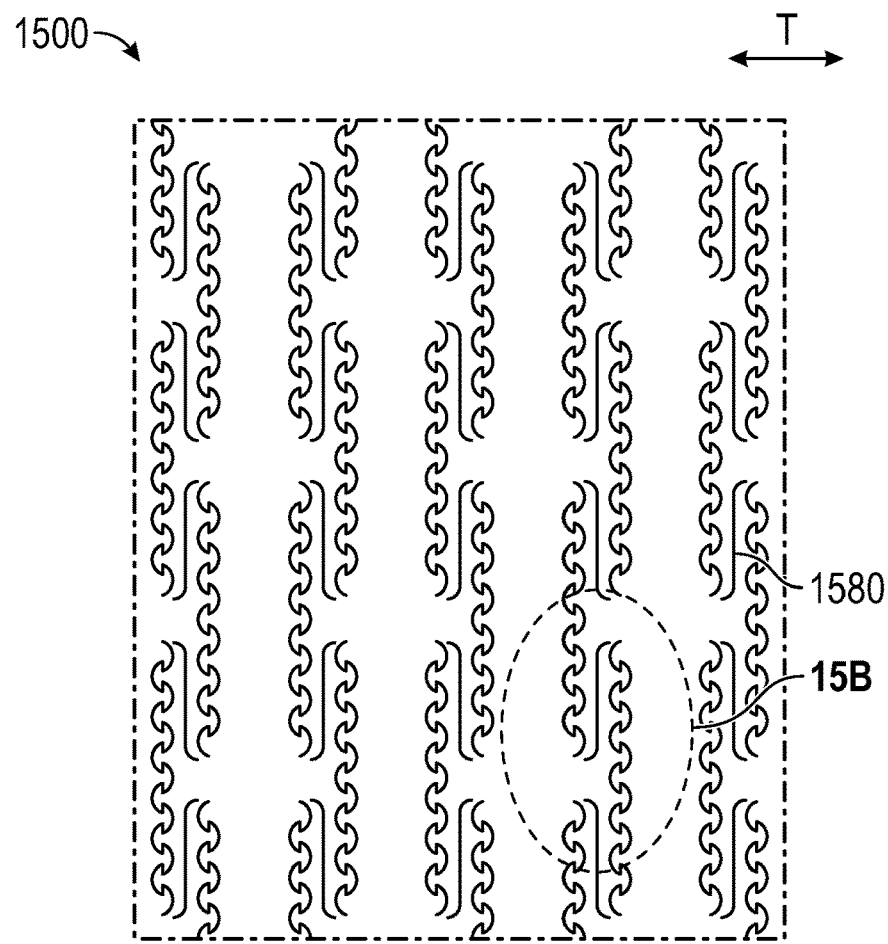
FIG. 15A is a top view schematic drawing of an exemplary double slit pattern.
Figure 15B:
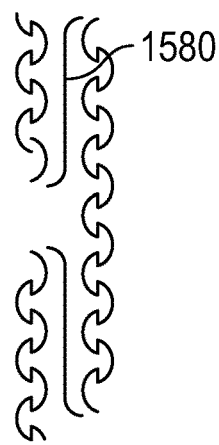
FIG. 15B is an enlarged portion of FIG. 15A.

An exemplary embodiment of a slit pattern including interlocking features and multibeams is shown in FIGS. 15A-15B. FIG. 15A is substantially identical to the embodiment shown in FIG. 10A except that the pattern includes multibeam slits 1580 in overlap beams 1036. As such, the description of FIG. 10A is repeated herein. FIG. 15B shows an enlarged section of FIG. 15A. The material deploys substantially as described with respect to the pattern of FIG. 10A except that the multibeam slits create multibeams when a material including the slit pattern of FIG. 15A is exposed to tension along the tension axis. The multibeams increase the maximum tension that the material can experience without tearing and they also reduce the amount of tension required to deploy the material.

Those of skill in the art will appreciate that many changes may be made to the pattern while still falling within the scope of the present disclosure. in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. The degree of curvature of the terminal ends can vary. Alternatively, the row size or shape and beam size or shape can vary. Further, the degrees of offset or phase offset can vary from what is shown. Many of these changes could change the deployment pattern.

When the tension-activated material 1500 is wrapped around an article or placed directly adjacent to itself, the loops and undulations interlock with one another and/or opening portions 1022, to create an interlocking structure. Interlocking can be measured as stated in the interlocking test articulated above.

Figure 16:
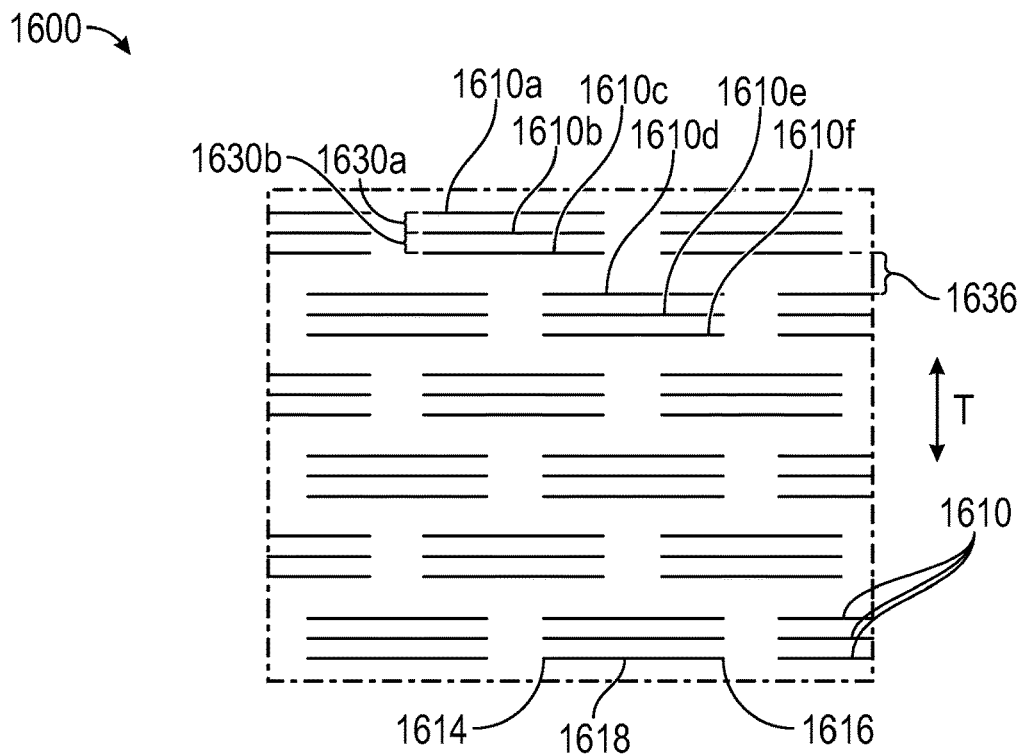
FIG. 16 is a top view schematic drawing of an exemplary triple slit pattern.

FIG. 16 is a schematic drawing of a material including an exemplary triple slit pattern. The triple slit pattern is similar to the one shown in FIG. 5A except that it includes triple slits instead of double slits. Material 1600 includes slits 1610a, 1610b, and 1610c, which together form a triple slit. Material 1600 also includes slits 1610d, 1610e, 1610f, which form another triple slit. Each triple slit includes two transverse beams 1630a, 1630b. The first transverse beam 1630a is formed by slits 1610a and 1610b and the second transverse beam 1630b is formed by 1610b and 1610c. Slits 1610c and 1610d form sides or edges of a portion of overlap beam 1636. Transverse beam 1630b is directly adjacent to overlap beam 1636. Slits 1610a, 1610b, and 1610c are substantially aligned with one another. The terminal ends 1614, 1616 of slits 1610a, 1610b, and 1610c are substantially aligned with one another. Slits 1610d, 1610e, and 1610f are substantially aligned with one another. The terminal ends 1614, 1616 of slits 1610d, 1610e, and 1610f are substantially aligned with one another. Slits 1610a, 1610b, and 1610c are not aligned with slits 1610d, 1610e, and 1610f. Instead, slits 1610a, 1610b, and 1610c are phase separated or spaced from slits 1610d, 1610e, and 1610f. In other words, the triple slit including slits 1610a, 1610b, and 1610c is phase separated from the triple slit including slits 1610d, 1610e, and 1610f. In the embodiment of FIG. 16, slits 1610 are substantially perpendicular to the tension axis T.

Each slit 1610 has two terminal ends 1614, 1616 and a midpoint 1618 between the two terminal ends 1614, 1616. A straight, imaginary line extends between and connects these terminal ends 1614, 1616. In this embodiment, the straight, imaginary line extending between and connecting the terminal ends of a first slit is substantially colinear with the straight, imaginary line extending between and connecting the terminal ends of a directly adjacent slit in the transverse direction. In this exemplary embodiment, all of the straight, imaginary lines extending between and connecting the slit terminal ends in a row are approximately colinear.

Figure 17A:
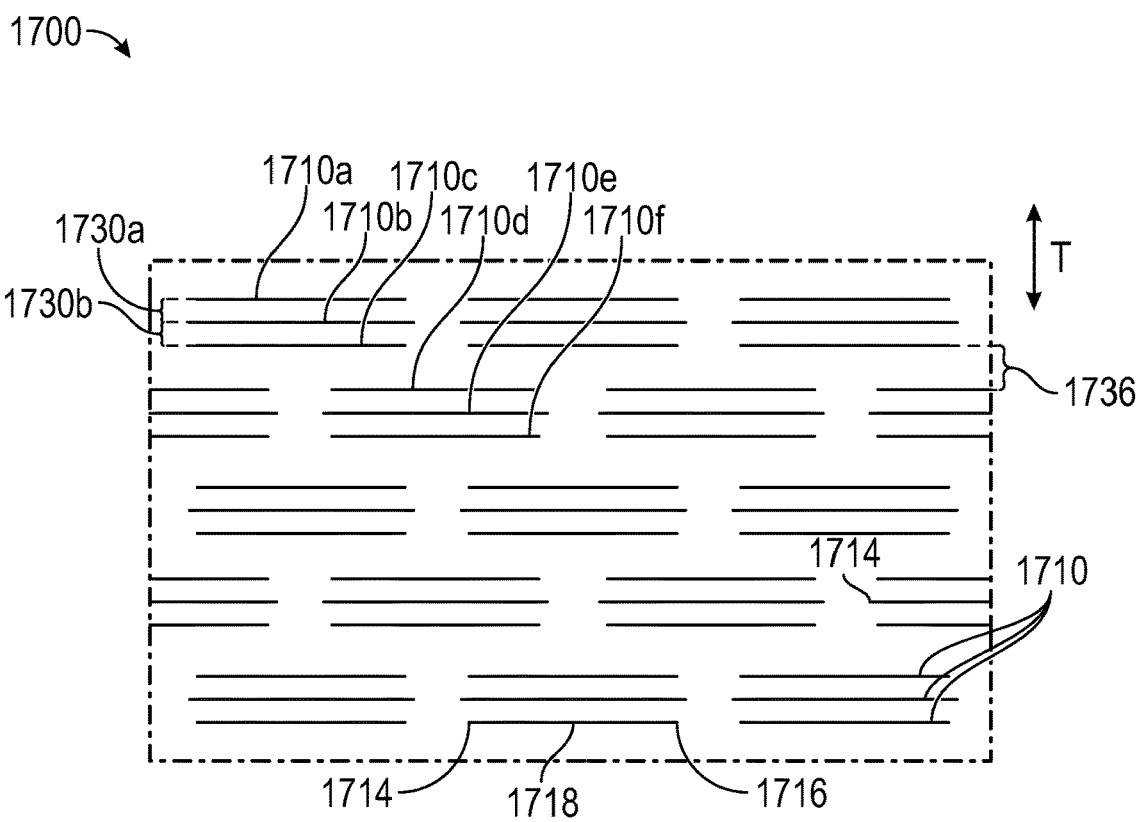
FIG. 17A is a top view schematic drawing of an exemplary triple slit pattern.

FIG. 17A is a schematic drawing of a material including an exemplary triple slit pattern. The triple slit pattern is similar to the one shown in FIG. 16A except that the slits in each triple slit vary in length. Material 1700 includes slits 1710a, 1710b, and 1710c, which together form a triple slit. Material 1700 also includes slits 1710d, 1710e, 1710f, which together form another triple slit. Slits 1710b and 1010e are longer than slits 1710a, 1710c, 1710d, and 1710f. However, in this implementation, the midpoints 1718 of each of slits 1710a, 1710b substantially align, and the midpoints 1718 of each of slits 1710c, 1710d, 1710e, and 1710f substantially align. Each triple slit includes two transverse beams 1730a, 1730b. The first transverse beam 1730a is formed by slits 1710a and 1710b and the second transverse beam 1730b is formed by 1710b and 1710c. Slits 1710c and 1710d form sides or edges of a portion of overlap beam 1736. Transverse beam 1730b is directly adjacent to overlap beam 1736. The corresponding terminal ends 1714, 1716 of slits 1710a and 1710c are substantially aligned with one another. The corresponding terminal ends 1714, 1716 of slits 1710d and 1710f are substantially aligned with one another. Slits 1710a, 1710b, and 1710c are not aligned with slits 1710d, 1710e, and 1710f. Instead, slits 1710a, 1710b, and 1710c are phase separated or spaced from slits 1710d, 1710e, and 1710f. In other words, the triple slit including slits 1710a, 1710b, and 1710c is phase separated from the triple slit including slits 1710d, 1710e, and 1710f. In the embodiment of FIG. 17A, slits 1710 are substantially perpendicular to the tension axis T.

Each slit 1710 has two terminal ends 1714, 1716 and a midpoint 1718 between the two terminal ends 1714, 1716. A straight, imaginary line extends between and connects the terminal ends 1714, 1716 of each slit 1710. In this embodiment, the straight, imaginary line extending between and connecting the terminal ends of a first slit is substantially colinear with the straight, imaginary line extending between and connecting the terminal ends of a directly adjacent slit in the transverse direction. In this exemplary embodiment, all of the straight, imaginary lines extending between and connecting the slit terminal ends in a row are approximately colinear.

Those of skill in the art will appreciate that many changes may be made to the pattern while still falling within the scope of the present disclosure. in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. The degree of curvature of the terminal ends can vary. Alternatively, the row size or shape and beam size or shape can vary. Further, the degrees of offset or phase offset can vary from what is shown. Many of these changes could change the deployment pattern.

Figure 17B:
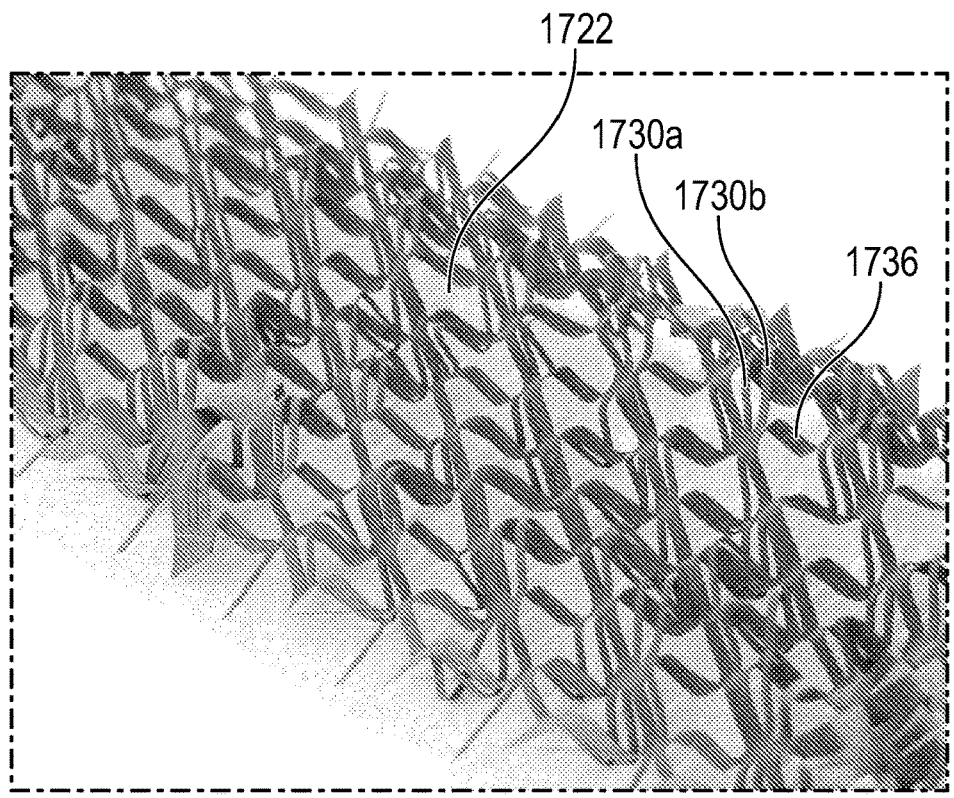
FIG. 17B is a perspective view photograph of the triple slit pattern shown in FIG. 17A formed in a paper sheet and exposed to tension along the tension axis.
Figure 17C:
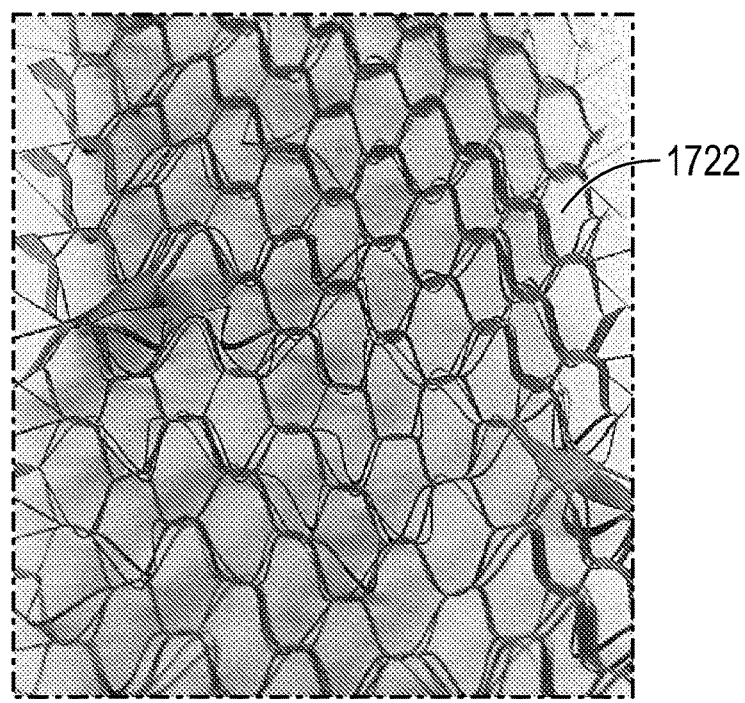
FIG. 17C is a nearly top view photograph of the triple slit pattern of FIG. 17A formed in a paper sheet and exposed to tension along the tension axis.
Figure 17D:
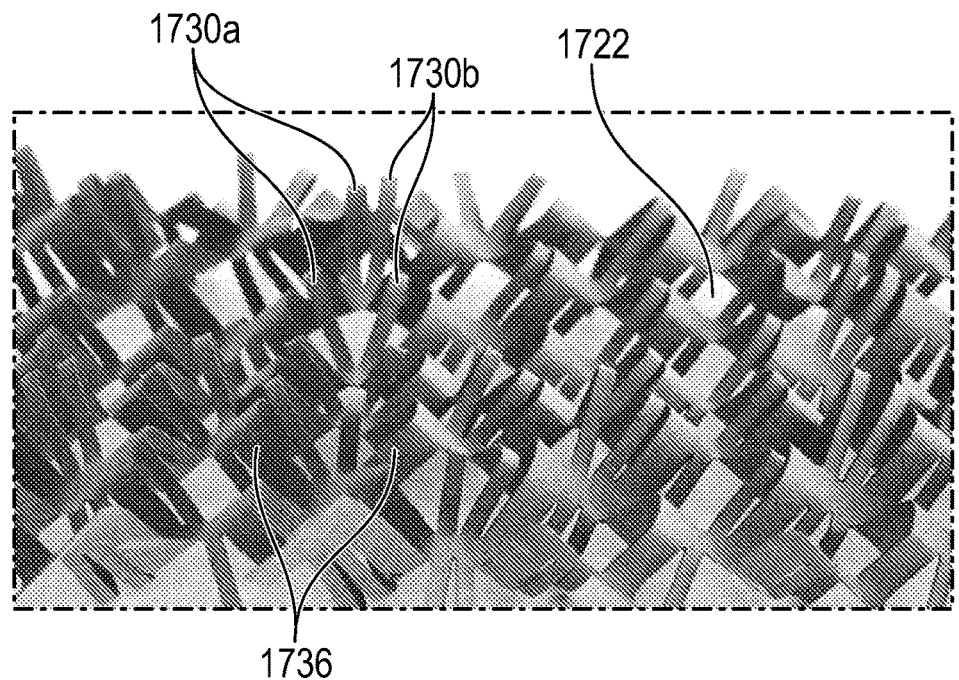
FIG. 17D is a nearly side of view photograph of the triple slit pattern of FIG. 17A formed in a paper sheet and exposed to tension along the tension axis.

FIGS. 17B-17D are photographs of a material including the slit pattern of FIG. 17A when exposed to tension along tension axis T. The material deploys substantially as described with respect to the pattern of FIG. 5A. However, there are now two transverse beams 1730*a* and 1730*b* where there had been a single undulating transverse beam 530 previously.

When the tension-activated material 1700 is wrapped around an article or placed directly adjacent to itself, the flaps, loops, and undulations interlock with one another and/or opening portions 1722, to create an interlocking structure. Interlocking can be measured as stated in the interlocking test articulated above.

Figure 18:
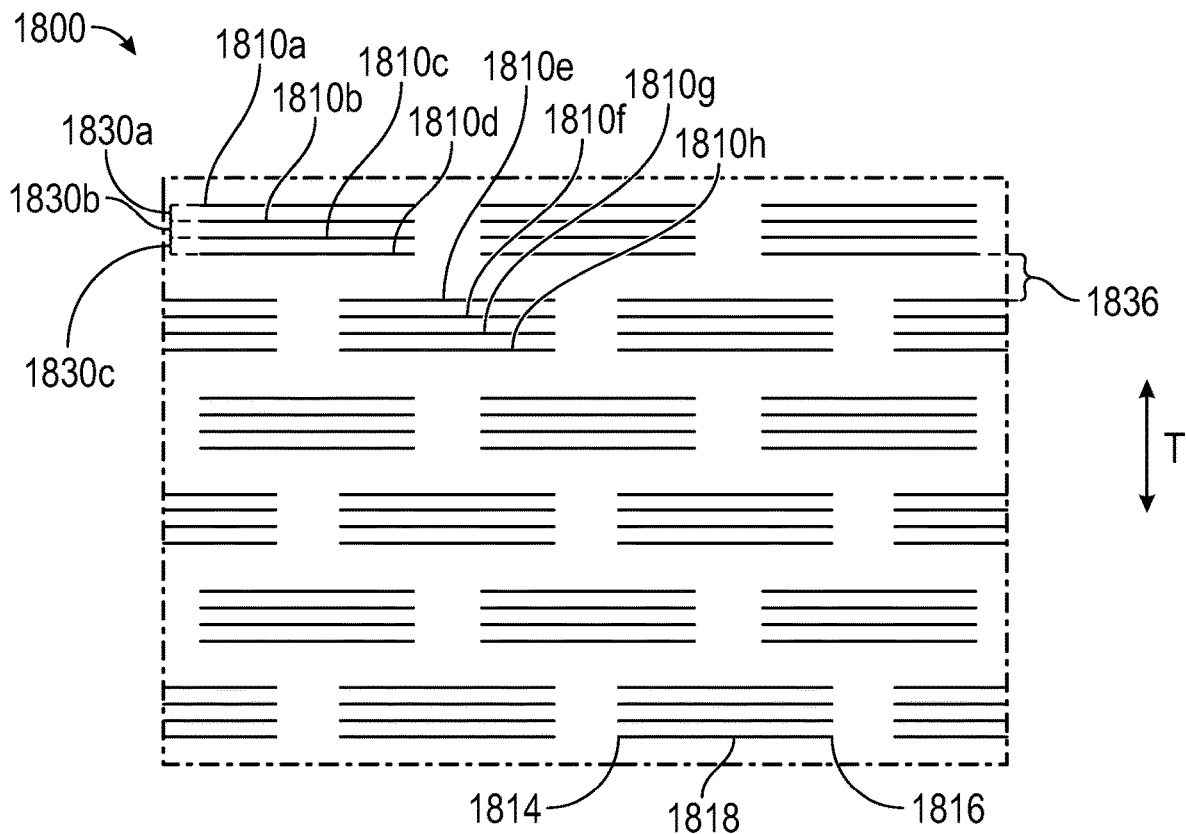
FIG. 18 is a top view schematic drawing of an exemplary quadruple slit pattern.

FIG. 18 is a schematic drawing of a material including an exemplary quadruple slit pattern. The quadruple slit pattern is similar to the one shown in FIG. 5A or FIG. 16 except that it includes quadruple slits instead of double or triple slits. Material 1800 includes slits 1810*a*, 1810*b*, and 1810*c* and 1810*d*, which together form a quadruple slit. Material 1800 also includes slits 1810*e*, 1810*f*, 1810*g*, and 1810*h*, which form another quadruple slit. Each quadruple slit includes three transverse beams 1830*a*, 1830*b*, 1830*c*. The first transverse beam 1830*a* is formed by slits 1810*a* and 1810*b*. The second transverse beam 1830*b* is formed by 1810*b* and 1810*c*. The third transverse beam 1830*c* is formed by 1810*c* and 1810*d*. Slits 1810*d* and 1810*e* form sides or edges of a portion of overlap beam 1836. Transverse beam 1830*c* is directly adjacent to overlap beam 1836. Slits 1810*a*, 1810*b*, 1810*c*, and 1810*d* are substantially aligned with one another. Slits 1810*e*, 1810*f*, 1810*g*, and 1810*h* are substantially aligned with one another. The terminal ends 1814, 1816 of slits 1810*a*, 1810*b*, 1810*c*, and 1810*d* are substantially aligned with one another. The terminal ends 1814, 1816 of slits 1810*e*, 1810*f*, 1810*g*, and 1810*h* are substantially aligned with one another. Slits 1810*a*, 1810*b*, 1810*c*, and 1810*d* are not aligned with slits 1810*e*, 1810*f*, 1810*g*, and 1810*h*. Instead, slits 1810*a*, 1810*b*, 1810*c*, and 1810*d* are phase separated or spaced from slits 1810*e*, 1810*f*, 1810*g*, and 1810*h*. In other words, the triple slit including slits 1810*a*, 1810*b*, 1810*c*, and 1810*d* is phase separated from the triple slit including slits 1810*e*, 1810*f*, 1810*g*, and 1810*h*. In the embodiment of FIG. 18, slits 1810 are substantially perpendicular to the tension axis T.

Each slit 1810 has two terminal ends 1814, 1816 and a midpoint 1818 between the two terminal ends 1814, 1816. A straight, imaginary line extends between and connects these terminal ends 1814, 1816. In this embodiment, the straight, imaginary line extending between and connecting the terminal ends of a first slit is substantially colinear with the straight, imaginary line extending between and connecting the terminal ends of a directly adjacent slit in the transverse direction. In this exemplary embodiment, all of the straight, imaginary lines extending between and connecting the slit terminal ends in a row are approximately colinear.

Figure 19A:
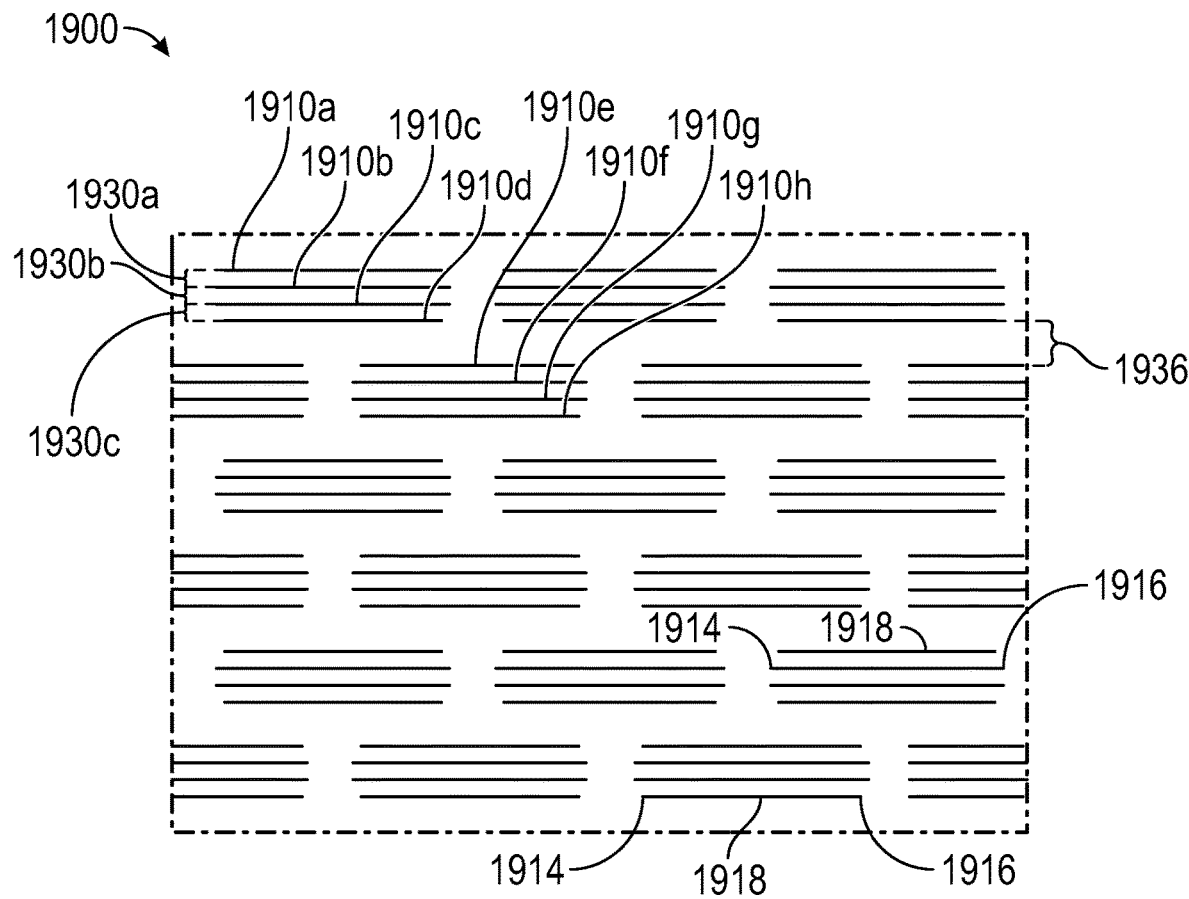
FIG. 19A is a top view schematic drawing of an exemplary quadruple slit pattern.

FIG. 19A is a schematic drawing of a material including an exemplary quadruple slit pattern. The quadruple slit pattern is the same as the one shown in FIG. 18 except that the slits in each quadruple slit vary in length. Material 1900 includes slits 1910*a*, 1910*b*, and 1910*c* and 1910*d*, which together form a quadruple slit. Material 1900 also includes slits 1910*e*, 1910*f*, 1910*g*, and 1910*h*, which form another quadruple slit. Slits 1910*b*, 1910*c*, 1910*f*, and 1910*g* are longer than slits 1910*a*, 1910*d*, 1910*e*, and 1910*h*. Slits 1910*b*, 1910*c*, 1910*f*, and 1910*g* are all substantially the same length. In this implementation, the midpoints of each of slits 1910*a*, 1910*b*, 1910*c*, and 1910*d* are all substantially aligned. Each quadruple slit includes three transverse beams 1930*a*, 1930*b*, 1930*c*. The first transverse beam 1930*a* is formed by slits 1910*a* and 1910*b*. The second transverse beam 1930*b* is formed by 1910*b* and 1910*c*. The third transverse beam 1930*c* is formed by 1910*c* and 1910*d*. Slits 1910*d* and 1910*e* form sides or edges of a portion of overlap beam 1936. Transverse beam 1930*c* is directly adjacent to overlap beam 1936. The corresponding terminal ends 1914, 1916 of slits 1910*a* and 1910*d* are substantially aligned with one another, and the corresponding terminal ends of 1914, 1916 of slits 1910*b* and 1910*c* are substantially aligned with one another. The terminal ends 1914, 1916 of slits 1910*e* and 1910*h* are substantially aligned with one another, and the terminal ends 1914, 1916 of slits 1910*f* and 1910*g* are substantially aligned with one another. Slits 1910*a*, 1910*b*, 1910*c*, and 1910*d* are not aligned with slits 1910*e*, 1910*f*, 1910*g*, and 1910*h*. Instead, slits 1910*a*, 1910*b*, 1910*c*, and 1910*d* are phase separated or spaced from slits 1910*e*, 1910*f*, 1910*g*, and 1910*h*. In other words, the quadruple slit including slits 1910*a*, 1910*b*, 1910*c*, and 1910*d* is phase separated from the quadruple slit including slits 1910*e*, 1910*f*, 1910*g*, and 1910*h*. In the embodiment of FIG. 19A, slits 1910 are substantially perpendicular to the tension axis T.

Each slit 1910 has two terminal ends 1914, 1916 and a midpoint 1918 between the two terminal ends 1914, 1916. A straight, imaginary line extends between and connects these terminal ends 1914, 1916. In this embodiment, the straight, imaginary line extending between and connecting the terminal ends of a first slit is substantially colinear with the straight, imaginary line extending between and connecting the terminal ends of a directly adjacent slit in the transverse direction. In this exemplary embodiment, all of the straight, imaginary lines extending between and connecting the slit terminal ends in a row are approximately colinear.

Those of skill in the art will appreciate that many changes may be made to the pattern while still falling within the scope of the present disclosure. in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. The degree of curvature of the terminal ends can vary. Alternatively, the row size or shape and beam size or shape can vary. Further, the degrees of offset or phase offset can vary from what is shown. Many of these changes could change the deployment pattern.

Figure 19B:
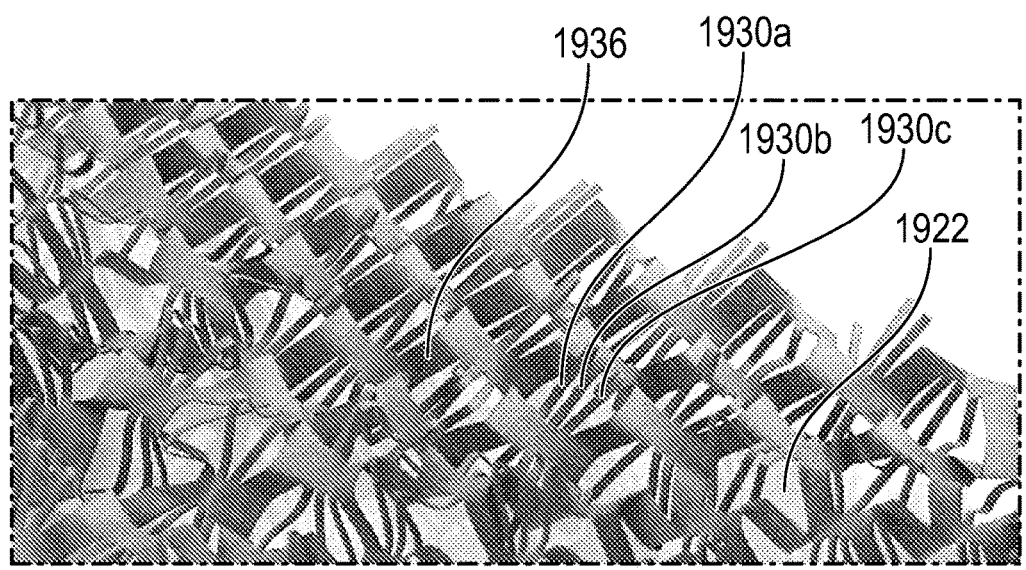
FIG. 19B is a perspective view photograph of the quadruple slit pattern shown in FIG. 19A formed in a paper sheet and exposed to tension along the tension axis.
Figure 19C:
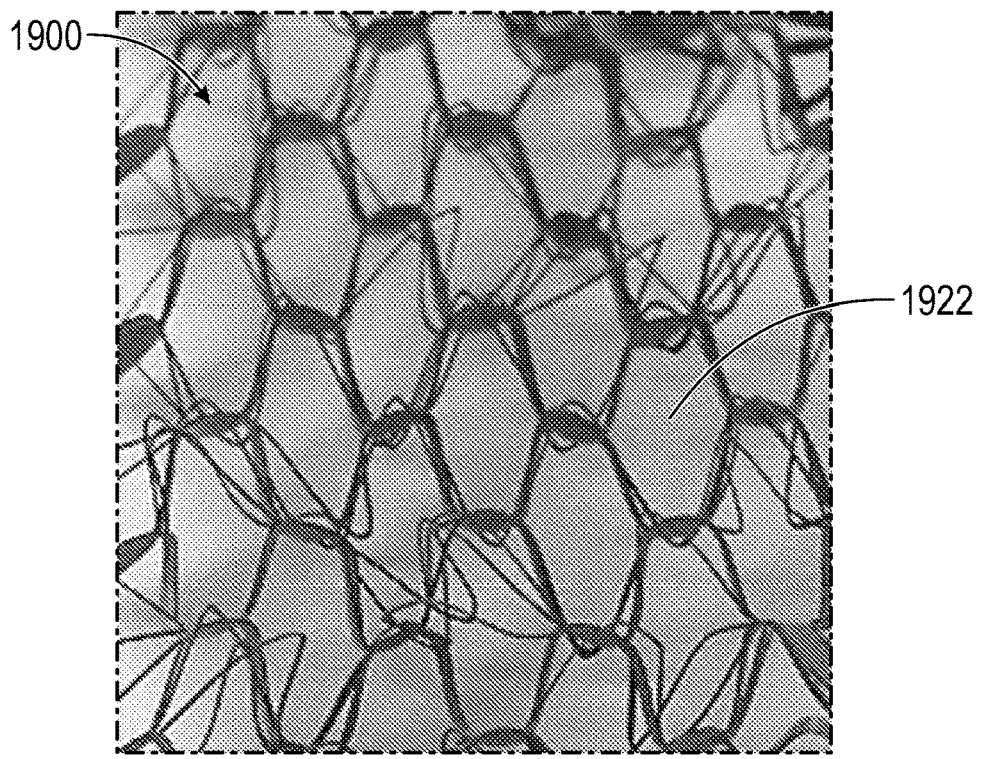
FIG. 19C is a nearly top view photograph of the quadruple slit pattern of FIG. 19A formed in a paper sheet and exposed to tension along the tension axis.
Figure 19D:
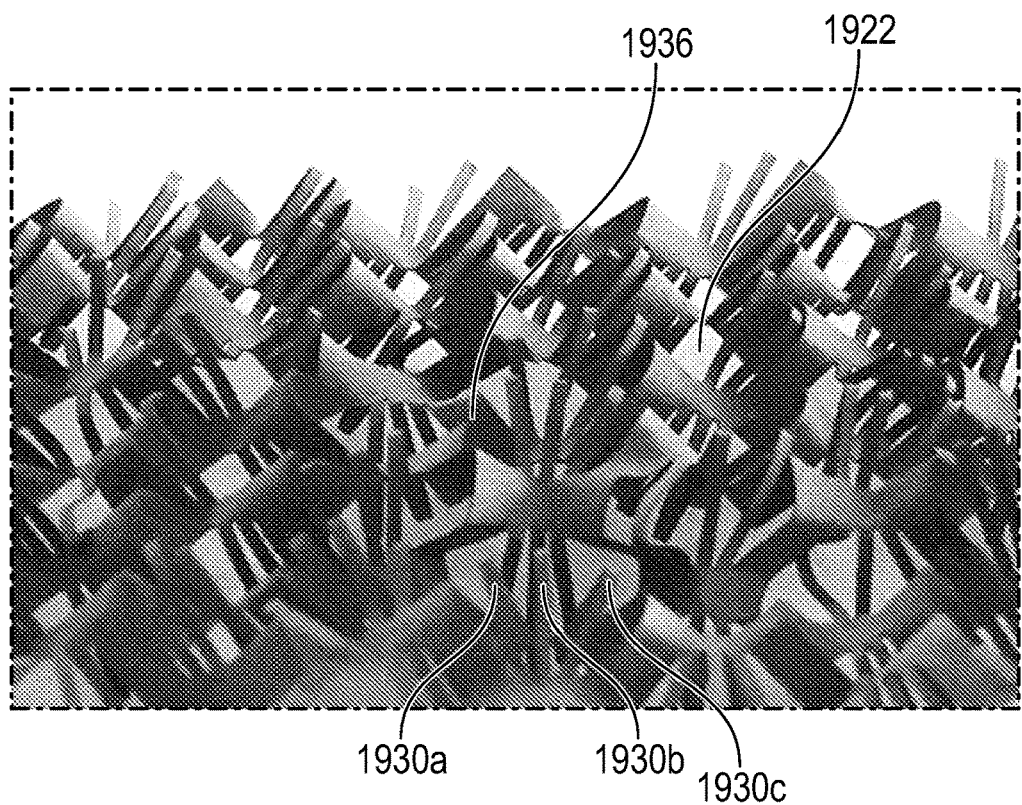
FIG. 19D is a nearly side of view photograph of the quadruple slit pattern of FIG. 19A formed in a paper sheet and exposed to tension along the tension axis.

FIGS. 19B-19D are photographs of a material including the slit pattern of FIG. 19A when exposed to tension along tension axis T. The material deploys substantially as described with respect to the pattern of FIG. 5A. However, there are now three transverse beams 1930a, 1930b and 1930c where there had been a single undulating transverse beam 530 previously.

When the tension-activated material 1900 is wrapped around an article or placed directly adjacent to itself, the flaps, loops, and undulations interlock with one another and/or opening portions 1922, to create an interlocking structure. Interlocking can be measured as stated in the interlocking test articulated above.

General Information

Most of the slit patterns shown herein have regions that are described as moving or buckling either upward or downward relative to the original plane of the sheet when tension is applied. The distinction between upward and downward motion is an arbitrary description used for clarity to substantially match the accompanying figures. The samples could all be flipped over turning the downward motions into upward motions and vice versa. In addition, it is normal and expected for occasional inversions to occur where the regions of the sample will flip such that similar features which had moved upward in previous regions are now moving downward and vice versa. These inversions can occur for regions as small as a single slit, or large portions of the material. These inversions are random and natural, they are a result of natural variations in materials, manufacturing, and applied forces. Although some effort was made to depict regions of material without inversions, all samples were tested with the presence of these natural variations and performance is not significantly affected by the number or location of inversions.

All of the slit patterns shown herein are shown as being generally perpendicular to the tension axis. While in many embodiments this can provide superior performance, any of the slit patterns shown or described herein can be rotated at an angle to the tension axis. Angles less than 45 degrees from the tension axis are preferred.

Further, all of the slit patterns shown herein include single slit that are out of phase with one another by approximately one half of the transverse spacing between directly adjacent slits (or 50% of the transverse spacing). However, the patterns may be out of phase by any desired amount including for example, one third of the transverse spacing, one quarter of the transverse spacing, one sixth of the transverse spacing, one eighth of the transverse spacing, etc. In some embodiments, the phase offset is less than 1 or less than three fourths, or less than one half of the transverse spacing of directly adjacent slits in a row. In some embodiments, the phase offset is more than one fiftieth, or more than one twentieth, or more than one tenth of the transverse spacing of directly adjacent slits in a row.

In some embodiments, the minimum phase offset is such that the terminal ends of slits in alternate rows intersect a line parallel to the tension axis through the terminal ends of slits in the adjacent rows. In some embodiments, the maximum phase offset is similarly limited by the creation of a continuous path of material. If the width of the slits orthogonal to the tension axis are constant for all slits and have a value w and the gap between slits orthogonal to the tension axis are constant and have a value g, then the minimum and maximum phase offsets are:

$$\text{minimum phase offset} = \frac{g}{w+g}, \text{ maximum phase offset} = \frac{w}{w+g}$$

Articles. The present disclosure also relates to one or more articles or materials including any of the slit patterns described herein. Some exemplary materials into which the slit patterns described herein can be formed include, for example, paper (including cardboard, corrugated paper, coated or uncoated paper, kraft paper, cotton bond, recycled paper); plastic; woven and non-woven materials and/or fabrics; elastic materials (including rubber such as natural rubber, synthetic rubber, nitrile rubber, silicone rubber, urethane rubbers, chloroprene rubber, Ethylene Vinyl Acetate or EVA rubber); inelastic materials (including polyethylene and polycarbonate); polyesters; acrylics; and polysulfones. The article can be, for example, a material, sheet, film, or any similar construction.

Examples of thermoplastic materials that can be used include one or more of polyolefins (e.g., polyethylene (high density polyethylene (HDPE), medium density polyethylene (MDPE), low density polyethylene (LDPE), linear low density polyethylene (LLDPE)), metallocene polyethylene, and the like, and combinations thereof), polypropylene (e.g., atactic and syndiotactic polypropylene)), polyamides (e.g. nylon), polyurethane, polyacetal (such as DELRIN, available from DuPont, Wilmington, DE, US), polyacrylates, and polyesters (such as polyethylene terephthalate (PET)), polyethylene terephthalate glycol (PETG), and aliphatic polyesters such as polylactic acid), fluoroplastics (such as the THV series available from 3M Company, St. Paul, MN, US), and combinations thereof. Examples of thermoset materials can include one or more of polyurethanes, silicones, epoxies, melamine, phenol-formaldehyde resin, and combinations thereof. Examples of biodegradable polymers can include one or more of polylactic acid (PLA), polyglycolic acid (PGA), poly(caprolactone), copolymers of lactide and glycolide, poly(ethylene succinate), polyhydroxybutyrate, and combinations thereof.

The material in which the single slit pattern is formed can be of any desired thickness. In some embodiments, the material has a thickness between about 0.001 inch (0.025 mm) and about 5 inches (127 mm). In some embodiments, the material has a thickness between about 0.01 inch (0.25 mm) and about 2 inches (51 mm). In some embodiments, the material has a thickness between about 0.1 inch (2.5 mm) and about 1 inch (25.4 mm). In some embodiments, the thickness is greater than 0.001 inch, or 0.01 inch, or 0.05 inch, or 0.1 inch, or 0.5 inch, or 1 inch, or 1.5 inches, or 2 inches, or 2.5 inches, or 3 inches (76.2 mm). In some embodiments, the thickness is less than 5 inches or 4 inches, or 3 inches (76.2 mm), or 2 inches, or 1 inch, or 0.5 inch, or 0.25 inch (6.4 mm), or 0.1 inch.

In some embodiments, where the material is paper, the thickness is between about 0.003 inch (0.076 mm) and about 0.010 inch (0.25 mm). In some embodiments where the material is plastic, the thickness is between about 0.005 inch (0.13 mm) and about 0.125 inch (3.2 mm).

In some embodiments, the slit or cut pattern extends through one or more of the edges of the sheet, film, or material. In some embodiments, this allows the material to be of unlimited length and also to be deployed by tension, particularly when made with non-extensible materials. "Non-extensible" material is generally defined as a material that when in a cohesive, unadulterated configuration (absent slits) has an ultimate elongation value of under 25%, less than or equal to 10% or, in some embodiments, less than or equal to 5%.

In some embodiments, the slit or cut pattern extends through one or more of the edges of the sheet, film, or material. In some embodiments, this allows the material to be of unlimited length and also to be deployed by tension, particularly when made with non-extensible materials. The amount of edge material is the area of material surrounding and not including the single slit pattern. In some embodiments, the amount of edge material, or down-web border, can be defined as the width of the rectangle whose long axis is parallel to the tension axis and can be as long as the material and can be drawn on the substrate without overlapping or touching any slits. In some embodiments, the amount of edge material is less than 0.010 inch (0.25 mm) or less than 0.001 inch (0.025 mm). In some embodiments, the width of the down-web border is less than 0.010 inch (0.25 mm) or less than 0.001 inch (0.025 mm). In some embodiments, the amount of edge material is less than 5 times the thickness of the substrate. In some embodiments, the width of the down-web border is less than 5 times the thickness of the substrate.

Cross-web slabs can be defined as rectangular regions with a rectangle whose long axis is perpendicular to the tension axis and is can be as long as the material and whose width is some finite number and can be drawn on the substrate without overlapping or touching any slits or cuts. In some embodiments, cross-web slabs of any width may already exist within the article as an integral part of the pattern. In some embodiments, cross-web slabs of any width may be added to the ends of a finite length article to make the article easier to deploy. In some embodiments, cross-web slabs of any width may be added intermittently to a continuously patterned article.

In some embodiments, the distance between terminal ends of a single slit (also referred to as the slit length) is between about 0.25 inch (6.4 mm) long and about 3 inches (76.2 mm) long, or between about 0.5 inch and about 2 inches, or between about 1 inch and about 1.5 inches. In some embodiments, the distance between terminal ends of a single slit (also referred to as slit length) is between 50 times the substrate thickness and 1000 times the substrate thickness, or between 100 and 500 times the substrate thickness. In some embodiments, the slit length is less than 1000 times the substrate thickness, or less than 900 times, or less than 800 times, or less than 700 times, or less than 600 times, or less than 500 times, or less than 400 times, or less than 300 times, or less than 200 times, or less than 100 times the substrate thickness. In some embodiments, the slit length is greater than 50 times the substrate thickness, or greater than 100 times, or greater than 200 times, or greater than 300 times, or greater than 400 times, or greater than 500 times, or greater than 600 times, or greater than 700 times, or greater than 800 times, or greater than 900 times the substrate thickness.

Figure 20:
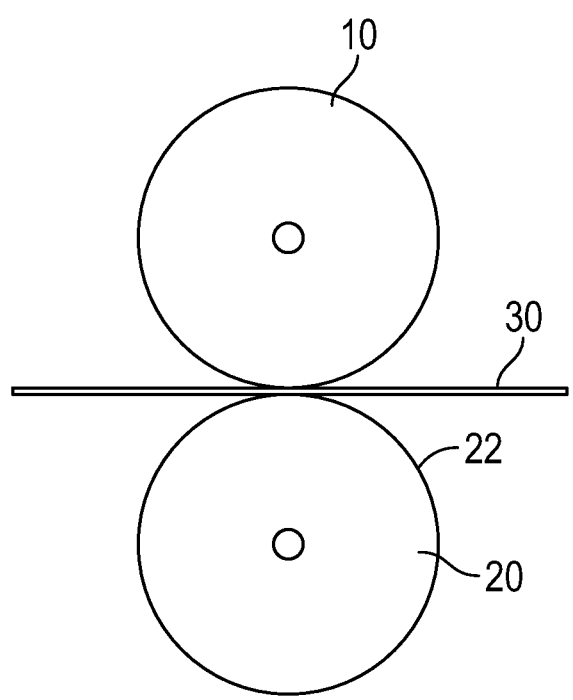
FIG. 20 is an example system for making materials consistent with the technology disclosed herein.

Method of Making. The slit patterns and articles described herein can be made in a number of different ways. For example, the slit patterns can be formed by extrusion, molding, laser cutting, water jetting, machining, stereolithography or other 3D printing techniques, laser ablation, photolithography, chemical etching, rotary die cutting, stamping, other suitable negative or positive processing techniques, or combinations thereof. In particular, with reference to FIG. 20, paper or another sheet material 30 can be fed into a nip consisting of a rotary die 20 and an anvil 10. In this example the material 30 is stored in a roll configuration where the material is rolled around a central axis that may include or may omit a central core. The rotary die 20 has cutting surfaces 22 on it that correspond to the slit pattern desired to be cut into the sheet material 30. The die 20 cuts through the material 30 in desired places and forms the slit pattern described herein. The same process can be used with a flat die and flat anvil.

Method of Using. The articles and materials described herein can be used in various ways. In one embodiment, the two-dimensional sheet, material, or article has tension applied along the tension axis, which causes the slits to form the openings and/or flaps and/or motions described herein. In some embodiments, the tension is applied by hand or with a machine.

Uses. The present disclosure describes articles that begin as a flat sheet but deploy into a three-dimensional construction upon the application of force/tension. In some embodiments, such constructions form energy absorbing structures. The patterns, articles, and constructions described herein have a large number of potential uses, at least some of which are described herein.

One exemplary use is to protect objects for shipping or storage. As stated above, existing shipping materials have a variety of drawbacks including, for example, they occupy too much space when stored before use (e.g., bubble wrap, packing peanuts) and thus increase the cost of shipping; they require special equipment to manufacture (e.g., inflatable air bags); they are not always effective (e.g., crumpled paper); and/or they are not widely recyclable (e.g., bubble wrap, packing peanuts, inflatable air bags). The tension-activated, expanding films, sheets, and articles described herein can be used to protect items during shipping without any of the above drawbacks. When made of sustainable materials, the articles described herein are effective and sustainable. Because the articles described herein are flat when manufactured, shipped, sold, and stored and only become three-dimensional when activated with tension/force by the user, these articles are more effective and efficient at making the best use of storage space and minimizing shipping/transit/packaging costs. Retailers and users can use relatively little space to house a product that will expand to 10 or 20 or 30 or 40 or more times its original size. Further, the articles described herein are simple and highly intuitive for use. The user merely pulls the product off the roll or takes flat sheets of product, applies tension across the article along the tension axis (which can be done by hand or with a machine), and then wraps the product around an item to be shipped. In many embodiments, no tape is needed because the interlocking features enable the product to interlock with another layer of itself.

In some embodiments, the slit patterns described herein create packaging materials and/or cushioning films that provide advantages over the existing offerings. For example, in some embodiments, the packaging materials and/or cushioning films of the present disclosure provide enhanced cushioning or product protection. In some embodiments, the packaging materials and/or cushioning films of the present disclosure provide similar or enhanced cushioning or product protection when compared to the existing offerings but are recyclable and/or more sustainable or environmentally friendly than existing offerings. In some embodiments, the packaging materials and/or cushioning films of the present disclosure provide similar or enhanced cushioning or product protection when compared to the existing offerings but can be expanded and wrapped around an item to be shipped. Constructions that hold their shape once tension is applied can be preferred because they may eliminate the need for tape to hold the material in place for many applications.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described embodiments (or one or more aspects thereof) may be used in combination with each other. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. Any of the embodiments shown or described herein can be combined with other embodiments shown or described herein, including that any specific features, shapes, structures, or concepts shown or described herein can be combined with any of the other specific features, shapes, structures, or concepts shown or described herein. The scope of the invention can be determined with reference to the appended claims, along with the full scope of equivalents to which such claims are entitled.

The recitation of all numerical ranges by endpoint is meant to include all numbers subsumed within the range (i.e., the range 1 to 10 includes, for example, 1, 1.5, 3.33, and 10).

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Those having skill in the art will appreciate that many changes may be made to the details of the above-described embodiments and implementations without departing from the underlying principles thereof. Further, various modifications and alterations of the present disclosure will become apparent to those skilled in the art without departing from the spirit and scope of the disclosure. The scope of the present application should, therefore, be determined only by the following claims and equivalents thereof.

What is claimed is:

1. An expanding material having a pretensioned state defining a pretensioned plane, comprising:
   a material including a plurality of slits that form a multi-slit pattern wherein the plurality of slits are arranged in rows, wherein the material defines a tension axis;
   wherein each slit includes two parallel axial portions that each have first axial endpoints terminating at opposite ends of a transverse portion, wherein each axial portion also has a second axial endpoint that terminates at an imaginary line;
   wherein slits in a first row are inverse to slits in an adjacent second row such that the second axial endpoint of each axial portion in both rows terminates at a different point along the imaginary line that runs between the two rows and is parallel to the transverse portion of each slit in both rows; and
   wherein the material is substantially in a plane in the pretensioned state but wherein the multi-slit pattern enables at least portions of the material to rotate 45 degrees or greater from the plane of the pretensioned state when tension is applied along the tension axis.

2. The expanding material of claim 1,
   wherein an imaginary straight line connects the first and second terminal ends of each of the slits in the plurality of the slits in a row and wherein the imaginary straight lines relating to a row of slits are all colinear with one another but not with a region of each of the slits between the terminal ends.

3. The expanding material of claim 1, wherein the material is non-extensible and includes at least one of paper, polyester, and acrylic.

4. The expanding material of claim 1, wherein the plurality of slits are arranged in a plurality of rows of slits and slits in a first row of slits are offset from slits in an adjacent row of slits by 75% or less of the transverse length of each slit in the first row of slits.

5. The expanding material of claim 1, wherein each of the slits have a slit shape and wherein the slit shape varies within a row of slits.

6. The expanding material of claim 1, wherein each of the slits have a slit shape and wherein the slit shape varies in adjacent rows.

7. The expanding material of claim 1, wherein the material has a thickness between about 0.001 inch (0.025 mm) and about 5 inches (127 mm).

8. The expanding material of claim 1, wherein each slit in the plurality of slits has a slit length, and wherein slits in a first group of slits in the plurality of slits have a slit length that differs from the slit length of slits in a second group of slits in the plurality of slits.

9. The expanding material of claim 1, wherein the material is substantially planar in a pretensioned form but wherein the multi-slit pattern enables at least portions of the material to rotate 90 degrees or greater from the plane of the pretensioned form when tension is applied along the tension axis.

10. The expanding material of claim 1, wherein the material is configured to remain rotated at least 45 degrees once the tension is no longer applied.

11. A die capable of forming the multi-slit pattern of claim 1.

12. A packaging material comprising the expanding material of claim 1.

13. The packaging material of claim 12, wherein the expanding material is in a roll configuration.

14. The packaging material of claim 12, wherein the expanding material is one or more individual sheets.

15. The packaging material of claim 14, further comprising an envelope having the expanding material disposed in the envelope.

16. A method of making the expanding material of claim 1, comprising:
    forming the multi-slit pattern in the material by at least one of by extrusion, molding, laser cutting, water jetting, machining, stereolithography, laser ablation, photolithography, chemical etching, rotary die cutting, stamping or combinations thereof.

17. A method of using the expanding material of claim 1, comprising:
    applying tension to the expanding material along a tension axis to cause the material to expand.

18. The method of claim 17, wherein, when exposed to tension along the tension axis, at least one of (1) the terminal ends of the slits in the expanding material are drawn toward one another, causing a beam of the expanding material to undulate upward relative to the plane of the material in its pretensioned state and (2) portions of beams of the expanding material to undulate downward relative to the plane of the material in its pretensioned state forming an opening portion.

19. The method of claim 17, further comprising:
    wrapping the expanded material around an item.

20. The method of claim 19, wherein the expanded material defines one or more of flaps, openings, and interlocking features and the expanded material is wrapped around the item to form at least two full layers such that at least one of the flaps, loops, openings, and interlocking features on the first layer interlock with at least one of the flaps, loops, openings, and interlocking features on the second layer.

* * * * *